US012627196B2

(12) United States Patent
Saito

(10) Patent No.: US 12,627,196 B2
(45) Date of Patent: May 12, 2026

(54) CONNECTOR FOR A LINEAR MOTOR

(71) Applicant: Tyco Electronics Japan G.K., Kawasaki (JP)

(72) Inventor: Masaaki Saito, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 231 days.

(21) Appl. No.: 17/979,848

(22) Filed: Nov. 3, 2022

(65) Prior Publication Data

US 2023/0142831 A1 May 11, 2023

(30) Foreign Application Priority Data

Nov. 5, 2021 (JP) .................................. 2021-181416

(51) Int. Cl.
| | |
|---|---|
| H02K 5/22 | (2006.01) |
| H01R 12/70 | (2011.01) |
| H01R 13/621 | (2006.01) |
| H01R 13/627 | (2006.01) |
| H01R 31/06 | (2006.01) |

(52) U.S. Cl.
CPC ........... H02K 5/225 (2013.01); H01R 13/621 (2013.01); H01R 31/06 (2013.01); H01R 12/7052 (2013.01); H01R 13/6271 (2013.01); H01R 2201/10 (2013.01)

(58) Field of Classification Search
CPC ............ H02K 5/04; H02K 5/22; H02K 5/225; H02K 41/03; H02K 2213/12; H02K 11/0094; H01R 13/621; H01R 31/06; H01R 12/7052; H01R 13/6271; H01R 2201/10
See application file for complete search history.

(56) References Cited

U.S. PATENT DOCUMENTS 6,257,918 B1 * 7/2001 Yamamoto ......... H01R 13/6315
439/378
7,312,540 B2 12/2007 Miyamoto et al.
(Continued)

FOREIGN PATENT DOCUMENTS

| CN | 109660107 B | 12/2019 |
|---|---|---|
| JP | S63127217 A | 5/1988 |
(Continued)

OTHER PUBLICATIONS

Extended European Search Report from the European Patent Office dated Apr. 12, 2023, corresponding to Application No. 22205017.1-1202, 9 pages.

(Continued)

*Primary Examiner* — Tulsidas C Patel
*Assistant Examiner* — Joshua Kiel M Rodriguez

(57) ABSTRACT

A linear motor connector system comprises a first linear motor, a second linear motor, and a first connector. The first connector includes a first plug holder electrically connected to the first linear motor and positioned in a recessed portion formed on an exterior face of a connecting portion of the first linear motor. The first connector further includes a first tab holder electrically connected to the second linear motor. The first tab holder is positioned in a recessed portion formed on an exterior face of a connecting portion of the second linear motor and faces the first plug holder along a direction of connection of the linear motors.

22 Claims, 65 Drawing Sheets

(56)     References Cited

U.S. PATENT DOCUMENTS

| | | | |
|---|---|---|---|
| 7,959,445 B1 | 6/2011 | Daily et al. | |
| 2002/0047323 A1 | 4/2002 | Kawada | |
| 2004/0222707 A1 | 11/2004 | Sato et al. | |
| 2008/0252153 A1* | 10/2008 | Finkbeiner | H02K 41/03 |
| | | | 310/12.33 |
| 2015/0008768 A1 | 1/2015 | Achterberg et al. | |
| 2020/0153315 A1* | 5/2020 | Grosskreuz | B65G 54/02 |
| 2020/0240194 A1 | 7/2020 | Xu | |

FOREIGN PATENT DOCUMENTS

| | | | |
|---|---|---|---|
| JP | H0578059 A | 3/1993 | |
| JP | 2001352609 A | 12/2001 | |
| JP | 2002152962 A | 5/2002 | |
| JP | 2003219627 A | 7/2003 | |
| JP | 2004023954 A | 1/2004 | |
| JP | 2004357353 A | 12/2004 | |
| JP | 2011205841 A | 10/2011 | |
| JP | 2012090492 A | 5/2012 | |
| JP | 2013503440 A | 1/2013 | |
| JP | 5376257 B2 | 12/2013 | |
| WO | 2006038510 A1 | 4/2006 | |
| WO | WO-2009116343 A1 * | 9/2009 | H02K 41/03 |

OTHER PUBLICATIONS

Japanese Office Action dated Aug. 12, 2025 with English translation, corresponding to Application No. 2021-181416, 12 pages.

* cited by examiner (A)

201a (B)

101b (C)

101a (A)          206a (B)          106b (C)          106a (D)          106c (A)

210a (B)

110a/110b (C)

110c (A)

215a (B)

115a/115b (C)

115c (A)

(B)

(C)

(A)

(B)

(A)

(B)

106a'    106b'

106c'

107a 107b 107a   107b                    107c

108a

108b

211a

211b (B)                              (A)                              (C)

(B) (A) (C)

(A)

(B)

(A)

(B)

450

450

(A)

(B)

(A)

501a (B)

501b (A)

502a (B)

502b (A)

(B)

CONNECTOR FOR A LINEAR MOTOR

CROSS-REFERENCE TO RELATED APPLICATION

This application claims the benefit of the filing date under 35 U.S.C. § 119(a)-(d) of Japanese Patent Application No. 2021-181416, filed on Nov. 5, 2021.

FIELD OF THE INVENTION

The present invention relates to connectors for linear motors. More specifically, the present invention relates to a connector for connecting at least two linear motors in a series direction.

BACKGROUND

Linear motors are used in various fields, for example, semiconductor manufacturing equipment and the like. The linear motors can be used as, for example, a servomotor or the like.

A linear motor contains an iron core, a coil, and the like inside its body. A plurality of linear motors may be connected in a series direction to improve output.

In order to connect a plurality of linear motors in a series direction, an electrical connection therebetween is required. However, since an iron core, a coil, and the like are contained inside a linear motor, conventional connectors have difficulty in connecting linear motors in series due to space constraints.

SUMMARY

A linear motor connector system comprises a first linear motor, a second linear motor, and a first connector. The first connector includes a first plug holder electrically connected to the first linear motor and positioned in a recessed portion formed on an exterior face of a connecting portion of the first linear motor. The first connector further includes a first tab holder electrically connected to the second linear motor. The first tab holder is positioned in a recessed portion formed on an exterior face of a connecting portion of the second linear motor and faces the first plug holder along a direction of connection of the linear motors.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
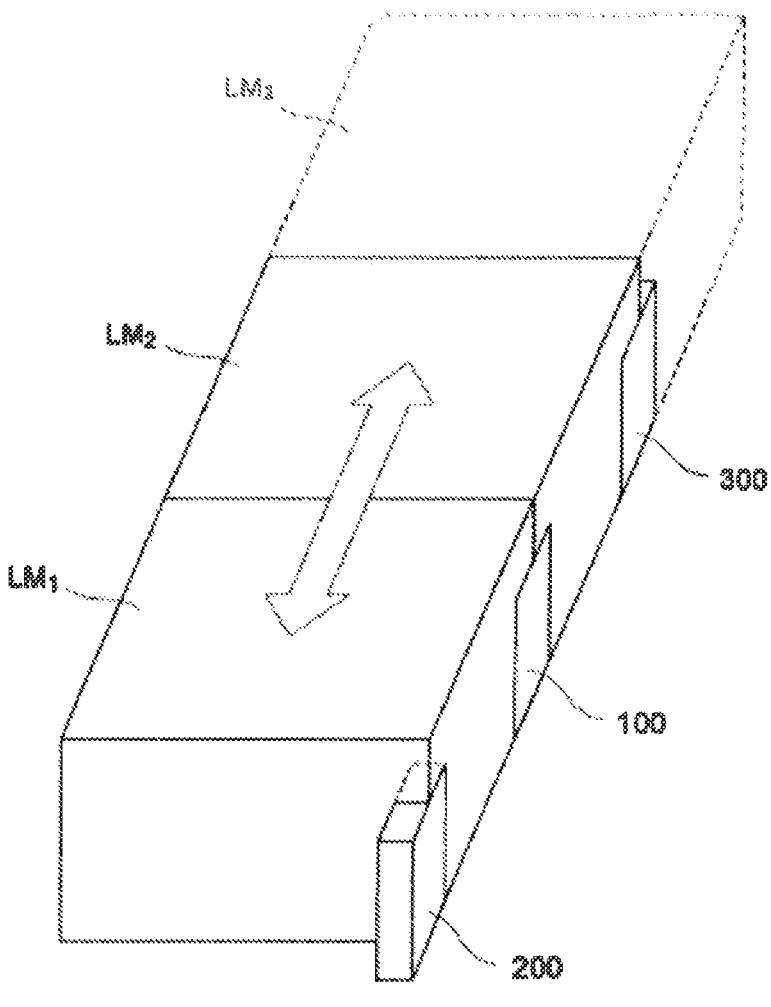
FIG. 1 is a schematic diagram schematically showing connection of a plurality of linear motors.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An electric connector unit according to one embodiment of the present disclosure will be described in more detail below with reference to the drawings. Various elements in the drawings are just described in a schematical and exemplary manner for explaining the present disclosure, and the appearances and dimensional ratios of the elements can be different from those of real things.

Relative terms such as "lower", "upper", "horizontal", "perpendicular", "above", "below", "top", and "bottom", derivation terms thereof, "horizontally", "downward", "upward", and the like should be understood to refer to directions as described or illustrated. In such a relative term, which is only for convenience in the explanation, an apparatus need not be configured or operated in a specific direction unless otherwise specified. Moreover, a term such as "attached", "added", "connected", "coupled", or "interconnected", or a term similar thereto refers to a relationship in which structures are directly or indirectly fixed or attached to each other with an inclusion, attachment of both the structures which are movable or rigid, or the relationship thereof unless otherwise specified. Further, examples of the features or advantages of the present disclosure are described with reference to preferred aspects. Such aspects are sufficiently described in detail, and enable those skilled in the art to carry out the present disclosure. It should be understood that other aspects can also be used, and processes and electrical or mechanical modifications are enabled without departing from the scope of the present disclosure. Accordingly, the present disclosure is not definitely limited to preferred aspects (aspects combined with single or other features) describing examples of unrestricted combinations of conceivable features.

The term "generally perpendicular" as used herein need not mean "completely perpendicular", and encompasses aspects of slight deviations therefrom (for example, an angle with respect to a winding axis is in a range of $90°\pm20°$, for example, a range of $90°\pm10°$). The term "generally parallel" as used herein need not mean "completely parallel", and encompasses aspects of slight deviations therefrom (for example, a deviation from "completely parallel" is in a range of $\pm20°$, for example, in a range of up to $\pm10°$).

The present invention relates to connectors for connecting at least two linear motors in a series direction. A "linear motor" in the present disclosure generally means an electric motor without a shaft. A typical motor makes rotational motion, whereas a linear motor creates linear motion. A direction in which a linear motor makes linear motion, for example, as indicated by the arrow of FIG. 1, is referred to as a "series direction" or a "direction of connection".

Linear motors, theoretically, are connected in a series direction to improve output. However, since a coil, an iron core, and the like are contained inside a linear motor, there are space constraints on design. The number of linear motors connected in the series direction is not particularly limited. For example, as shown in FIG. 1, it is possible to connect a first linear motor $LM_1$, a second linear motor $LM_2$, a third linear motor $LM_3$ . . . in a series direction.

In the present disclosure, at least two linear motors can be connected in a series direction by using a connector. In particular, linear motors can be connected in a series direction at side faces of the linear motors. A "connector" in the present disclosure means a member that can provide an electrical and/or physical connection. For example, as shown in FIG. 1, two linear motors ($LM_1$, $LM_2$) can be connected in a series direction by providing a connector 100 (referred to below as a "first connector" (100)) on side faces (the XZ plane) of the two linear motors ($LM_1$, $LM_2$).

In addition, along with the first connector 100, a second connector 200 (referred to below as a "second connector" (200)) can be provided at an end of the side face (the XZ plane) of the linear motor ($LM_1$). An electrical wire or the like may be arranged in this second connector 200 (see FIG.

3). Alternatively, the second connector 200 may be used for connection to another linear motor (not shown). Along with the first connector 100, a third connector (referred to below as a "third connector" (300)) can be provided at an end portion of the side face (the XZ plane) of the linear motor ($LM_2$). The third connector 300 may be used for connection to a third linear motor $LM_3$. Alternatively, an electrical wire or the like may be arranged in the third connector 300. Regarding the arrangement of the second connector 200 and the third connector 300, their positions may be exchanged. In other words, the positions of the second connector and the third connector may be reversed. The linear motors ($LM_1$, $LM_2$) may be fixed to a plate-like table with a fastening bolt or the like.

Figure 2:
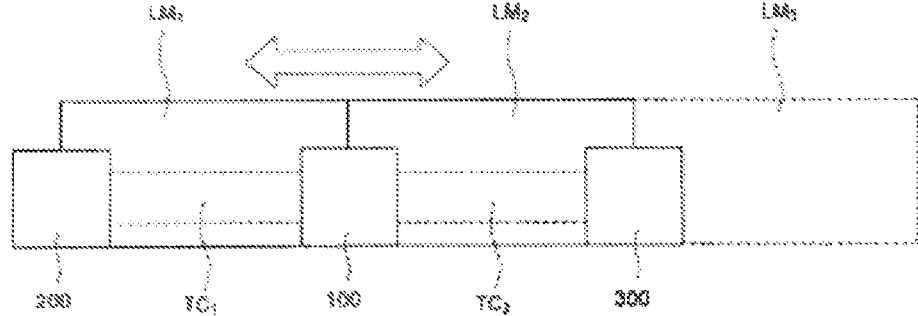
FIG. 2 is a schematic diagram schematically showing connection of a plurality of linear motors (in the XZ plane)
Figure 2:
Figure 3:
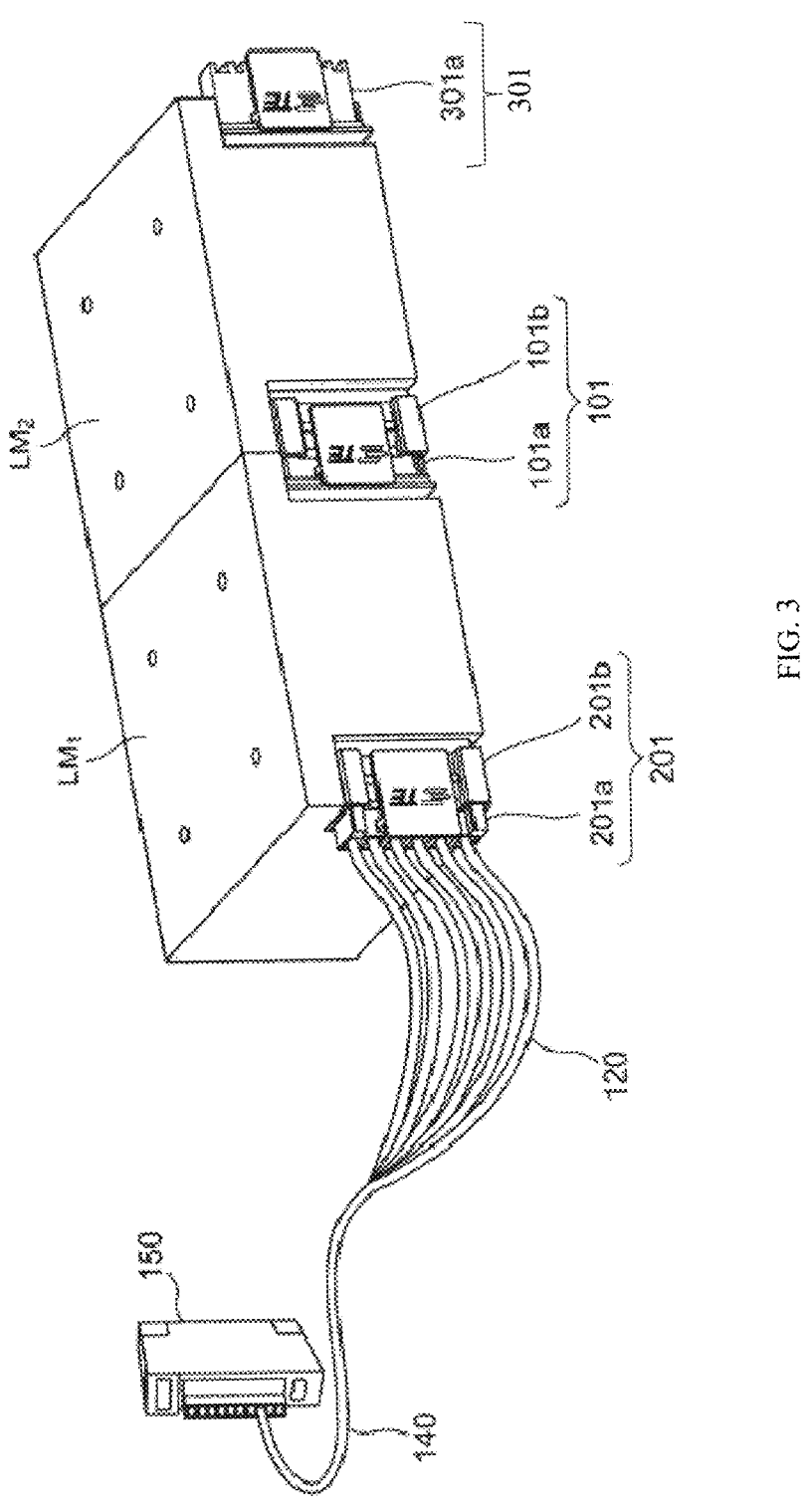
FIG. 3 is a schematic diagram schematically showing connection of linear motors using connectors of the present disclosure.
Figure 4:
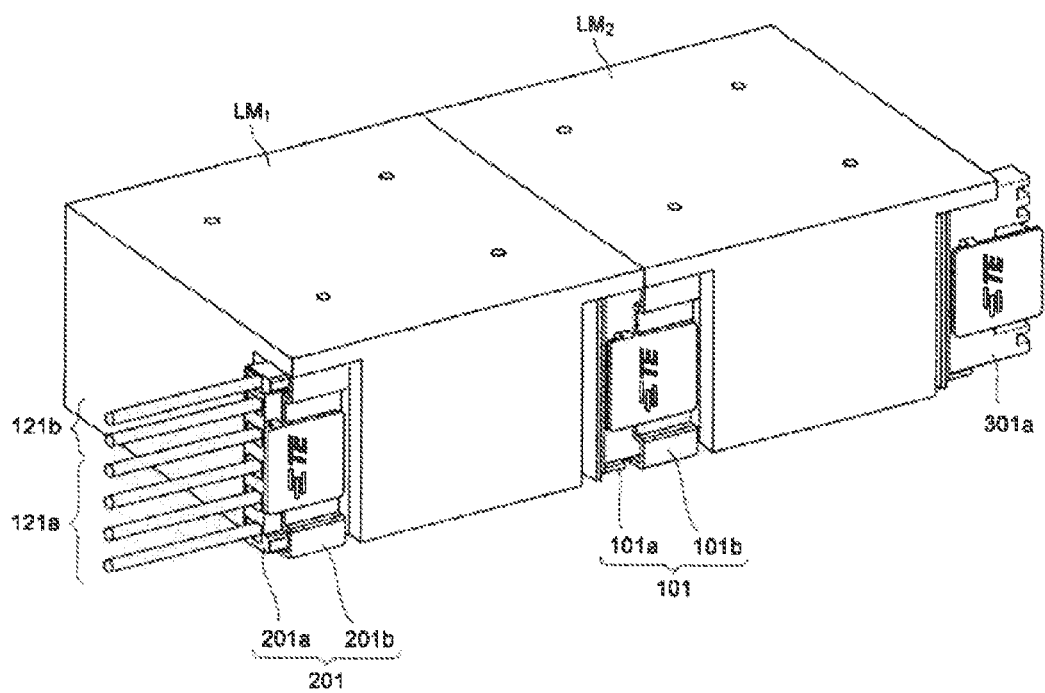
FIG. 4 is a schematic diagram schematically showing connectors according to a first embodiment of the present disclosure.
Figure 5:
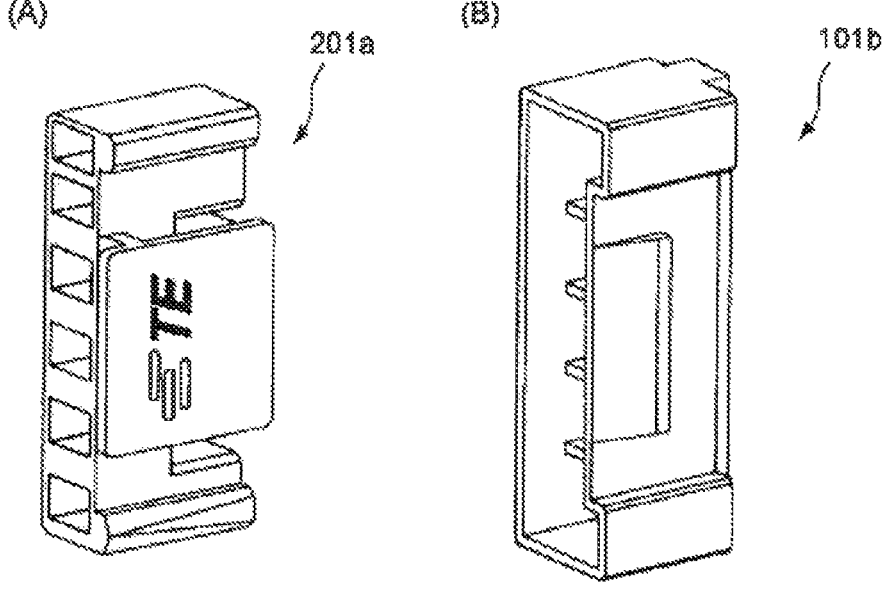
FIG. 5 is a schematic diagram schematically showing (A) a housing 201*a*, (B) a tab holder 101*b*, and (C) a plug holder 101*a*.
Figure 5:
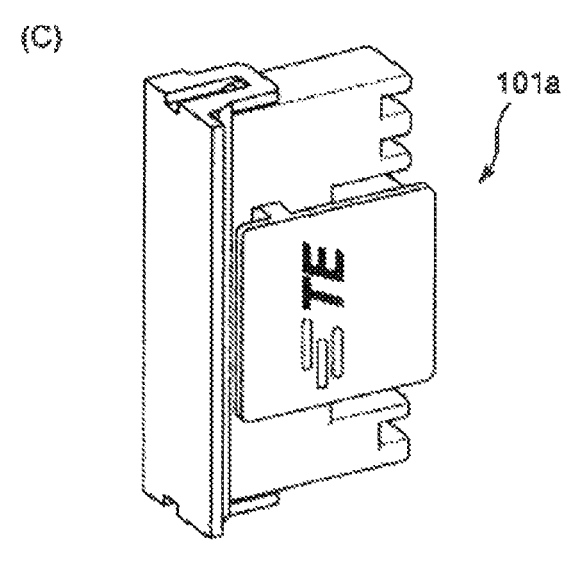
Figure 6:
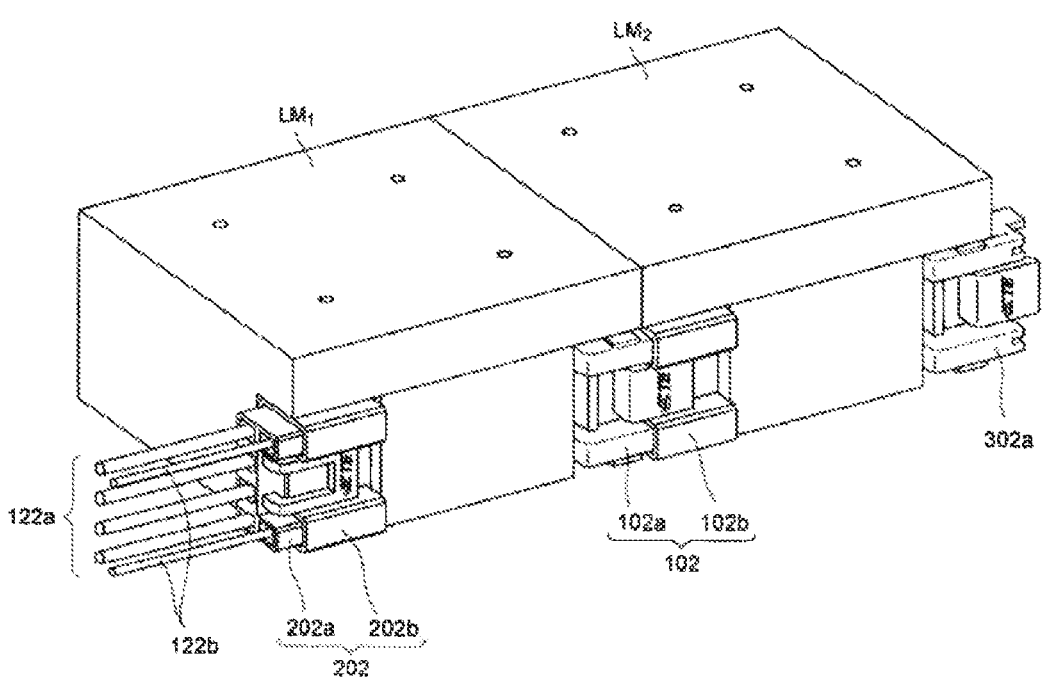
FIG. 6 is a schematic diagram schematically showing connectors according to a second embodiment of the present disclosure.
Figure 7:
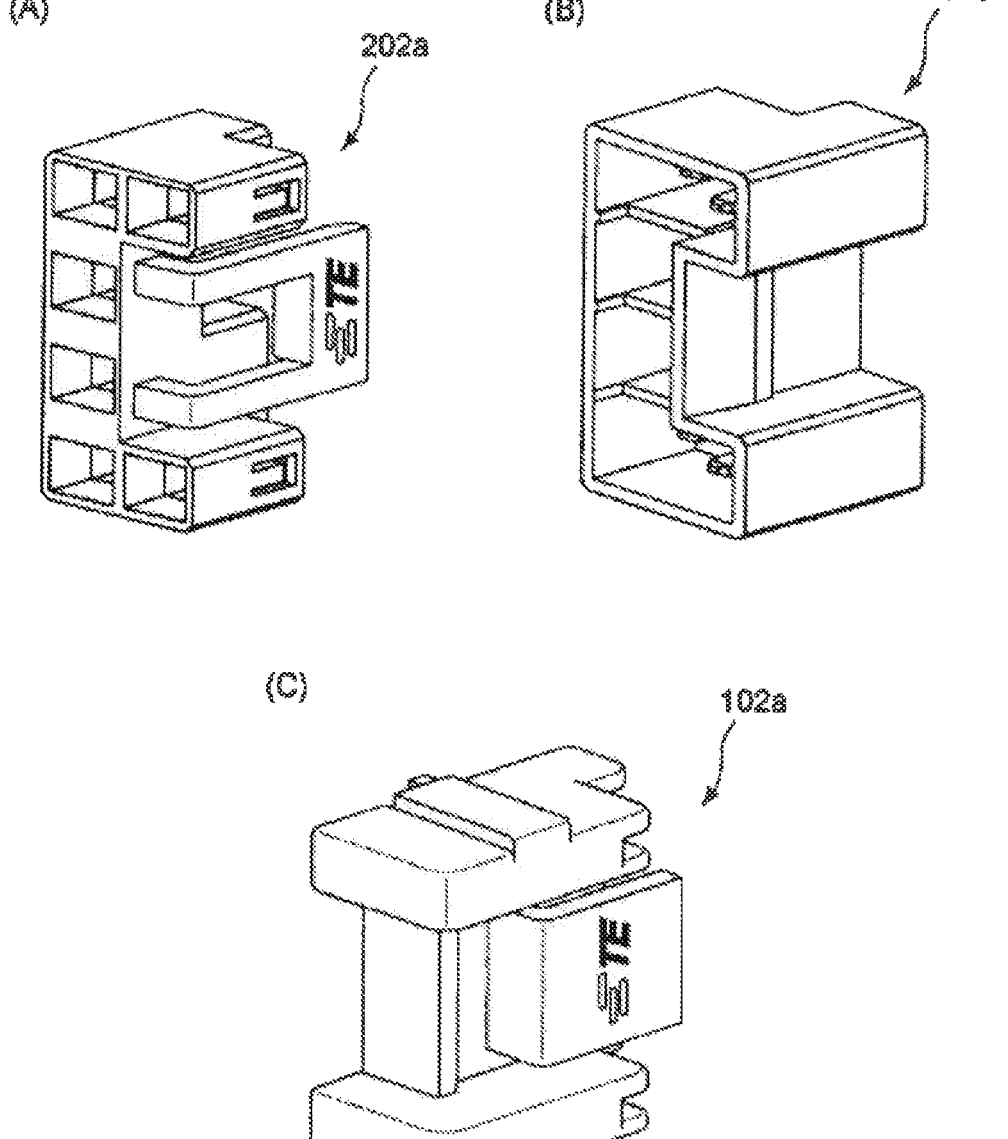
FIG. 7 is a schematic diagram schematically showing (A) a housing 202*a*, (B) a tab holder 102*b*, and (C) a plug holder 102*a*.
Figure 8:
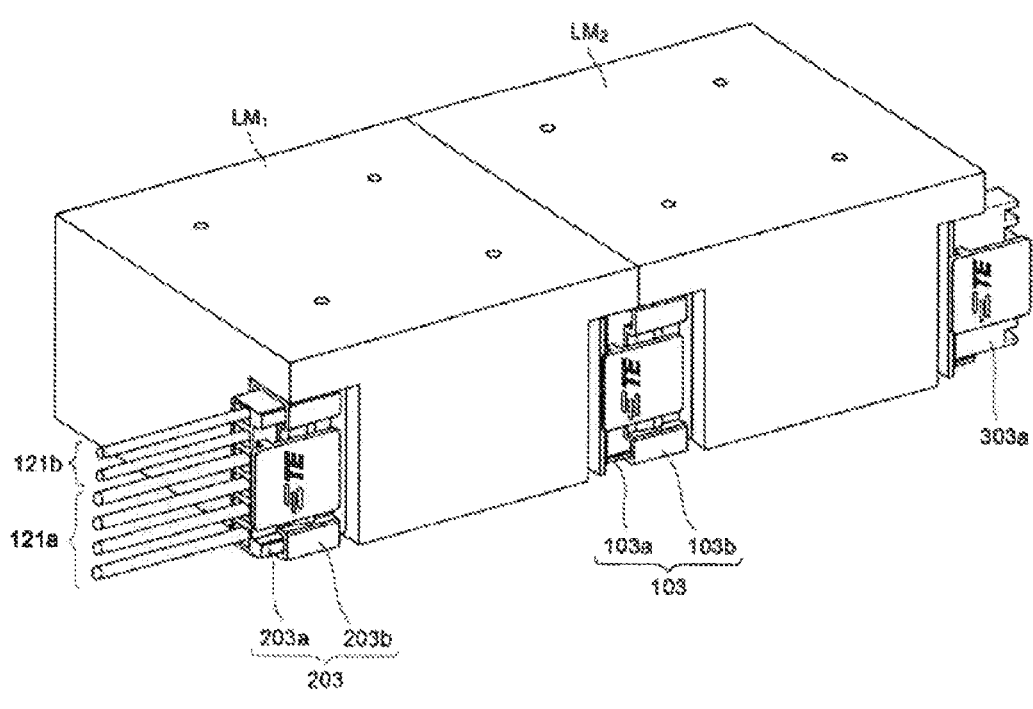
FIG. 8 is a schematic diagram schematically showing connectors according to a third embodiment of the present disclosure.
Figure 9:
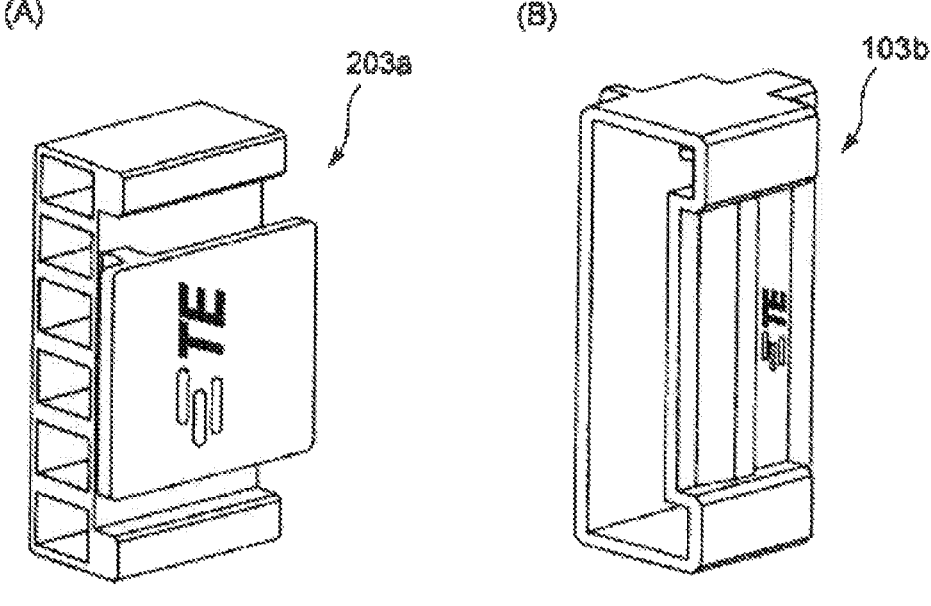
FIG. 9 is a schematic diagram schematically showing (A) a housing 203*a*, (B) a tab holder 103*b*, and (C) a plug holder 103*a*.
Figure 9:
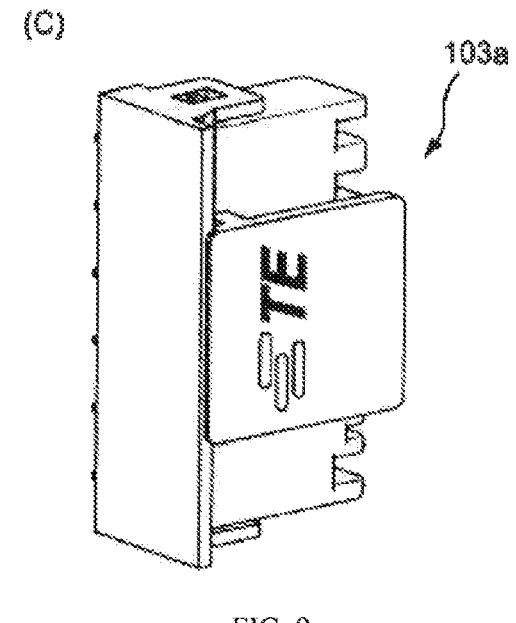
Figure 10:
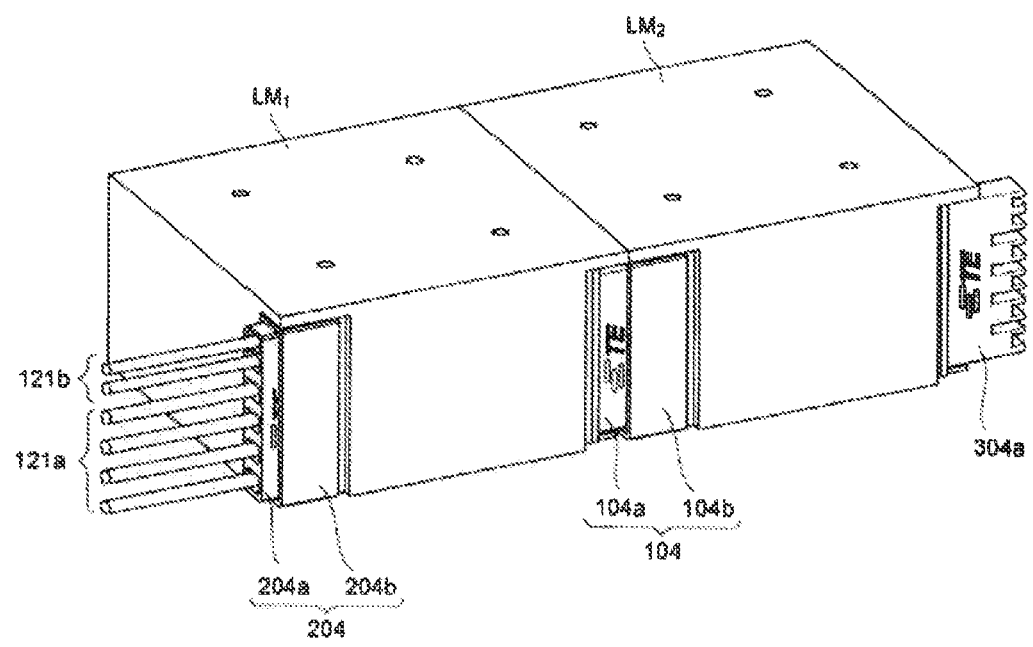
FIG. 10 is a schematic diagram schematically showing connectors according to a fourth embodiment of the present disclosure.
Figure 11:
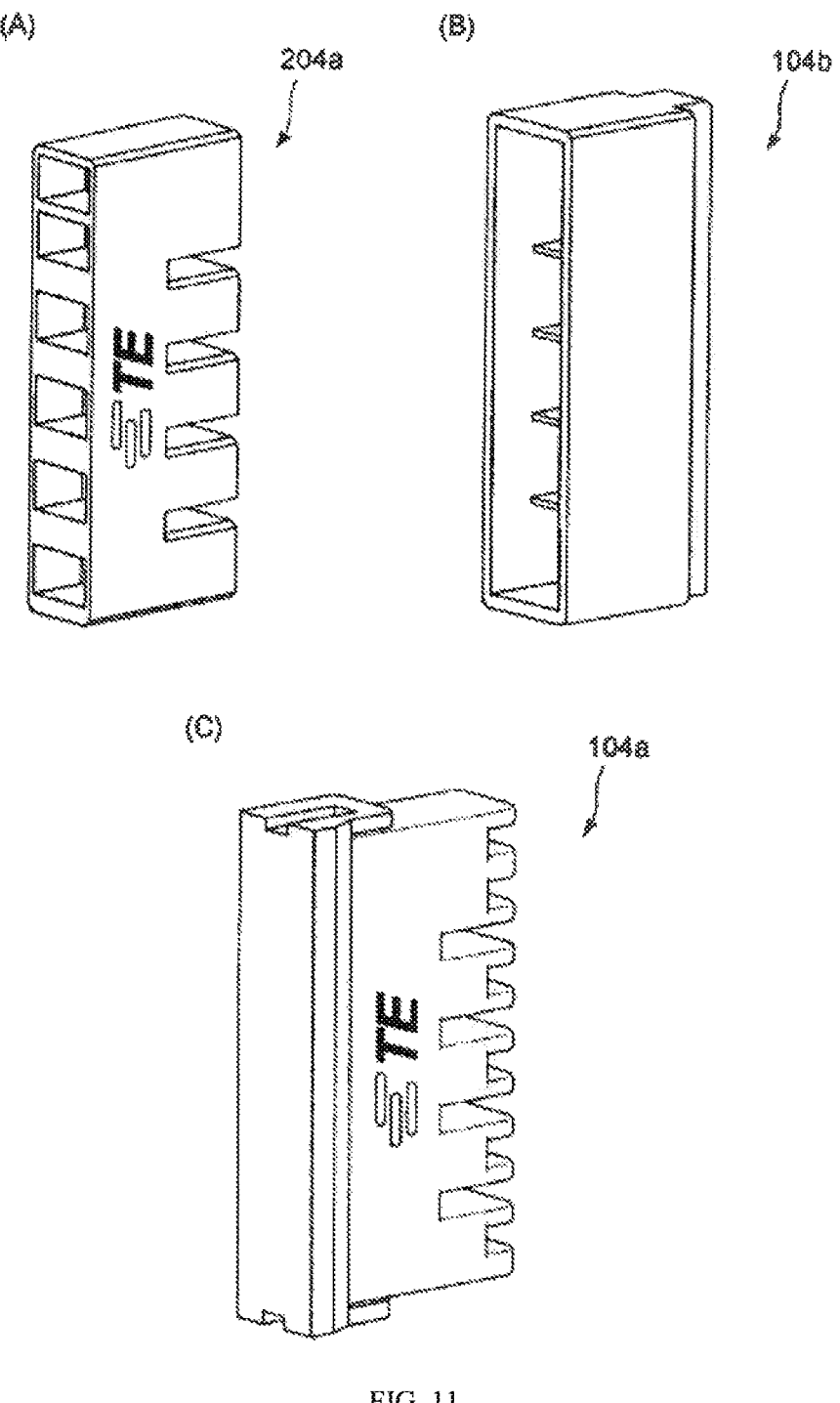
FIG. 11 is a schematic diagram schematically showing (A) a housing 204*a*, (B) a tab holder 104*b*, and (C) a plug holder 104*a*.
Figure 12:
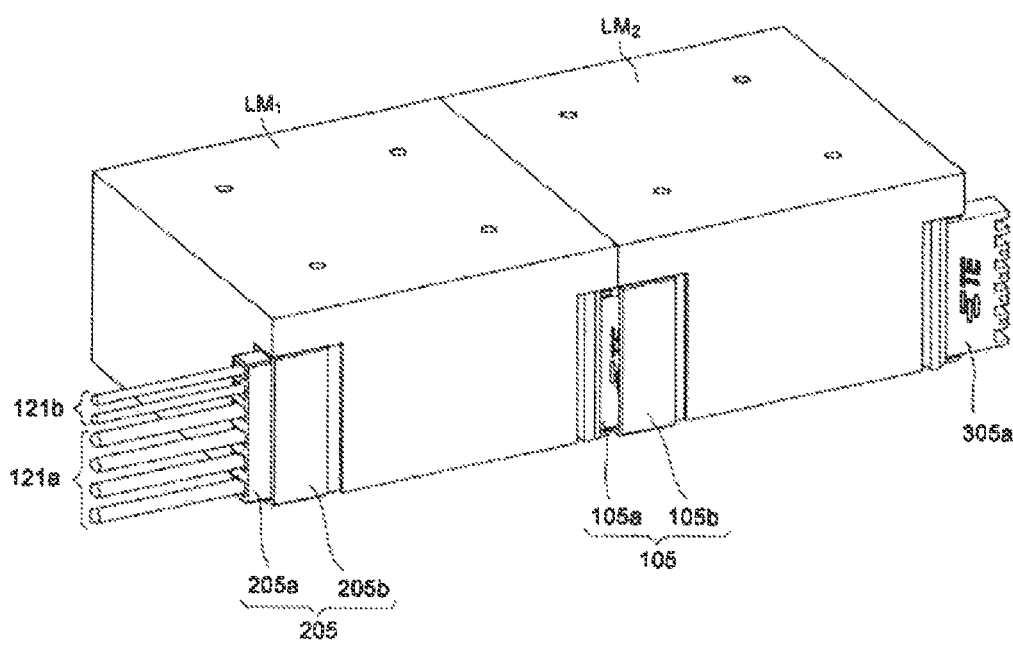
FIG. 12 is a schematic diagram schematically showing connectors according to a fifth embodiment of the present disclosure.
Figure 13:
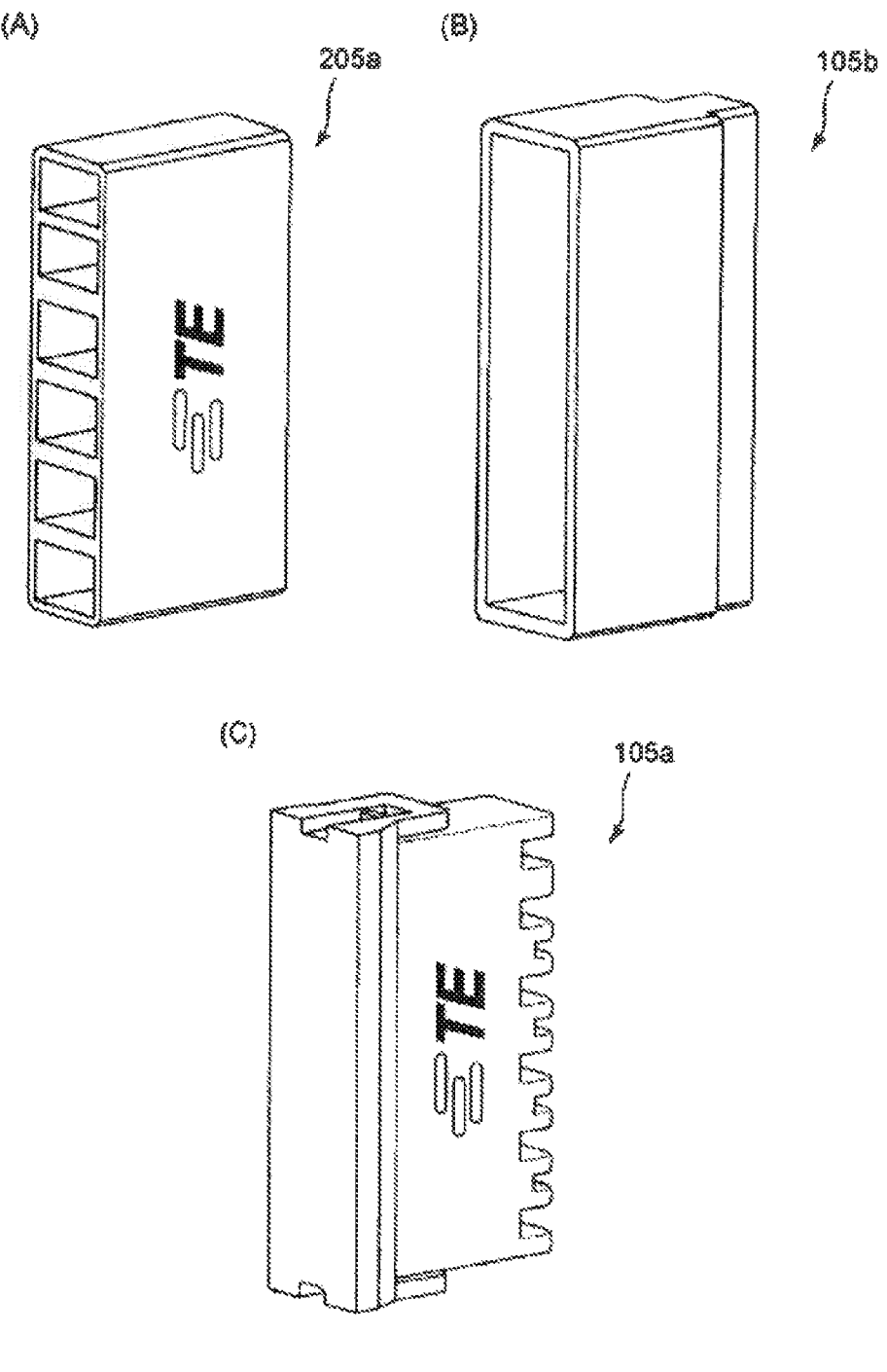
FIG. 13 is a schematic diagram schematically showing (A) a housing 205*a*, (B) a tab holder 105*b*, and (C) a plug holder 105*a*.

In the present disclosure, connectors such as the first connector 100, the second connector 200, and the third connector 300 may each be composed of two or more parts (see FIG. 3). The first connector 100, the second connector 200, and the third connector 300, for example, as shown in FIG. 2, can be arranged in alignment on the side faces (the XZ plane) of the linear motors ($LM_1$, $LM_2$) along the series direction indicated by the arrow.

Inside the linear motor $LM_1$, the first connector 100 and the second connector 200 may be electrically connected by a trunk line $TC_1$. It is preferred that the trunk line $TC_1$ be arranged along the side face or sidewall of the linear motor $LM_1$. The trunk line $TC_1$ may be formed as a circuit on a board. By arranging the board along the side face or sidewall of the linear motor $LM_1$, an internal space of the linear motor $LM_1$ can be efficiently used. Consequently, an improvement in space efficiency resulting from the connector arrangement can be achieved.

Inside the linear motor $LM_2$, the first connector 100 and the third connector 300 may be electrically connected by a trunk line $TC_2$. It is preferred that the trunk line $TC_2$ be arranged along the side face or sidewall of the linear motor $LM_2$. The trunk line $TC_2$ may be formed as a circuit on a board. By arranging the board along the side face or sidewall of the linear motor $LM_2$, an internal space of the linear motor $LM_2$ can be efficiently used. Consequently, an improvement in space efficiency resulting from the connector arrangement can be achieved.

More specifically, as shown in FIG. 3, the first connector 101 is composed of a plug holder 101a (referred to below as a "first plug holder" (101a)) and a tab holder 101b (referred to below as a "first tab holder" (101b)), the second connector 201 is composed of a housing 201a and a tab holder 201b (referred to below as a "second tab holder" (201b)), and the third connector 301 is composed of, for example, a plug holder 301a alone. The first linear motor $LM_1$ and the second linear motor $LM_2$ can be connected in the series direction by the first connector 101.

A plurality of electrical wires 120 may be arranged in the housing 201a of the second connector 201. The number of electrical wires 120 arranged is not particularly limited. The plurality of electrical wires 120 can be connected to a hub connector (not shown), and bundled into a single main cable 140. The main cable 140 can be further connected to a controller 150 such as a computer (PC). The controller 150 can control the linear motors ($LM_1$, $LM_2$), and also function as a power supply.

The third connector 301 (for example, the plug holder 301a) may be used for connection to the third linear motor $LM_3$ (not shown), or may function as an end cap. The first connector 101 (specifically, the first plug holder 101a) and the second connector 201 (specifically, the second tab holder 201b) may be electrically connected, preferably by the board, inside the first linear motor $LM_1$. The first connector 101 (specifically, the first tab holder 101*b*) and the third connector 301 (specifically, the plug holder 301*a*) may be electrically connected, preferably by the board, inside the second linear motor $LM_2$.

By making the shape of the first plug holder 101*a* and the shape of the plug holder 301*a* substantially identical to each other, for example, as shown in FIG. 3, in other words, by using common plug holders, connection of the linear motors can be made more efficient. In addition, by making the shape of the first tab holder 101*b* and the shape of the second tab holder 201*b* substantially identical to each other, in other words, by using common tab holders, connection of the linear motors can be made more efficient.

A "plug holder" in the present disclosure is a member that can be electrically connected to a trunk line (TC) that may be arranged inside a linear motor, and can form a portion of the connector together with a "tab holder" that will be described later in detail. A terminal and/or a contact and/or the like may be attached to the inside of the "plug holder". The shape of the "plug holder" is not particularly limited, but may be, for example, a rectangular cuboid, preferably a plate-like rectangular cuboid. Material that constitutes the "plug holder" is not particularly limited. For example, it is preferred that the "plug holder" be composed of insulating plastic. The "plug holder" does not necessarily hold a plug.

A "tab holder" in the present disclosure is a member that can be electrically connected to a trunk line (TC) that may be arranged inside a linear motor, and can form a portion of the connector together with the above "plug holder" or with a "housing" or a "tab holder" that will be described later in detail. A terminal and/or a contact and/or the like attached to the tab holder. The shape of the "tab holder" is not particularly limited, but may be, for example, a rectangular cuboid, preferably a plate-like rectangular cuboid. Material that constitutes the "tab holder" is not particularly limited. For example, it is preferred that the "tab holder" be composed of insulating plastic. The "tab holder" does not necessarily hold a tab.

A "housing" in the present disclosure is a member that can be used for connection to the outside of a linear motor, in particular, for connection to an electrical wire, and can form a portion of the connector together with the above "tab holder". A terminal and/or a contact and/or the like may be attached to the inside of the "housing". The shape of the "housing" is not particularly limited, but may be, for example, a rectangular cuboid, preferably a plate-like rectangular cuboid. Material that constitutes the "housing" is not particularly limited. For example, it is preferred that the "housing" be composed of insulating plastic.

Connectors of the present disclosure will be briefly described below with reference to a first embodiment (or a concept 1) to a sixteenth embodiment (or a concept 16) thereof, and then the connectors of the present disclosure will be described in detail.

First Embodiment (or Concept 1)

Connectors according to the first embodiment (or the concept 1) are shown in FIGS. 4 and 5(A)-5(C).

In the first embodiment, a first connector 101 for connecting a first linear motor $LM_1$ and a second linear motor $LM_2$, a second connector 201 for connecting six electrical wires (121*a* (for a main power supply) (four in number), 121*b* (for a temperature sensor) (two in number)) and the first linear motor $LM_1$, and a third connector 301 (only a plug holder 301*a* is shown) connected to the second linear motor $LM_2$ are arranged in alignment along a series direction on side faces (the XZ plane (see FIGS. 1 and 2) of the linear motors ($LM_1$, $LM_2$).

The first connector 101 has a first plug holder 101*a* and a first tab holder 101*b*. The first plug holder 101*a* and the first tab holder 101*b* are arranged facing each other along the series direction, and can be coupled by engaging them together. See FIG. 31(A)-31(C).

The linear motors ($LM_1$, $LM_2$) can be electrically connected together by the first plug holder 101*a* and the first tab holder 101*b*.

The second connector 201 has a housing 201*a* and a second tab holder 201*b*. The housing 201*a* and the second tab holder 201*b* are arranged facing each other along the series direction, and can be coupled by engaging them together. The electrical wires and the first linear motor $LM_1$ can be electrically connected together by the housing 201*a* and the second tab holder 201*b*.

The first plug holder 101*a* and the second tab holder 201*b* may be electrically connected together inside the first linear motor $LM_1$, and the first tab holder 101*b* and the plug holder 301*a* may be electrically connected together inside the second linear motor $LM_2$.

The plug holder 101*a* may have a substantially identical shape to the plug holder 301*a*, and the tab holder 101*b* may have a substantially identical shape to the second tab holder 201*b*.

A "substantially identical shape" in the present disclosure generally means having a similar shape in terms of appearance so as to be replaceably or alternatively usable.

Second Embodiment (or Concept 2)

Connectors according to the second embodiment (or the concept 2) are shown in FIGS. 6 and 7(A)-7(C).

The second embodiment is characterized in that electrical wires (122*a* (four in number), 122*b* (two in number)) are arranged in two rows. For example, the electrical wires 122*a* are for a main power supply, and the electrical wires 122*b* are for a temperature sensor.

In the second embodiment, a first connector 102 for connecting a first linear motor $LM_1$ and a second linear motor $LM_2$, a second connector 202 for connecting six electrical wires (122*a*, 122*b*) and the first linear motor $LM_1$, and a third connector (only a plug holder 302*a* is shown) connected to the second linear motor $LM_2$ are arranged in alignment along a series direction on side faces of the linear motors ($LM_1$, $LM_2$).

The first connector 102 has a first plug holder 102*a* and a first tab holder 102*b*. The first plug holder 102*a* and the first tab holder 102*b* are arranged facing each other along the series direction, and can be coupled by mutual engagement.

The linear motors ($LM_1$, $LM_2$) can be electrically connected together by the first plug holder 102*a* and the first tab holder 102*b*.

The second connector 202 has a housing 202*a* and a second tab holder 202*b*. The housing 202*a* and the second tab holder 202*b* are arranged facing each other along the series direction, and can be coupled by mutual engagement. The electrical wires and the first linear motor $LM_1$ can be electrically connected together by the housing 202*a* and the second tab holder 202*b*.

The first plug holder 102*a* and the second tab holder 202*b* may be electrically connected together inside the first linear motor $LM_1$, and the first tab holder 102*b* and the plug holder 302*a* may be electrically connected together inside the second linear motor $LM_2$.

The plug holder 102a may have a substantially identical shape to the plug holder 302a, and the tab holder 102b may have a substantially identical shape to the second tab holder 202b.

Third Embodiment (Concept 3)

Connectors according to the third embodiment are shown in FIGS. 8 and 9(A)-9(C).

The third embodiment is similar to the first embodiment, but designed for lower voltage (for example, the first embodiment for 500 V, the third embodiment for 250V).

In the third embodiment, a first connector 103 for connecting a first linear motor $LM_1$ and a second linear motor $LM_2$, a second connector 203 for connecting six electrical wires (121a (four in number), 121b (two in number)) and the first linear motor $LM_1$, and a third connector (only a plug holder 303a is shown) connected to the second linear motor $LM_2$ are arranged in alignment along a series direction on side faces of the linear motors ($LM_1$, $LM_2$).

The first connector 103 has a first plug holder 103a and a first tab holder 103b. The first plug holder 103a and the first tab holder 103b are arranged facing each other along the series direction, and can be coupled by mutual engagement.

The linear motors ($LM_1$, $LM_2$) can be electrically connected together by the first plug holder 103a and the first tab holder 103b.

The second connector 203 has a housing 203a and a second tab holder 203b. The housing 203a and the second tab holder 203b are arranged facing each other along the series direction, and can be coupled by mutual engagement. The electrical wires and the first linear motor $LM_1$ can be electrically connected together by the housing 203a and the second tab holder 203b.

The first plug holder 103a and the second tab holder 203b may be electrically connected together inside the first linear motor $LM_1$, and the first tab holder 103b and the plug holder 303a may be electrically connected together inside the second linear motor $LM_2$.

The plug holder 103a may have a substantially identical shape to the plug holder 303a, and the tab holder 103b may have a substantially identical shape to the second tab holder 203b.

Fourth Embodiment (or Concept 4)

Connectors according to the fourth embodiment (or the concept 4) are shown in FIGS. 10 and 11(A)-11(C).

In the fourth embodiment, a first connector 104 for connecting a first linear motor $LM_1$ and a second linear motor $LM_2$, a second connector 204 for connecting six electrical wires (121a (for a main power supply) (four in number), 121b (for a temperature sensor) (two in number)) and the first linear motor $LM_1$, and a third connector (only a plug holder 304a is shown) connected to the second linear motor $LM_2$ are arranged in alignment along a series direction on side faces of the linear motors ($LM_1$, $LM_2$).

The first connector 104 has a first plug holder 104a and a first tab holder 104b. The first plug holder 104a and the first tab holder 104b are arranged facing each other along the series direction, and can be coupled by mating them together.

The linear motors ($LM_1$, $LM_2$) can be electrically connected together by the first plug holder 104a and the first tab holder 104b.

The second connector 204 has a housing 204a and a second tab holder 204b. The housing 204a and the second tab holder 204b are arranged facing each other along the series direction, and can be coupled by mutual engagement. The electrical wires and the first linear motor $LM_1$ can be electrically connected together by the housing 204a and the second tab holder 204b.

The first plug holder 104a and the second tab holder 204b may be electrically connected together inside the first linear motor $LM_1$, and the first tab holder 104b and the plug holder 304a may be electrically connected together inside the second linear motor $LM_2$.

The plug holder 104a may have a substantially identical shape to the plug holder 304a, and the tab holder 104b may have a substantially identical shape to the second tab holder 204b.

Fifth Embodiment (or Concept 5)

Connectors according to the fifth embodiment (or the concept 5) are shown in FIGS. 12 and 13(A)-13(C).

The fifth embodiment is similar to the fourth embodiment, but designed for lower voltage (for example, the fourth embodiment for 500V, the fifth embodiment for 250V).

In the fifth embodiment, a first connector 105 for connecting a first linear motor $LM_1$ and a second linear motor $LM_2$, a second connector 205 for connecting six electrical wires (121a (for a main power supply) (four in number), 121b (for a temperature sensor) (two in number)) and the first linear motor $LM_1$, and a third connector (only a plug holder 305a is shown) connected to the second linear motor $LM_2$ are arranged in alignment along a series direction on side faces of the linear motors ($LM_1$, $LM_2$).

The first connector 105 has a first plug holder 105a and a first tab holder 105b. The first plug holder 105a and the first tab holder 105b are arranged facing each other along the series direction and can be coupled by mating them together. The linear motors ($LM_1$, $LM_2$) can be electrically connected together by the first plug holder 105a and the first tab holder 105b.

The second connector 105 has a housing 205a and a second tab holder 205b. The housing 205a and the second tab holder 205b are arranged facing each other along the series direction, and can be coupled by engaging them together. The electrical wires and the first linear motor $LM_1$ can be electrically connected together by the housing 205a and the second tab holder 205b.

The first plug holder 105a and the second tab holder 205b may be electrically connected together inside the first linear motor $LM_1$, and the first tab holder 105b and the plug holder 305a may be electrically connected together inside the second linear motor $LM_2$.

The plug holder 105a may have a substantially identical shape to the plug holder 305a, and the tab holder 105b may have a substantially identical shape to the second tab holder 205b.

Sixth Embodiment (or Concept 6)

Connectors according to the sixth embodiment (or the concept 6) are shown in FIGS. 14 and 15(A)-15(D).

In the sixth embodiment, a first connector 106 for connecting a first linear motor $LM_1$ and a second linear motor $LM_2$, a second connector 206 for connecting six electrical wires (123) and the first linear motor $LM_1$, a third connector (only a plug holder 306a is shown) connected to the second linear motor $LM_2$ are arranged in alignment along a series direction on side faces of the linear motors ($LM_1$, $LM_2$).

The first connector 106 has a first plug holder 106a, a first tab holder 106b, and a relay connector 106c (see FIG. 15(D)). The first plug holder 106a and the first tab holder 106b are arranged facing each other along the series direction, and can be coupled by engaging both of them with the relay connector 106c (see FIG. 15(D)) (see FIGS. 35 to 36). The first plug holder 106a and the first tab holder 106b can electrically connect the linear motors (LM$_1$, LM$_2$) together via the relay connector 106c (see FIG. 15(D)).

The second connector 206 has a housing 206a and a second tab holder 206b. The housing 206a and the second tab holder 206b are arranged facing each other along the series direction, and can be coupled by engaging them together. The electrical wires and the first linear motor LM$_1$ can be electrically connected together by the housing 206a and the second tab holder 206b.

The first plug holder 106a and the second tab holder 206b may be electrically connected together inside the first linear motor LM$_1$, and the first tab holder 106b and the plug holder 306a may be electrically connected together inside the second linear motor LM$_2$.

The plug holder 106a may have a substantially identical shape to the plug holder 306a, and the tab holder 106b may have a substantially identical shape to the second tab holder 206b.

Seventh Embodiment (or Concept 7)

Connectors according to the seventh embodiment (or the concept 7) are shown in FIGS. 16 and 17(A)-17(D).

A first connector 107 for connecting a first linear motor LM$_1$ and a second linear motor LM$_2$, a second connector 207 for connecting six electrical wires (123) and the first linear motor LM$_1$, and a third connector (only a plug holder 307a is shown) connected to the second linear motor LM$_2$ may be arranged in alignment along a series direction on side faces of the linear motors (LM$_1$, LM$_2$).

The first connector 107 has a first plug holder 107a, a first tab holder 107b, and a cover 107c (see FIG. 17(D)). The first plug holder 107a and the first tab holder 107b are arranged facing each other, and can be coupled by engaging them together (see FIGS. 38 to 41). The linear motors (LM$_1$, LM$_2$) can be electrically connected together by the first plug holder 107a and the first tab holder 107b.

The first plug holder 107a and the first tab holder 107b may each have a hole such as a threaded hole, through which the cover 107c (see FIG. 17(D)) can be fixed thereto with a fastener such as a screw.

The connector 207 has a housing 207a and a second tab holder 207b. The housing 207a and the second tab holder 207b are arranged facing each other along the series direction, and can be coupled by engaging them together. The electrical wires and the first linear motor LM$_1$ can be electrically connected together by the housing 207a and the second tab holder 207b.

The first plug holder 107a and the second tab holder 207b may be electrically connected together inside the first linear motor LM$_1$, and the first tab holder 107b and the plug holder 307a may be electrically connected together inside the second linear motor LM$_2$.

The plug holder 107a may have a substantially identical shape to the plug holder 307a, and the tab holder 107b may have a substantially identical shape to the second tab holder 207b.

Eighth Embodiment (or Concept 8)

Connectors according to the eighth embodiment (or the concept 8) are shown in FIGS. 18 and 19(A)-19(C).

In the eighth embodiment, a first connector 108 for connecting a first linear motor LM$_1$ and a second linear motor LM$_2$, a second connector 208 for connecting four electrical wires (124) and the first linear motor LM$_1$, and a third connector (only a tab holder 308a is shown) connected to the second linear motor LM$_2$ may be arranged in alignment along a series direction on side faces of the linear motors (LM$_1$, LM$_2$).

The first connector 108 has two identically-shaped tab holders (108a, 108b) (see FIG. 19(B)) and a relay connector 108c (see FIG. 19(C)). The two tab holders (108a, 108b) are arranged facing each other along the series direction, and can be coupled by engaging them with the relay connector 108c. The two tab holders (108a, 108b) can electrically connect the linear motors (LM$_1$, LM$_2$) together via the relay connector 108c. The relay connector 108c includes a slide plate 108d having a lock mechanism (see FIGS. 42 to 44).

The second connector 208 has a housing 208a and a second tab holder 208b. The housing 208a and the second tab holder 208b are arranged facing each other along the series direction, and can be coupled by engaging them together. The electrical wires and the first linear motor LM$_1$ can be electrically connected together by the housing 208a and the second tab holder 208b.

The tab holder 108a and the second tab holder 208b may be electrically connected together inside the first linear motor LM$_1$, and the tab holder 108b and the tab holder 208b may be electrically connected together inside the second linear motor LM$_2$.

The tab holder 108a may have a substantially shape to the tab holder 308a, and the tab holder 108b may have a substantially shape to the second tab holder 208b.

Ninth Embodiment (or Concept 9)

Connectors according to the ninth embodiment (or the concept 9) are shown in FIGS. 20 and 21(A)-21(C).

The ninth embodiment is similar to the eighth embodiment, but designed for lower voltage (for example, the eighth embodiment for 500V, the ninth embodiment for 250V). They also have different numbers of electrical wires used.

In the ninth embodiment, a first connector 109 for connecting a first linear motor LM$_1$ and a second linear motor LM$_2$, a second connector 209 for connecting six electrical wires (123) and the first linear motor LM$_1$, and a third connector (only a tab holder 309a is shown) connected to the second linear motor LM$_2$ may be arranged in alignment along a series direction on side faces of the linear motors (LM$_1$, LM$_2$).

The first connector 109 has two identically-shaped tab holders (109a, 109b) (see FIG. 21(B)) and a relay connector 109c (see FIG. 21(C)). The two tab holders (109a, 109b) are arranged facing each other along the series direction, and can be coupled by engaging them with the relay connector 109c. The two tab holders (109a, 109b) can electrically connect the linear motors (LM$_1$, LM$_2$) together via the relay connector 109c. The relay connector 109c includes a slide plate having a lock mechanism. See FIGS. 42-44(B), 50(A) and 50(B), and 51(A) and 51(B).

The second connector 209 has a housing 209a and a second tab holder 209b. The housing 209a and the second tab holder 209b are arranged facing each other along the series direction, and can be coupled by engaging them together. The electrical wires and the first linear motor LM$_1$ can be electrically connected together by the housing 209a and the second tab holder 209b.

The tab holder 109*a* and the second tab holder 209*b* may be electrically connected together inside the first linear motor LM₁, and the tab holder 109*b* and the tab holder 309*a* may be electrically connected together inside the second linear motor LM₂.

The tab holder 109*a* may have a substantially identical shape to the tab holder 309*a*, and the tab holder 109*b* may have a substantially identical shape to the second tab holder 209*b*.

Tenth Embodiment (or Concept 10)

Connectors according to the tenth embodiment (or the concept 10) are shown in FIGS. 22 and 23(A)-23(C).

The tenth embodiment is similar to the ninth embodiment, but has a different number of electrical wires used.

In the tenth embodiment, a first connector 110 for connecting a first linear motor LM₁ and a second linear motor LM₂, a second connector 210 for connecting four electrical wires (124) and the first linear motor LM₁, and a third connector (only a tab holder 310*a* is shown) connected to the second linear motor LM₂ may be arranged in alignment along a series direction on side faces of the linear motors (LM₁, LM₂).

The first connector 110 has two identically-shaped tab holders (110*a*, 110*b*) (see FIG. 23(B)) and a relay connector 110*c* (see FIG. 23(C)). The two tab holders (110*a*, 110*b*) are arranged facing each other along the series direction, and can be coupled by engaging them with the relay connector 110*c*. The two tab holders (110*a*, 110*b*) can electrically connect the linear motors (LM₁, LM₂) together via the relay connector 110*c*. The relay connector 110*c* includes a slide plate having a lock mechanism. See FIGS. 42-44, 50 and 51)

The second connector 210 has a housing 210*a* and a second tab holder 210*b*. The housing 210*a* and the second tab holder 210*b* are arranged facing each other along the series direction, and can be coupled by engaging them together. The electrical wires and the first linear motor LM₁ can be electrically connected together by the housing 210*a* and the second tab holder 210*b*.

The tab holder 110*a* and the second tab holder 210*b* may be electrically connected together inside the first linear motor LM₁, and the tab holder 110*b* and the tab holder 310*a* may be electrically connected together inside the second linear motor LM₂.

The tab holder 110*a* may have a substantially identical shape to the tab holder 310*a*, and the tab holder 110*b* may have a substantially identical shape to the second tab holder 210*b*.

Eleventh Embodiment (or Concept 11)

In the eleventh embodiment, a first connector for connecting a first linear motor and a second linear motor, a second connector for connecting six electrical wires and the first linear motor, and a third connector connected to the second linear motor are arranged in alignment along a series direction on side faces of the linear motors.

The first connector has two differently-shaped tab holders and a relay connector. The two tab holders are arranged facing each other along the series direction, and can be coupled by engaging them with the relay connector. The two tab holders can electrically connect the linear motors together via the relay connector. The relay connector includes a slide plate having a lock mechanism. See FIGS. 42 to 44(B), 50(A) and 50(B), and 51(A) and 51(B).

The second connector has a housing and a second tab holder. The housing and the second tab holder are arranged facing each other along the series direction, and can be coupled by engaging them together. The electrical wires and the first linear motor can be electrically connected together by the housing and the second tab holder. The housing has an engaging portion for engaging with the second tab holder. See FIGS. 45-47(B).

The tab holder and the second tab holder may be electrically connected together inside the first linear motor, and one of the tab holders and the third connector may be electrically connected together inside the second linear motor. It should be noted that the tab holders extending in the same direction may have substantially identical shapes.

Twelfth Embodiment (or Concept 12)

In the twelfth embodiment, a first connector for connecting a first linear motor and a second linear motor, a second connector for connecting six electrical wires and the first linear motor, and a third connector connected to the second linear motor may be arranged in alignment along a series direction on side faces of the linear motors.

The first connector has two differently-shaped tab holders and a relay connector. The two tab holders are arranged facing each other along the series direction, and can be coupled by engaging them with the relay connector. The two tab holders can electrically connect the linear motors together via the relay connector. The relay connector includes a slide plate having a lock mechanism. See FIGS. 42-44(B), 50(A) and 50(B), and 51(A) and 51(B).

The second connector has a housing and a second tab holder. The housing and the second tab holder are arranged facing each other along the series direction, and can be coupled by engaging them together. The electrical wires and the first linear motor can be electrically connected together by the housing and the second tab holder. The housing has an engaging portion for engaging with the second tab holder.

One of the two tab holders and the second tab holder may be electrically connected together inside the first linear motor, or the two tab holders may be electrically connected together inside the second linear motor. The tab holders extending in the same direction may have substantially identical shapes. The twelfth embodiment is characterized in that the two tab holders each have a through-hole (one in number) for attachment to a board.

Thirteenth Embodiment (or Concept 13)

In the thirteenth embodiment, a first connector for connecting a first linear motor and a second linear motor, a second connector for connecting four electrical wires and the first linear motor, and a third connector connected to the second linear motor may be arranged in alignment along a series direction on side faces of the linear motors.

The first connector has two identically-shaped tab holders and a relay connector. The two tab holders are arranged facing each other along the series direction, and can be coupled by engaging them with the relay connector. The two tab holders can electrically connect the linear motors together via the relay connector. The relay connector includes a slide plate having a lock mechanism. See FIGS. 44, 50, and 51.

The second connector has a housing and a second tab holder. The housing and the second tab holder are arranged facing each other along the series direction, and can be coupled by mutual engagement. The electrical wires and the first linear motor can be electrically connected together by the housing and the second tab holder. The housing has an engaging portion for engaging with the tab holder.

The tab holder and the second tab holder may be electrically connected together inside the first linear motor, or the two tab holders may be electrically connected together inside the second linear motor. The tab holders extending in the same direction may have substantially identical shapes. The thirteenth embodiment is characterized in that the two tab holders each have through-holes (two in number) for attachment to a board.

Fourteenth Embodiment (or Concept 14)

Connectors according to the fourteenth embodiment (or the concept 14) are shown in FIGS. 24 and 25(A)-25(D).

In the fourteenth embodiment, a first connector 114 for connecting a first linear motor $LM_1$ and a second linear motor $LM_2$, a second connector 214 for connecting six electrical wires (121$a$ (four in number), 121$b$ (two in number)) and the first linear motor $LM_1$, and a third connector (only a tab holder 314$a$ is shown) connected to the second linear motor $LM_2$ may be arranged in alignment along a series direction on side faces of the linear motors ($LM_1$, $LM_2$).

The first connector 114 has two differently-shaped tab holders (114$a$, 114$b$) (see FIGS. 25(B) and 25(C)) and a relay connector 114$c$ (see FIG. 25(D)). The two tab holders (114$a$, 114$b$) are arranged facing each other along the series direction, and can be coupled by engaging them with the relay connector 114$c$. The two tab holders (114$a$, 114$b$) can electrically connect the linear motors ($LM_1$, $LM_2$) together via the relay connector 114$c$. The relay connector 114$c$ includes a slide plate having a lock mechanism. See FIGS. 42-44(B), 50(A) and 50(B), and 51(A) and 51(B).

The second connector 214 has a housing 214$a$ and a second tab holder 214$b$. The housing 214$a$ and the second tab holder 214$b$ are arranged facing each other along the series direction, and can be coupled by engaging them together. The electrical wires and the first linear motor $LM_1$ can be electrically connected together by the housing 214$a$ and the second tab holder 214$b$. The housing 214$a$ has an engaging portion for engaging with the second tab holder 214$b$.

The tab holder 114$a$ and the second tab holder 214$b$ may be electrically connected together inside the first linear motor $LM_1$, and the tab holder 114$b$ and the tab holder 314$a$ may be electrically connected together inside the second linear motor $LM_2$.

The tab holder 114$a$ may have a substantially identical shape to the tab holder 314$a$, and the tab holder 114$b$ may have a substantially identical shape to the second tab holder 214$b$.

The fourteenth embodiment is characterized in that the two tab holders (114$a$, 114$b$) each have through-holes (two in number) for attachment to a board.

Fifteenth Embodiment (or Concept 15)

Connectors according to the fifteenth embodiment (or the concept 15) are shown in FIGS. 26 and 27(A)-27(C).

In the fifteenth embodiment, a first connector 115 for connecting a first linear motor $LM_1$ and a second linear motor $LM_2$, a second connector 215 for connecting four electrical wires (124) and the first linear motor $LM_1$, and a third connector (only a tab holder 315$a$ is shown) connected to the second linear motor $LM_2$ may be arranged in alignment along a series direction on side faces of the linear motors ($LM_1$, $LM_2$).

The first connector 115 has two identically-shaped tab holders (115$a$, 115$b$) (see FIG. 27(B)) and a relay connector 115$c$ (see FIG. 27(C)). The two tab holders (115$a$, 115$b$) are arranged facing each other along the series direction, and can be coupled by engaging them with the relay connector 115$c$. The two tab holders (115$a$, 115$b$) can electrically connect the linear motors ($LM_1$, $LM_2$) together via the relay connector 115$c$. The relay connector 115$c$ includes a slide plate having a lock mechanism. See FIGS. 42-44(B), 50(A) and 50(B), and 51(A) and 51(B).

The second connector 215 has a housing 215$a$ and a second tab holder 215$b$. The housing 215$a$ and the second tab holder 215$b$ are arranged facing each other along the series direction, and can be coupled by engaging them together. The electrical wires and the first linear motor $LM_1$ can be electrically connected together by the housing 215$a$ and the second tab holder 215$b$. The housing 215$a$ has an engaging portion for engaging with the second tab holder 215$b$.

The tab holder 115$a$ and the second tab holder 215$b$ may be electrically connected together inside the first linear motor $LM_1$, and the tab holder 115$b$ and the tab holder 315$a$ may be electrically connected together inside the second linear motor $LM_2$.

The tab holder 115$a$ may have a substantially identical shape to the tab holder 315$a$, and the tab holder 115$b$ may have a substantially identical shape to the second tab holder 215$b$.

The fifteenth embodiment is characterized in that the two tab holders (115$a$, 115$b$) each have through-holes (two in number) for attachment to a board.

Sixteenth Embodiment (or Concept 16)

Connectors according to the sixteenth embodiment (or the concept 16) are shown in FIGS. 28 and 29(A)-29(D).

In the sixteenth embodiment, a first connector 116 for connecting a first linear motor $LM_1$ and a second linear motor $LM_2$, a second connector 216 for connecting four electrical wires (124) and the first linear motor $LM_1$, and a third connector (only a tab holder 316$a$ is shown) connected to the second linear motor $LM_2$ may be arranged in alignment along a series direction on side faces of the linear motors ($LM_1$, $LM_2$).

The first connector 116 has two identically-shaped tab holders (116$a$, 116$b$) (see FIG. 29(B)) and a relay connector 116$c$ (see FIG. 29(C)). The two tab holders (116$a$, 116$b$) are arranged facing each other along the series direction, and can be coupled by engaging them with the relay connector 116$c$. The two tab holders (116$a$, 116$b$) can electrically connect the linear motors ($LM_1$, $LM_2$) together via the relay connector 116$c$. The relay connector 116$c$ includes a slide plate having a lock mechanism. See FIGS. 42-44(B), 50(A) and 50(B), and 51(A) and 51(B).

The second connector 216 has a housing 216$a$ and a second tab holder 216$b$. The housing 216$a$ and the second tab holder 216$b$ are arranged facing each other along the series direction, and can be coupled by engaging together. The electrical wires and the first linear motor $LM_1$ can be electrically connected together by the housing 216$a$ and the second tab holder 216$b$. The housing 216$a$ has an engaging portion for engaging with the second tab holder 216$b$.

The tab holder 116$a$ and the second tab holder 216$b$ may be electrically connected together inside the first linear motor $LM_1$, and the tab holder 116b and the tab holder 316a may be electrically connected together inside the second linear motor $LM_2$.

The tab holder 116a may have a substantially identical shape to the tab holder 316a, and the tab holder 116b may have a substantially identical shape to the tab holder 216b.

The sixteenth embodiment is characterized in that the two tab holders (116a, 116b) each have through-holes (two in number) for attachment to a board.

A "first connector" (100 to 116), a "second connector" (200 to 216), and a "third connector" (300 to 316) will each be described below in detail.

<First Connector>

A first connector (for example, the connectors 100 to 116) is a connector for connecting at least two linear motors ($LM_1$, $LM_2$) in a series direction (see FIGS. 1 and 2).

For example, the first connector (for example, the connectors 101 to 105) may include a first plug holder (for example, the plug holders 101a to 105a) and a first tab holder (for example, the tab holders 101b to 105b). See FIGS. 4-13(C).

The first plug holder and the first tab holder may face each other along a direction of connection of the linear motors ($LM_1$, $LM_2$).

The first plug holder and the first tab holder may be positioned in a recessed portion provided in side faces (the XZ plane) of connecting portions of the two linear motors ($LM_1$, $LM_2$).

The first plug holder may be configured to be attachable to the first linear motor ($LM_1$).

The first tab holder may be configured to be attachable to the second linear motor ($LM_2$).

By connecting the first plug holder and the first tab holder, for example, electrically and/or physically, the first linear motor ($LM_1$) and the second linear motor ($LM_2$) can be connected, for example, electrically and/or physically.

A recessed portion that may be provided in side faces (the XZ plane) of connecting portions of two linear motors means a recessed portion that may be formed by combining two separate facing spaces that may be provided in the bodies of the linear motors.

A space $S_1$ and/or a space $S_2$ may each have a plate-like rectangular cubic shape. The space $S_1$ and the space $S_2$ may have identical or different shapes.

Regarding the space $S_1$ and/or the space $S_2$, their positions in the Z-axis direction are not particular limited.

The space $S_1$ and/or the space $S_2$ can be positioned in the side face (the XZ plane) of the linear motor, and it is preferred that the space $S_1$ and/or the space $S_2$ be positioned at an end portion thereof in a direction of movement of the linear motor.

The linear motor, specifically the body of the linear motor, basically, contains an iron core and a coil. Inside the linear motor, a board, for example, a printed circuit board or the like, may be positioned. The board may be positioned between the spaces $S_1$ and $S_2$ along the side face (the XZ plane) or sidewall of the linear motor. At least a portion of the linear motor may be formed by an overmold. In particular, at least a portion of the side face (the XZ plane) of the linear motor may be formed by an overmold.

The plug holder and/or the tab holder can be positioned in the space $S_1$ and/or the space $S_2$, and the plug holder and/or the tab holder can be electrically connected to the board.

In the present disclosure, the plug holder and/or the tab holder may be electrically connected not by using the board but by, for example, an electrical wire, a conductive wire, or the like, as a trunk line.

In the present disclosure, wiring or a circuit that may be formed inside a linear motor may also be referred to as a trunk line (TC) (see FIG. 2).

The first connector, for example, the first plug holder and the first tab holder, may be positioned substantially flush with the side face or the sidewall of the linear motor. See FIGS. 4 to 29(D).

"Substantially flush" in the present disclosure means that a connector is arranged in a recessed portion or a space that may be provided in a linear motor without prominently rising or protruding from a face constituting the linear motor, in other words, without prominently rising or protruding in a direction perpendicular to a series direction or a direction of movement or a direction of connection of linear motors.

The connector may be buried by 80% or more, preferably 90% or more, more preferably 95% or more, of its volume in the recessed portion that may be provided in the linear motor.

The connector may be raised or protruded by, for example, 20% or more, preferably 10% or more, more preferably 5% or more, of its thickness, on a length basis, from the recessed portion that may be provided in the linear motor.

It is particularly preferred that the connector be arranged in the recessed portion that may be provided in the linear motor such that the connector has a surface flush with a face constituting the linear motor. The connector may be completely buried in the recessed portion that may be provided in the linear motor.

By positioning the first plug holder and the first tab holder substantially flush with the side faces of the linear motors, the possibility is significantly reduced that the first plug holder and the first tab holder may interfere with motion in the series direction or the direction of movement or the direction of connection of the linear motors.

At least a portion of the first plug holder may be inserted into a portion of the first tab holder. See FIGS. 4-13(C). Alternatively, at least a portion of the first tab holder may be inserted into a portion of the first plug holder.

The first plug holder and/or the first tab holder may have a protruding portion and/or a recessed portion formed so as to serve as a guide for the insertion.

By inserting at least a portion of the first plug holder into a portion of the first tab holder (see FIGS. 4-13(C)) and/or inserting at least a portion of the first tab holder into a portion of the first plug holder, their electrical and/or physical connection can be more reliably formed.

An engaging portion provided to the first plug holder and an engaging portion provided to the first tab holder may be coupled together. See FIGS. 4-9(C).

Taking as an example the first plug holder 101a and the first tab holder 101b of the first connector 101 shown in FIGS. 4 and 5(A)-5(C), their engaging portions will be described in detail with reference to FIGS. 31(A)-31(C).

Figure 31:
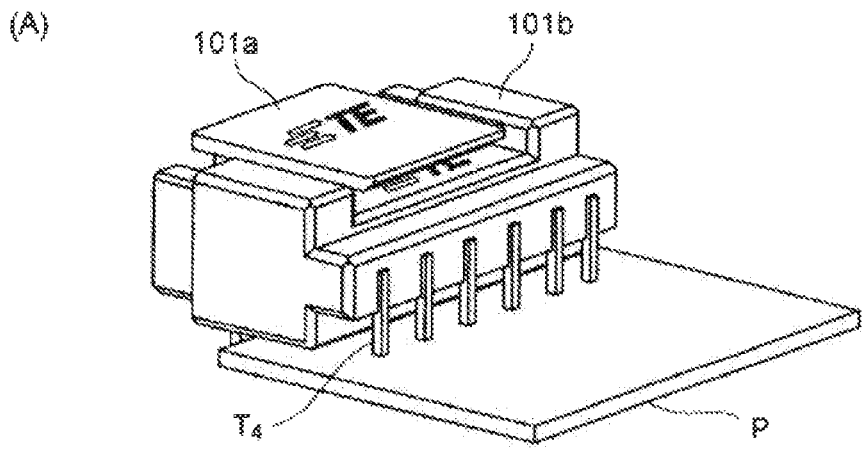
FIG. 31 is a schematic diagram schematically showing engagement between a plug holder and a tab holder.
Figure 31:
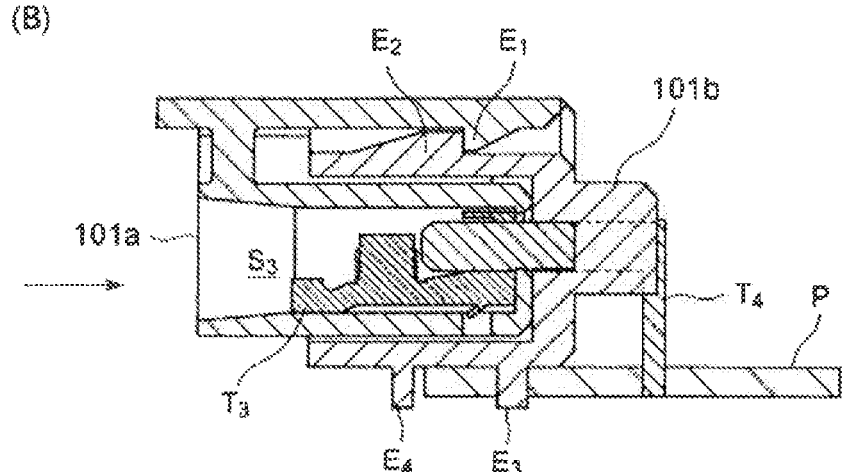
Figure 31:
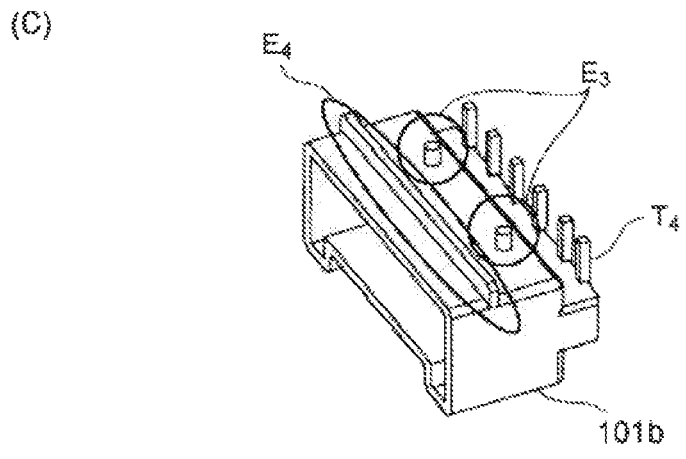

FIG. 31(A) shows an engaged and coupled state of the first plug holder 101a and the first tab holder 101b of the first connector 101.

FIG. 31(B) illustrates internal structures of the first plug holder 101a and the first tab holder 101b.

The first plug holder 101a may have a space S3 provided therein that can accommodate, for example, electrical wires (see FIG. 45) (see FIG. 31(B)).

By coupling the first plug holder 101a and the first tab holder 101b, a terminal $T_4$ provided in the first tab holder 101b may be inserted and positioned into the first plug holder 101a.

Inside the first plug holder 101*a*, a terminal T3 and the terminal $T_4$ of the first tab holder 101*b* may contact each other, thereby forming electrical contact, in other words, an electrical contact point.

Inside the first plug holder 101*a*, the terminal T3 may be connected to the electrical wire (not shown) or a trunk line (not shown).

As shown in FIG. 31(B), the first plug holder 101*a* has an engaging portion $E_1$, and the first tab holder 101*b* has an engaging portion $E_2$. The engaging portion $E_1$ and the engaging portion $E_2$ may be configured to be engaged with and caught on each other. The shapes of the engaging portion $E_1$ and the engaging portion $E_2$ are not particularly limited. Locations at which the engaging portion $E_1$ and the engaging portion $E_2$ may be formed are not particularly limited, either.

The terminal $T_4$ of the first tab holder 101*b* may be electrically connected to the board by soldering, and the board can be arranged in the linear motor.

The first tab holder 101*b* may have a protruding portion (specifically a boss) as an engaging portion $E_3$ for engaging with a board P, and may have a protruding portion (specifically a rib) as an engaging portion $E_4$, on a portion (a bottom portion) thereof that may face the board P (see FIG. 31(C)). The shapes of the engaging portion $E_3$ and the engaging portion $E_4$ are not particularly limited. The board P may have a through-hole formed therein for receiving the engaging portion $E_3$ or the like (see FIG. 31(B)).

Since the first plug holder and/or the first tab holder have their respective engaging portions, the first plug holder and/or the first tab holder can be prevented from being disengaged, thus forming an electrical and/or physical connection more reliably.

The first plug holder and the first tab holder do not have to be directly electrically connected. In this case, the first connector may further include a relay connector for electrically connecting the first plug holder and the first tab holder. See FIGS. 14-15(D) and 35-36.

Figure 14:
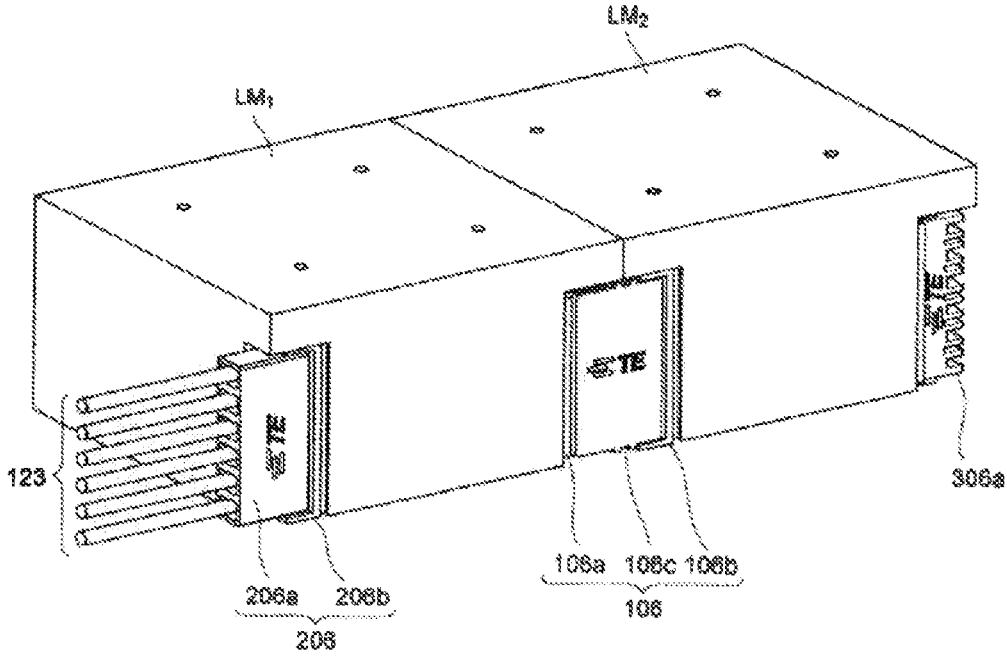
FIG. 14 is a schematic diagram schematically showing connectors according to a sixth embodiment of the present disclosure.
Figure 15:
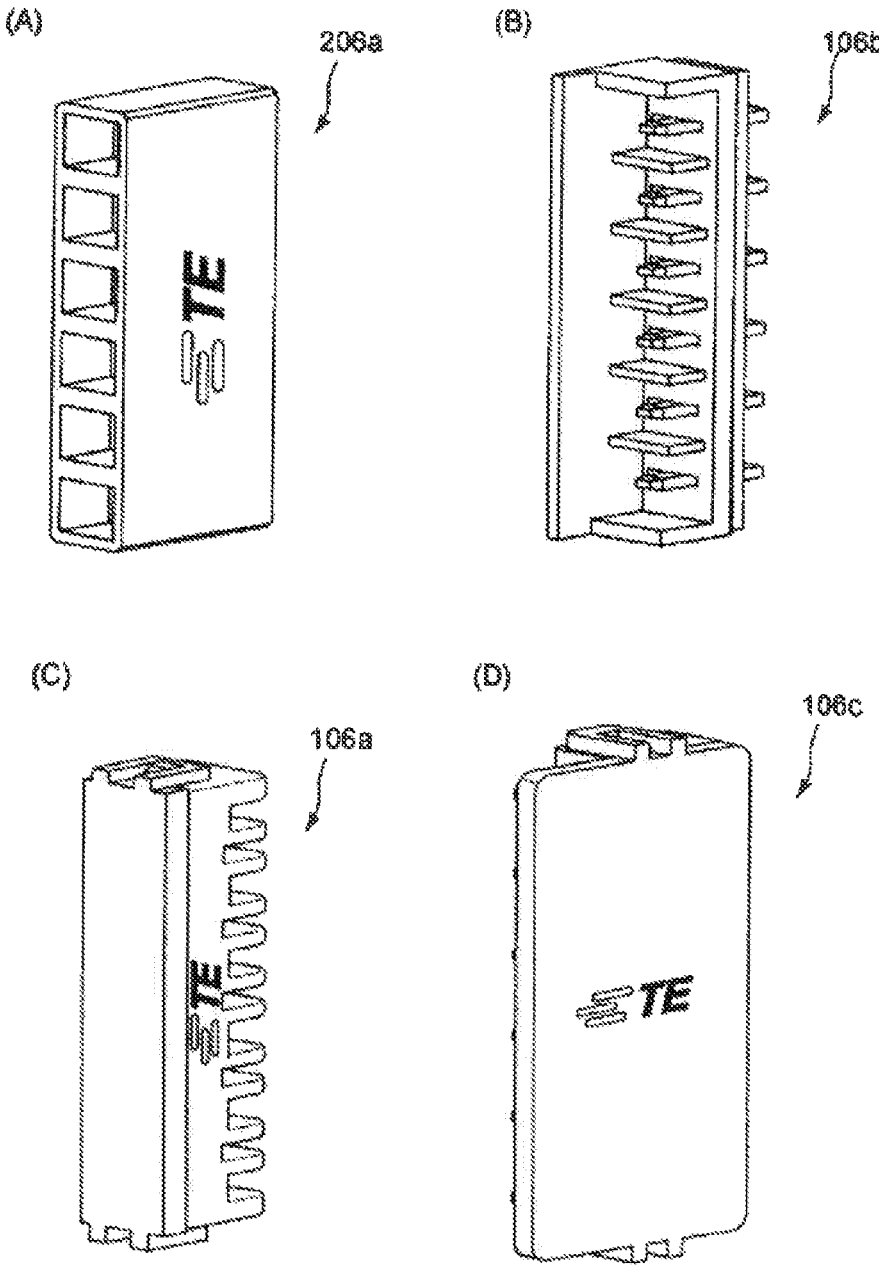
FIG. 15 is a schematic diagram schematically showing (A) a housing 206*a*, (B) a tab holder 106*b*, (C) a plug holder 106*a*, and (D) a relay connector 106*c*.
Figure 16:
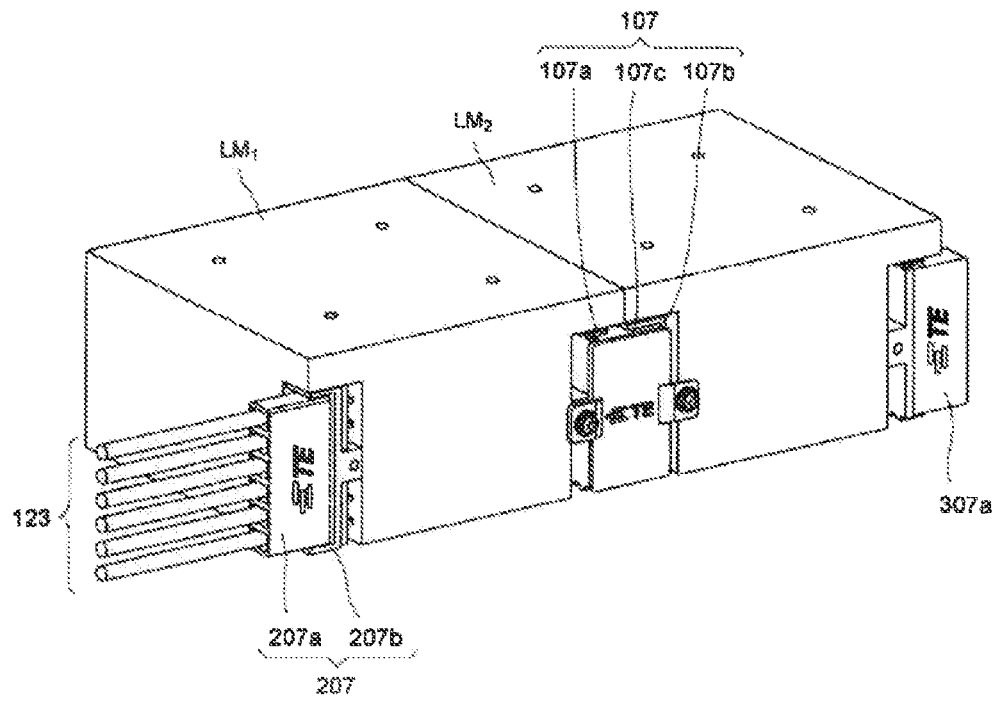
FIG. 16 is a schematic diagram schematically showing connectors according to a seventh embodiment of the present disclosure.
Figure 17:
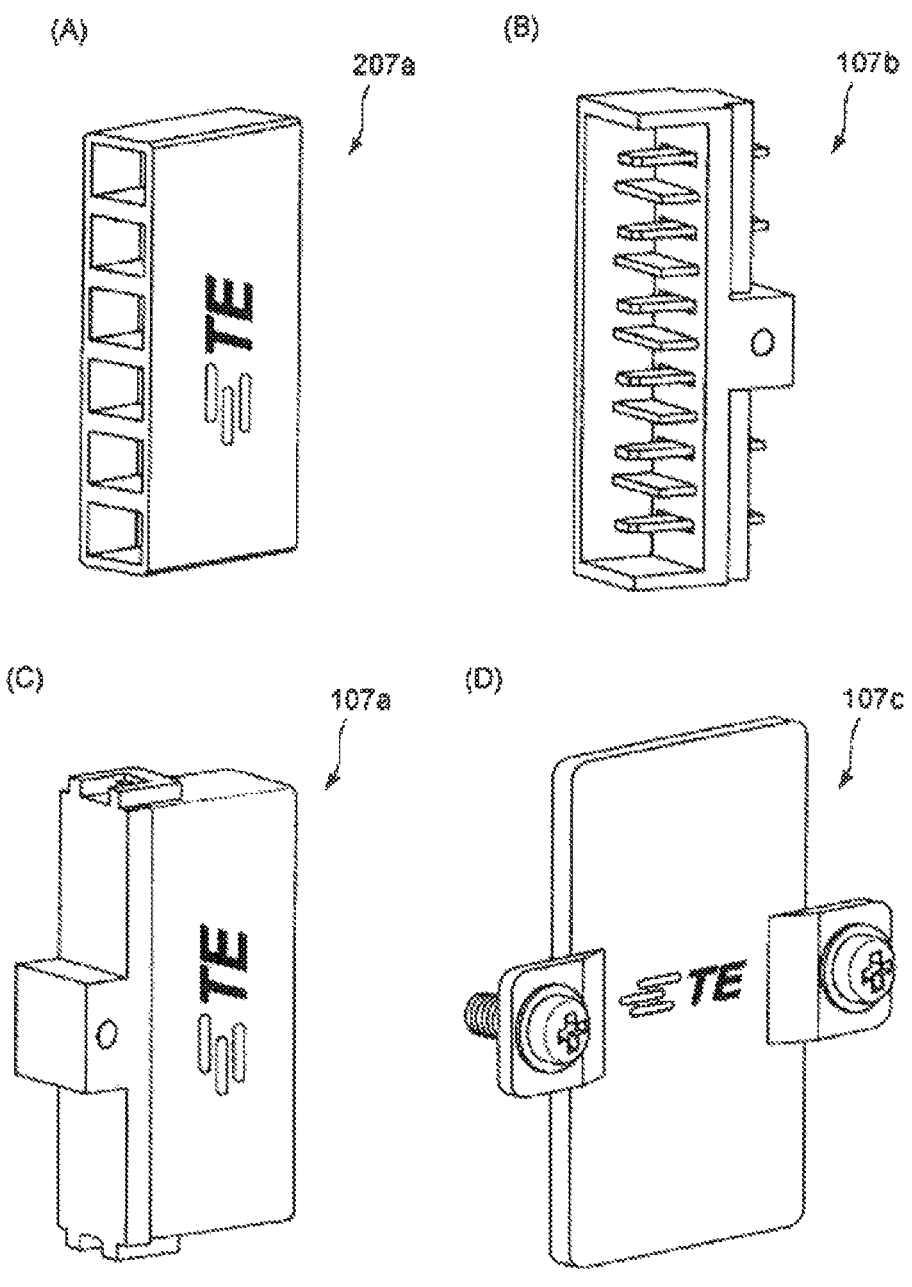
FIG. 17 is a schematic diagram schematically showing (A) a housing 207*a*, (B) a tab holder 107*b*, (C) a plug holder 107*a*, and (D) a cover 107*c*.
Figure 18:
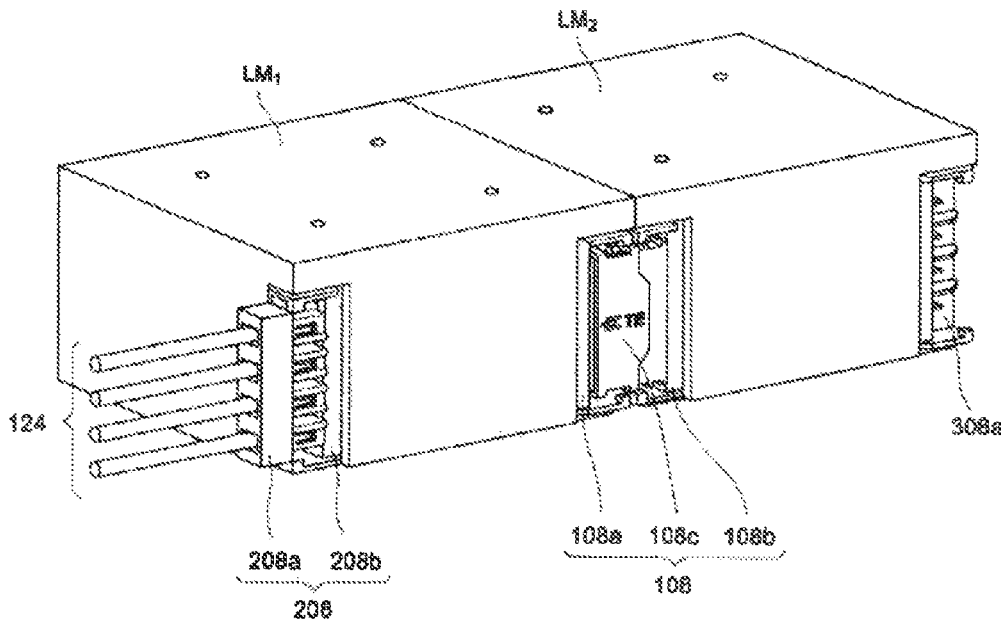
FIG. 18 is a schematic diagram schematically showing connectors according to an eighth embodiment of the present disclosure.
Figure 19:
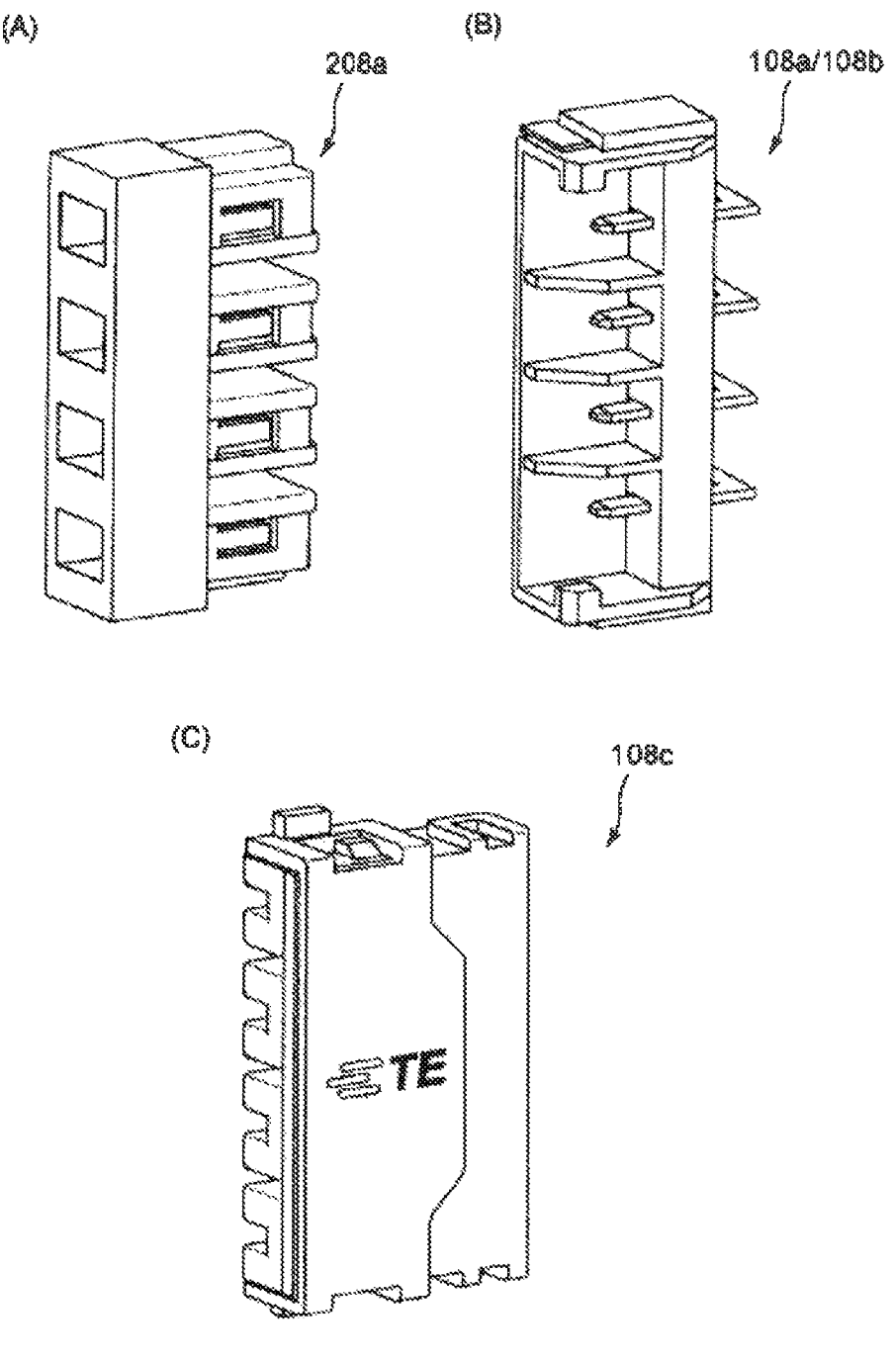
FIG. 19 is a schematic diagram schematically showing (A) a housing 208*a*, (B) a tab holder 108*a*/108*b*, and (C) a relay connector 108*c*.
Figure 20:
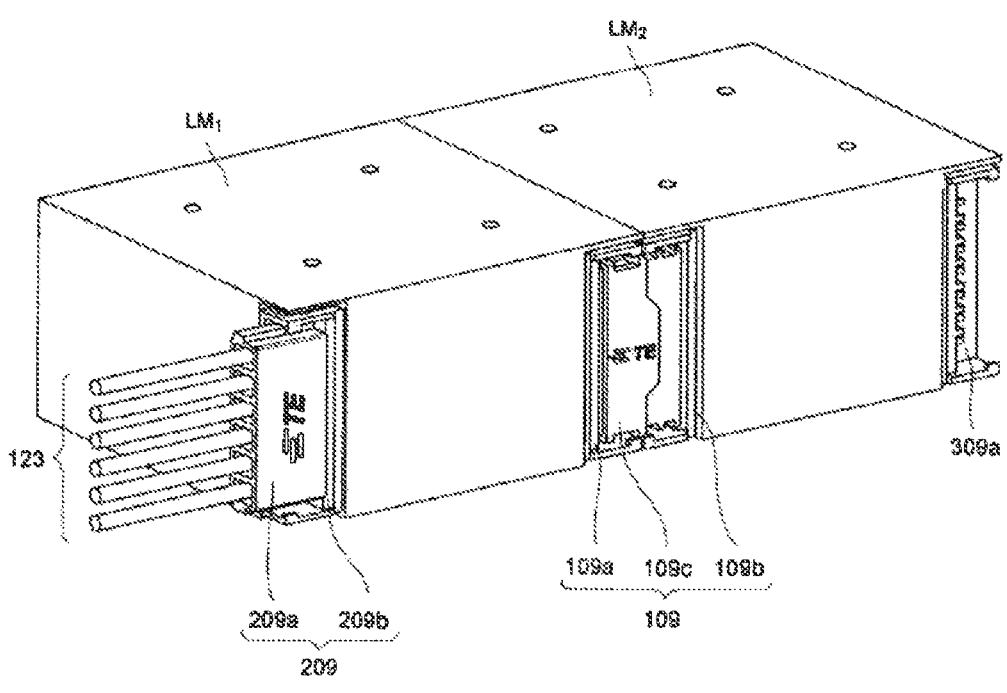
FIG. 20 is a schematic diagram schematically showing connectors according to a ninth embodiment of the present disclosure.
Figure 21:
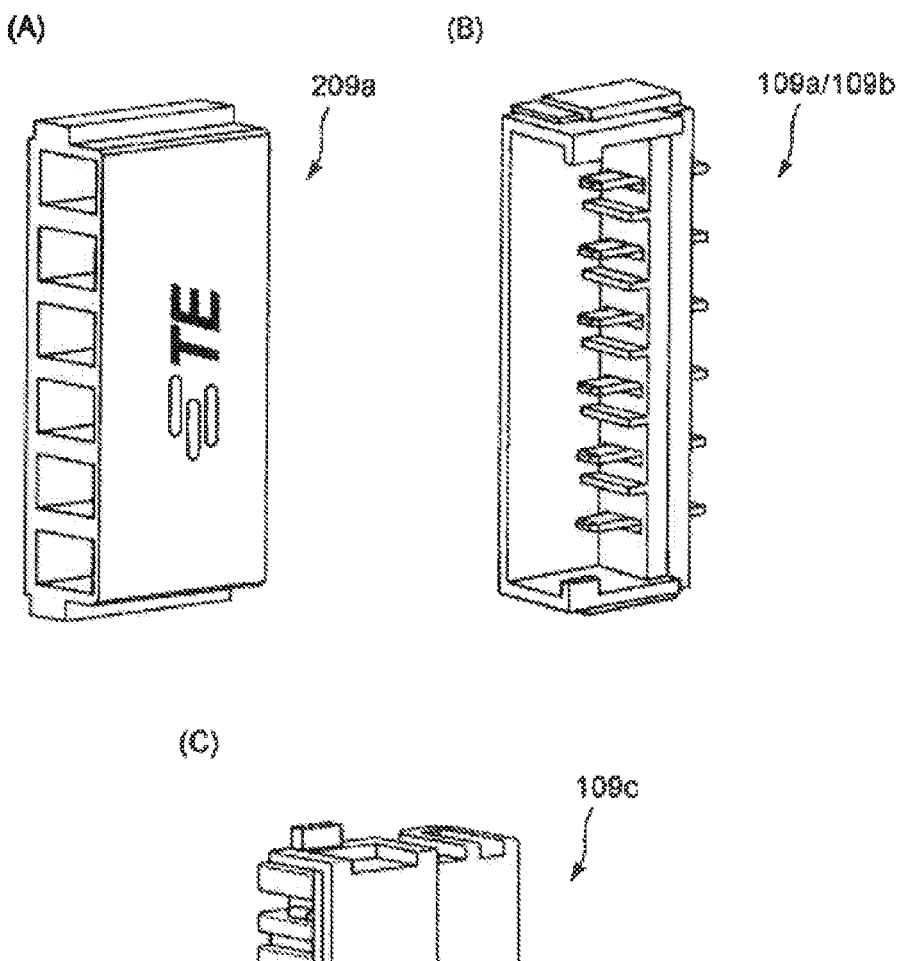
FIG. 21 is a schematic diagram schematically showing (A) a housing 209*a*, (B) a tab holder 109*a*/109*b*, and (C) a relay connector 109*c*.
Figure 22:
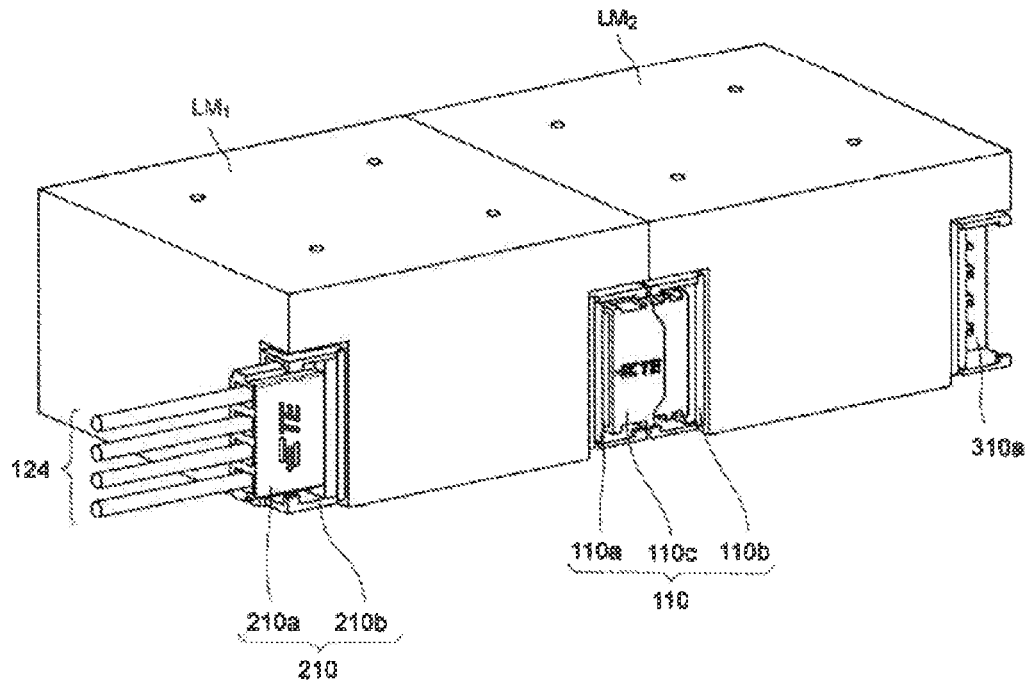
FIG. 22 is a schematic diagram schematically showing connectors according to a tenth embodiment of the present disclosure.
Figure 23:
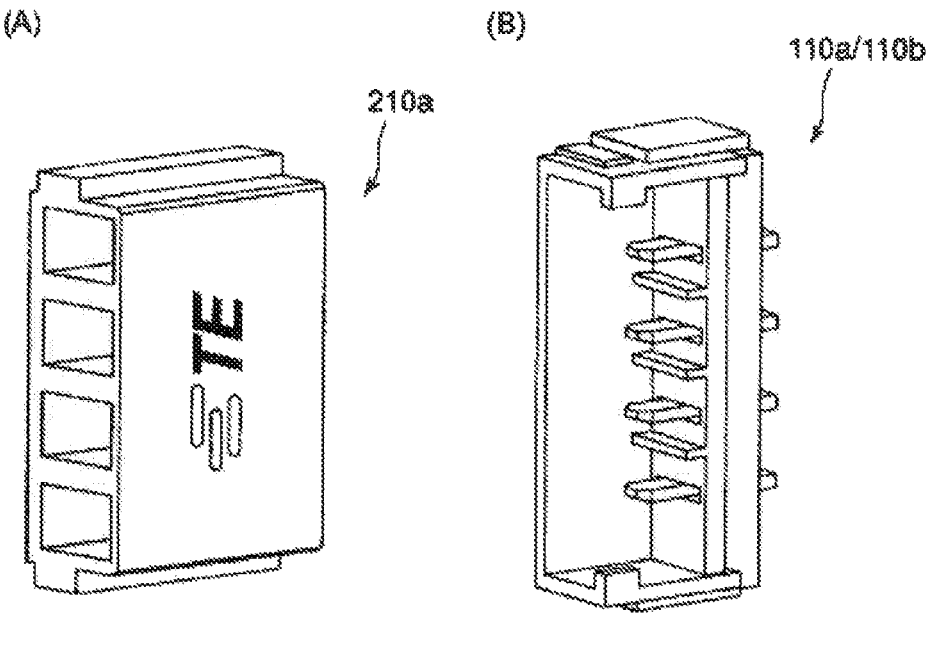
FIG. 23 is a schematic diagram schematically showing (A) a housing 210*a*, (B) a tab holder 110*a*/110*b*, and (C) a relay connector 110*c*.
Figure 23:
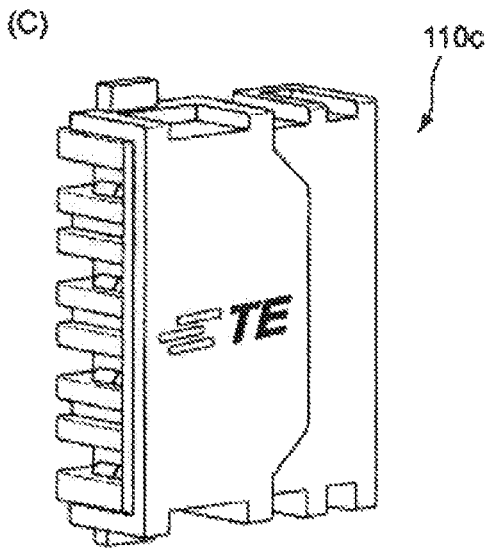

Regarding the first connector (106) shown in FIGS. 14-15(D), for example, the relay connector (106*c*) will be described in detail with reference to FIGS. 35 and 36.

Figure 35:
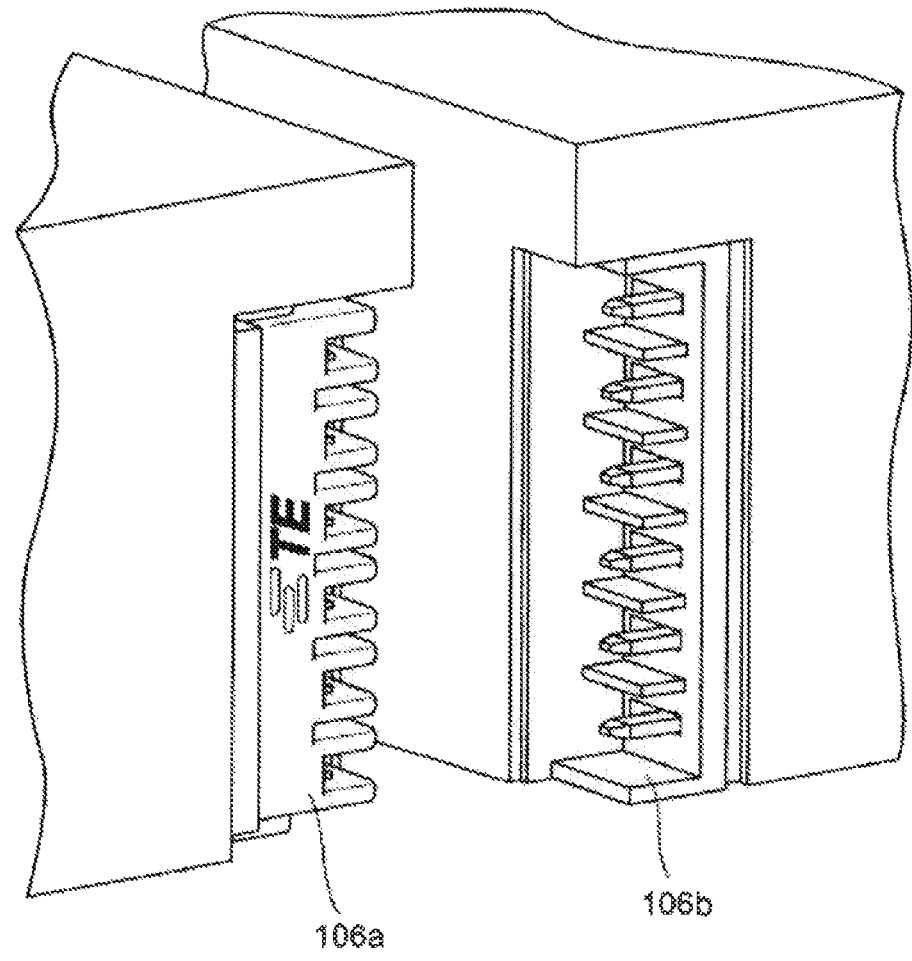
FIG. 35 is a schematic diagram schematically showing a relation between the plug holder and the tab holder in the sixth embodiment.

For example, as shown in FIG. 35, the first plug holder 106*a* can be attached to the side face of the first linear motor, the first tab holder 106*b* can be attached to the side face of the second linear motor, and the first plug holder 106*a* and the first tab holder 106*b* can be aligned in the direction of connection of the linear motors.

Figure 36:
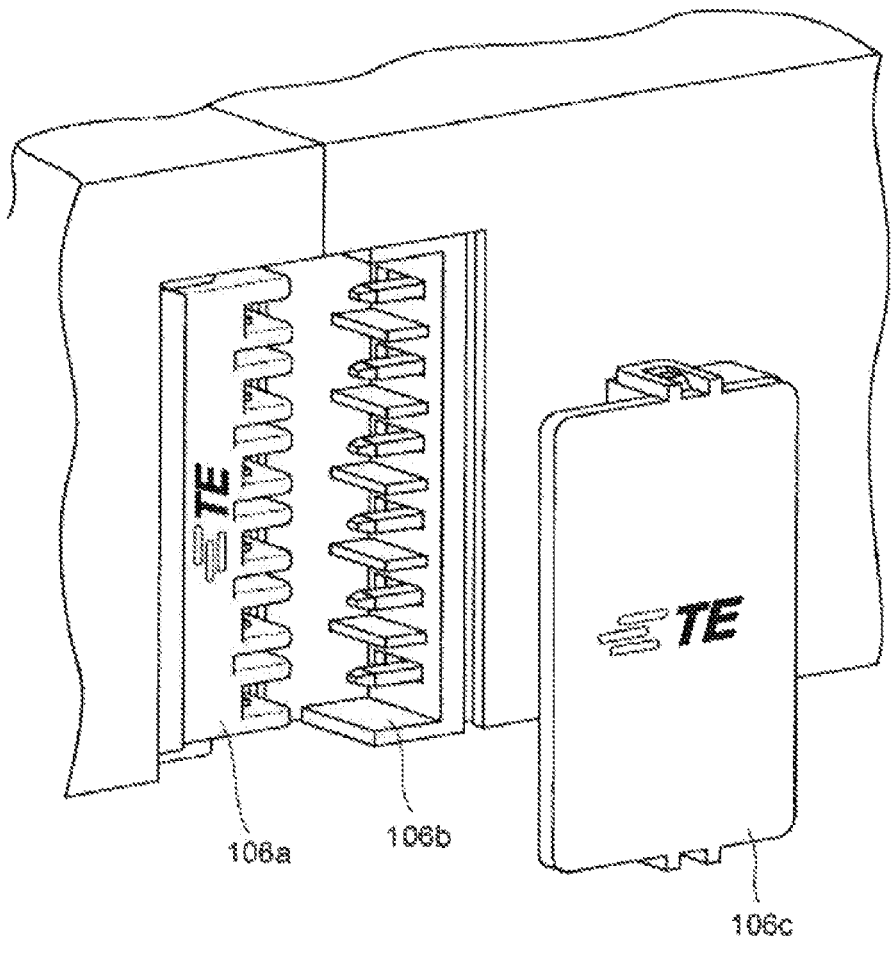
FIG. 36 is a schematic diagram schematically showing a relation between the plug holder, the tab holder, and the relay connector in the sixth embodiment.

For example, as shown in FIG. 36, a terminal and/or a contact and/or the like may be provided in each of the first plug holder 106*a* and the first tab holder 106*b*, and the relay connector 106*c* having a terminal and/or a contact and/or the like having a shape adaptable to the shape of each terminal and/or contact and/or the like can be attached to both the first plug holder 106*a* and the first tab holder 106*b*. The relay connector 106*c* can be attached to the first plug holder 106*a* and the first tab holder 106*b* from a direction (the Y direction) perpendicular to the series direction of the linear motors. The relay connector 106*c* can be attached to the first plug holder 106*a* and the first tab holder 106*b*, for example, by engagement and/or mating.

It is preferred that the relay connector 106*c* be configured to be electrically and physically engageable and/or mateable with the first plug holder 106*a* and/or the first tab holder 106*b*.

The relay connector 106*c* can be so formed as to have a flat outer surface, so that the outer surface of the relay connector 106*c* can be arranged more flush with the side faces of the linear motors.

Using the first connector including the first plug holder 106*a*, the first tab holder 106*b*, and the relay connector 106*c* facilitates and ensures connection of the linear motors ($LM_1$, $LM_2$).

Figure 37:
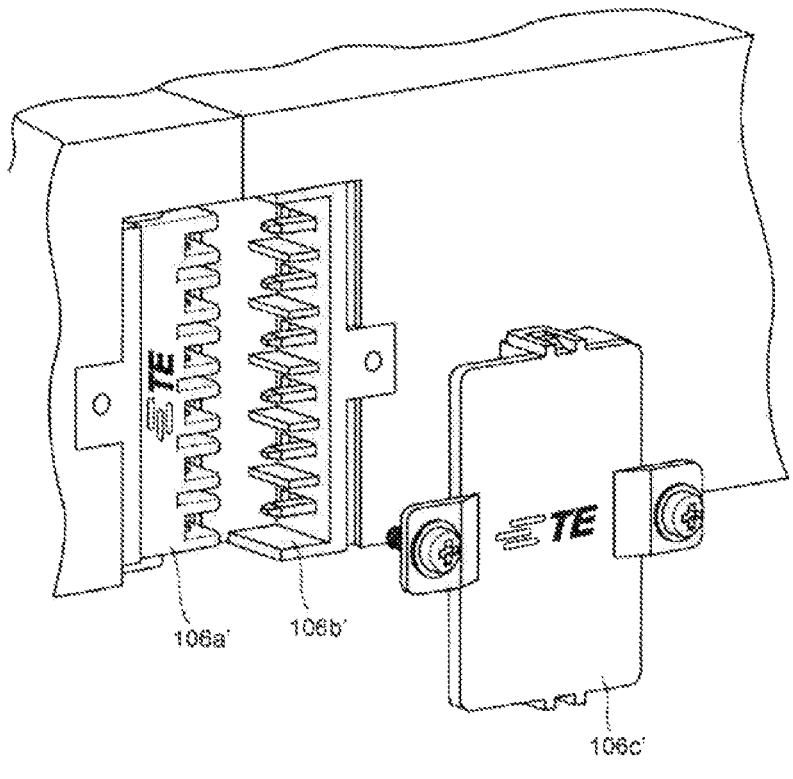
FIG. 37 is a schematic diagram schematically showing a relation between the plug holder, the tab holder, and another relay connector in the sixth embodiment.

Alternatively, as shown in FIG. 37, a first plug holder 106*a*' and/or a first tab holder 106' may have a hole such as a threaded hole, and further the relay connector 106*c*' may also have a hole such as a threaded hole. These holes can be used to fix the first plug holder 106*a*' and the first tab holder 106*b*' more firmly and reliably with fasteners such as screws via the relay connector 106*c*'. The relay connector 106*c*' can also function as a cover. This can more reliably prevent water, dust, and the like from entering the first plug holder 106*a*' and/or the first tab holder 106*b*'.

Such a cover as described above can also be provided in a case where the first plug holder and the first tab holder are directly electrically connected. See FIGS. 16, 17(A)-17(D), and 38-41.

The first connector 107 shown in FIGS. 16 and 17(A)-17(D), for example, includes the first plug holder 107*a*, the first tab holder 107*b*, and the cover 107*c*. More details are as shown in FIGS. 38 to 41.

Figure 38:
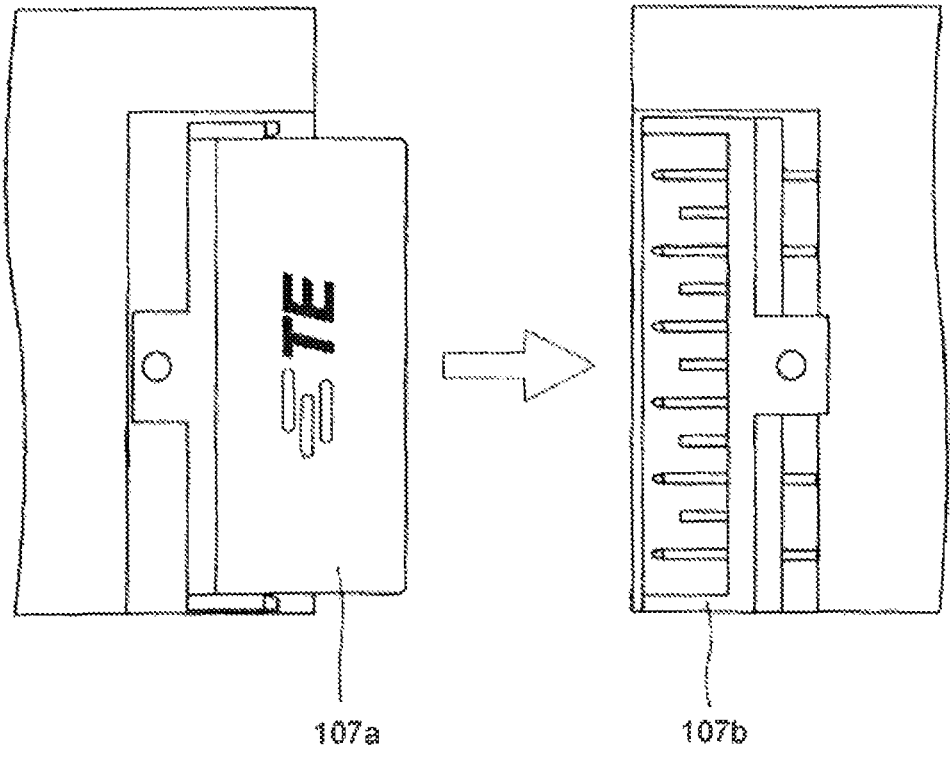
FIG. 38 is a schematic diagram schematically showing a relation between the plug holder and the tab holder in the seventh embodiment.

For example, as shown in FIG. 38, the first plug holder 107*a* and the first tab holder 107*b* can be coupled together by sliding in the series direction (the X direction) of the linear motors.

Figure 39:
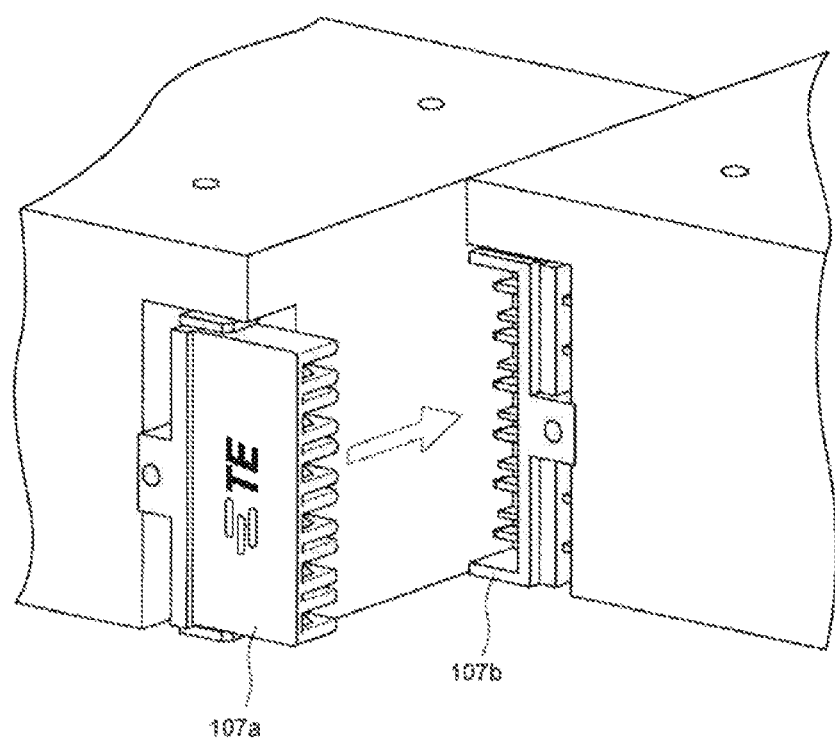
FIG. 39 is a schematic diagram schematically showing a relation between the plug holder and the tab holder in the seventh embodiment.

Alternatively, as shown in FIG. 39, the first plug holder 107*a* and the first tab holder 107*b* can be coupled together by sliding in a direction (the Y direction) perpendicular to the series direction of the linear motors.

Figure 40:
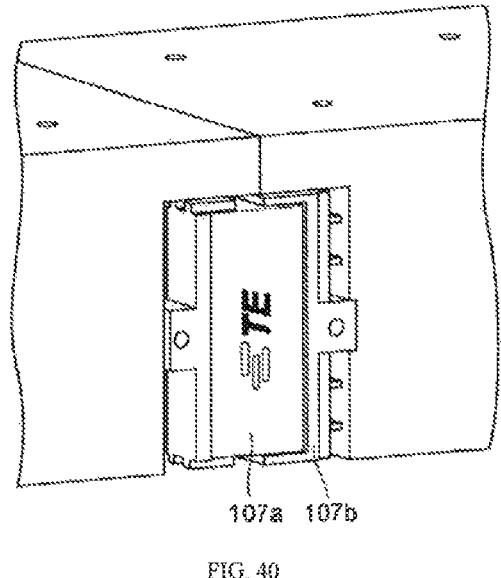
FIG. 40 is a schematic diagram schematically showing the plug holder and the tab holder in their coupled state in the seventh embodiment.

FIG. 40 shows a coupled state of the first plug holder 107*a* and the first tab holder 107*b*.

Figure 41:
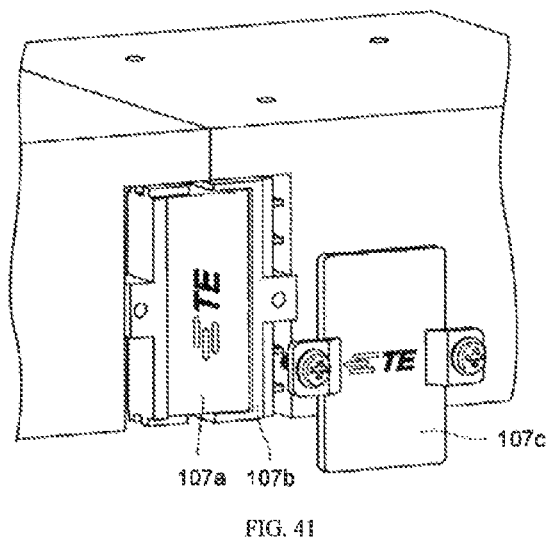
FIG. 41 is a schematic diagram schematically showing a relation between the plug holder, the tab holder, and the cover in the seventh embodiment.

For example, as shown in FIG. 41, the first connector 107 (see FIGS. 16, 17(A)-17(D), and 41) may further include the cover 107*c*, and the first plug holder 107*a*, the first tab holder 107*b*, and the cover 107*c* may be fixed with fasteners such as screws (see FIG. 41).

Therefore, both the first plug holder 107*a* and the first tab holder 107*b* may have a hole such as a threaded hole. The cover 107*c* may also have a hole such as a threaded hole.

These holes can be used to fix the first plug holder 107*a* and the first tab holder 107*b* more firmly and reliably with fasteners such as screws via the cover 107*c*. The cover 107*c* can more reliably prevent water, dust, and the like from entering the first plug holder 107*a* and/or the first tab holder 107*b*.

<Other Forms of First Connector>

Other forms of the first connector are shown in FIGS. 18-29(D). The first connector (for example, the connectors 108 to 116) may be a connector for connecting at least two linear motors ($LM_1$, $LM_2$) in a series direction. The first connector (for example, the connectors 108 to 116) may include two tab holders (for example, the tab holders 108*a* to 116*a*, the tab holders 108*b* to 116*b*) and a relay connector (108*c* to 116*c*) for electrically connecting these two tab holders.

These two tab holders may face each other at least along a direction of connection or the series direction of the linear motors ($LM_1$, $LM_2$).

The two tab holders may be positioned in a recessed portion provided in side faces (the XZ plane) of connecting portions of the two linear motors ($LM_1$, $LM_2$).

The connectors shown in FIGS. 18-29(D) are characterized in that the first connector (for example, the connectors 108 to 116) uses two tab holders (for examples, the tab holders 108*a* to 116*a*, the tab holders 108*b* to 116*b*) in combination.

As shown in FIGS. 18 19(C), FIGS. 20-21(C), FIGS. 22 to 23, FIGS. 26-27(C), and FIGS. 28-29(D), two tab holders having identical shapes may be used. See FIGS. 19(A)-19 (C) and 42)

Figure 24:
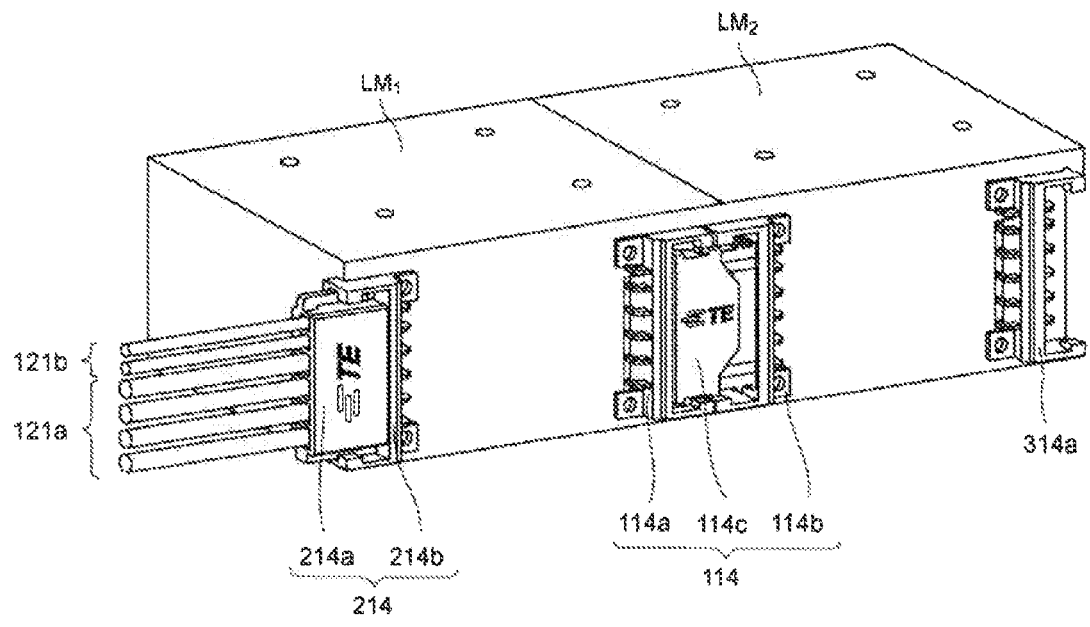
FIG. 24 is a schematic diagram schematically showing connectors according to a fourteenth embodiment of the present disclosure.
Figure 25:
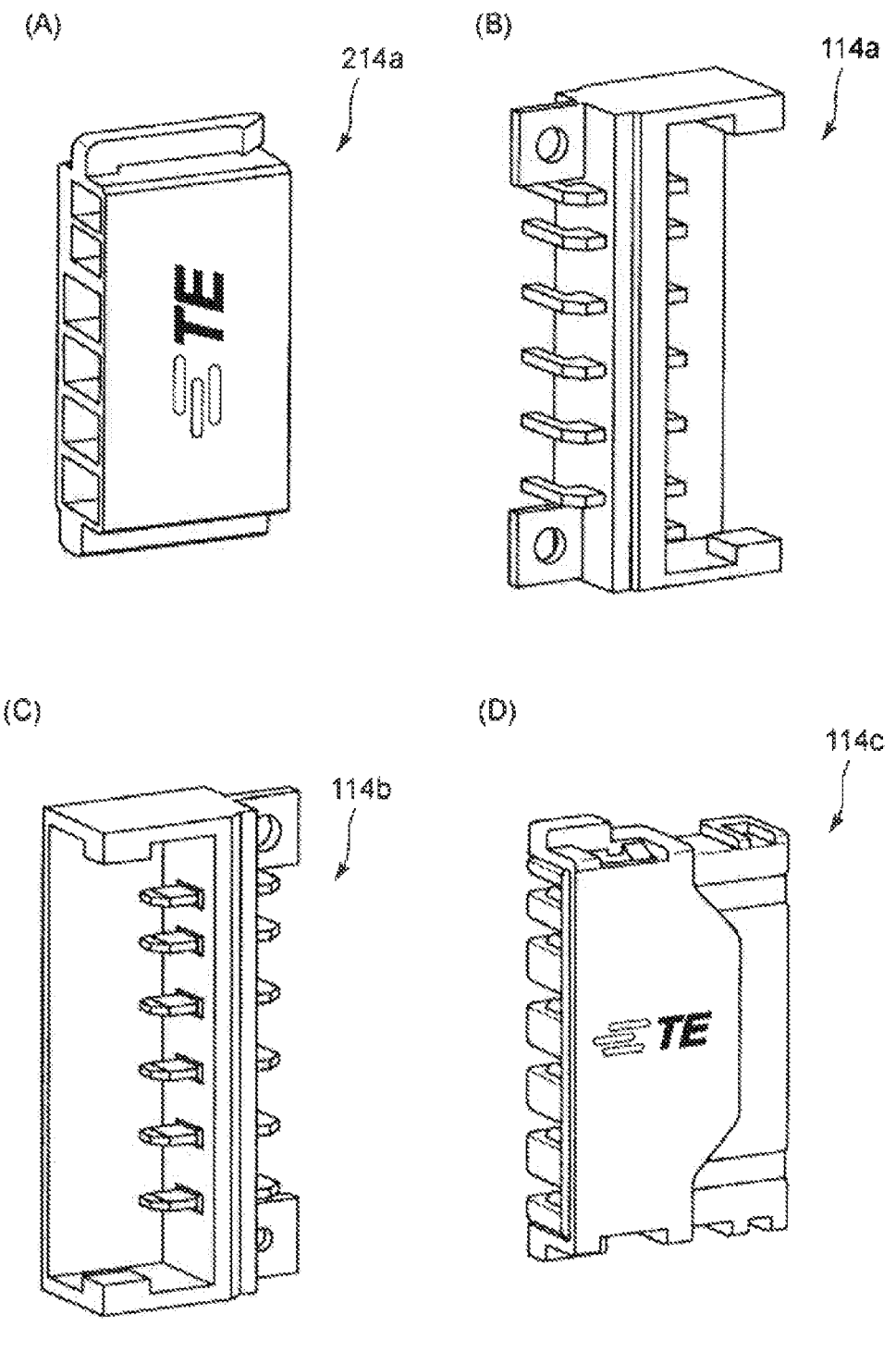
FIG. 25 is a schematic diagram schematically showing (A) a housing 214*a*, (B) a tab holder 114*a*, (C) a tab holder 114*b*, and (D) a relay connector 114*c*.
Figure 26:
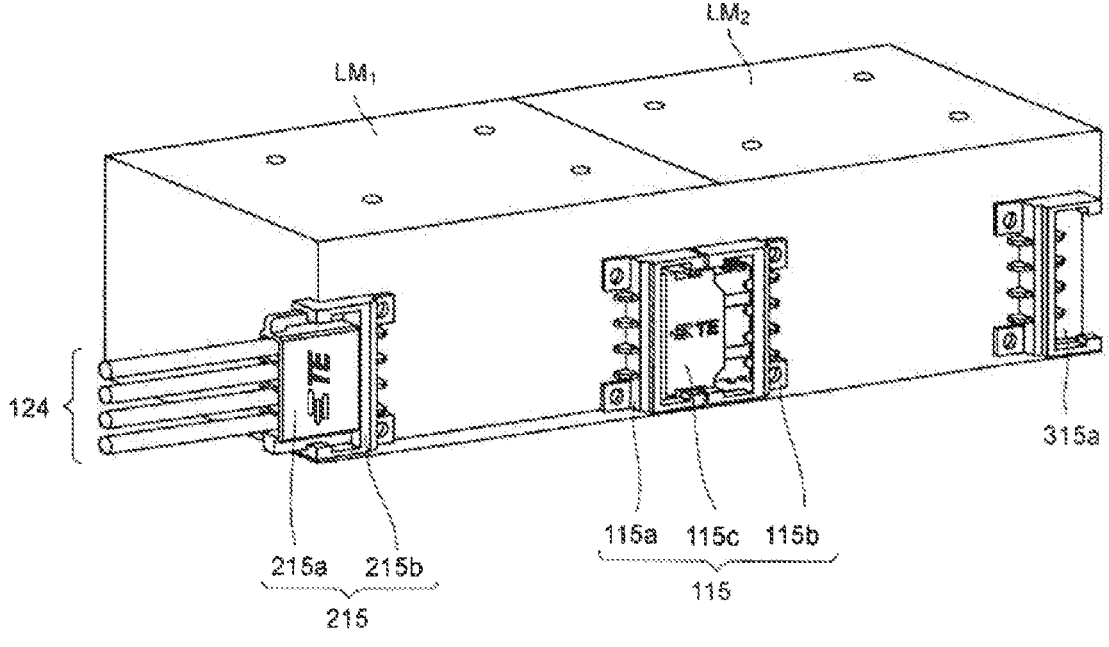
FIG. 26 is a schematic diagram schematically showing connectors according to a fifteenth embodiment of the present disclosure.
Figure 27:
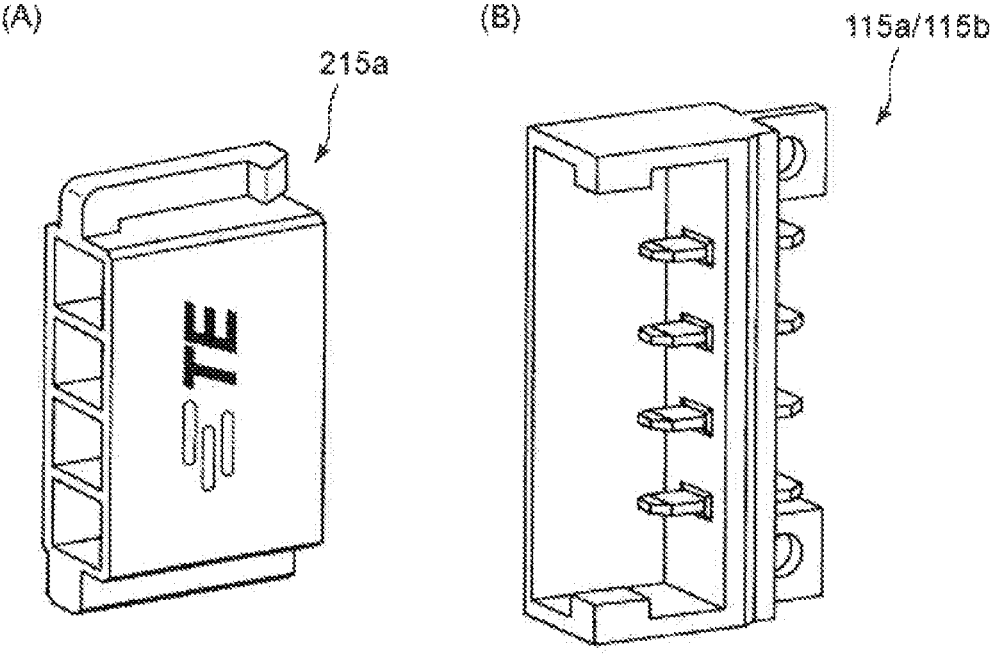
FIG. 27 is a schematic diagram schematically showing (A) a housing 215*a*, (B) a tab holder 115*a*/115*b*, and (C) a relay connector 115*c*.
Figure 27:
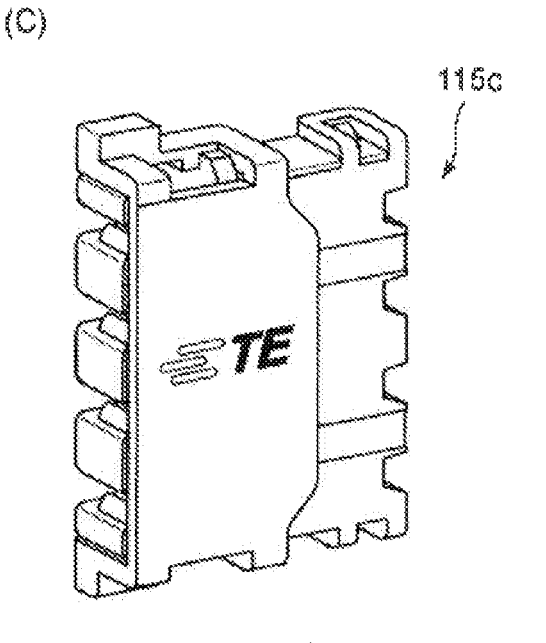
Figure 28:
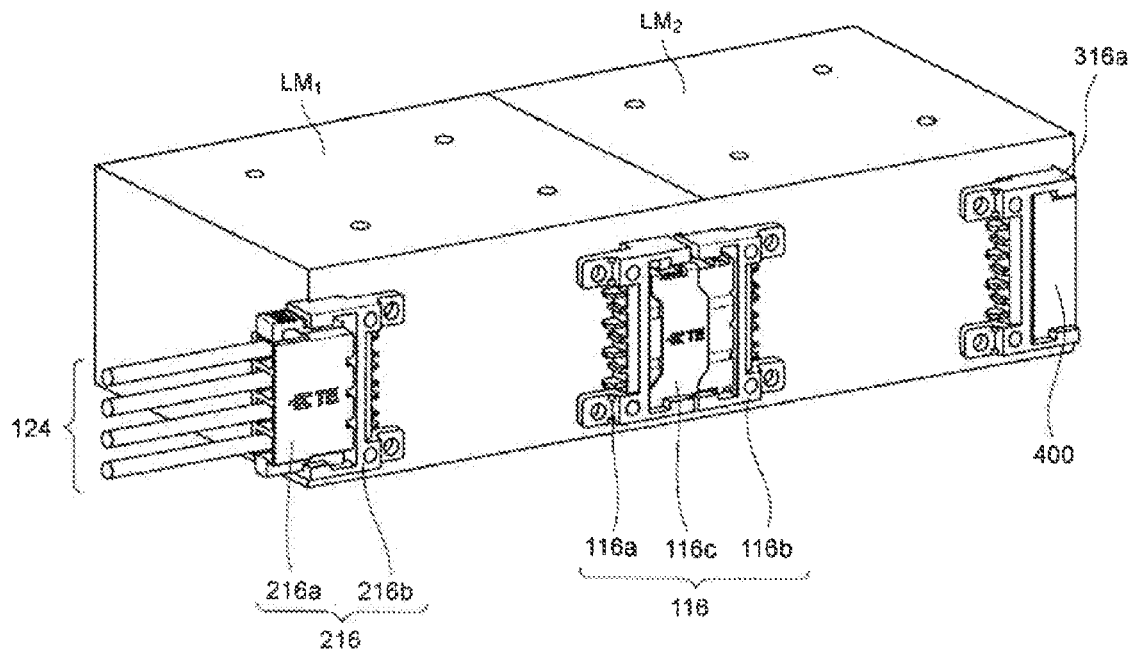
FIG. 28 is a schematic diagram schematically showing connectors according to a sixteenth embodiment of the present disclosure.
Figure 29:
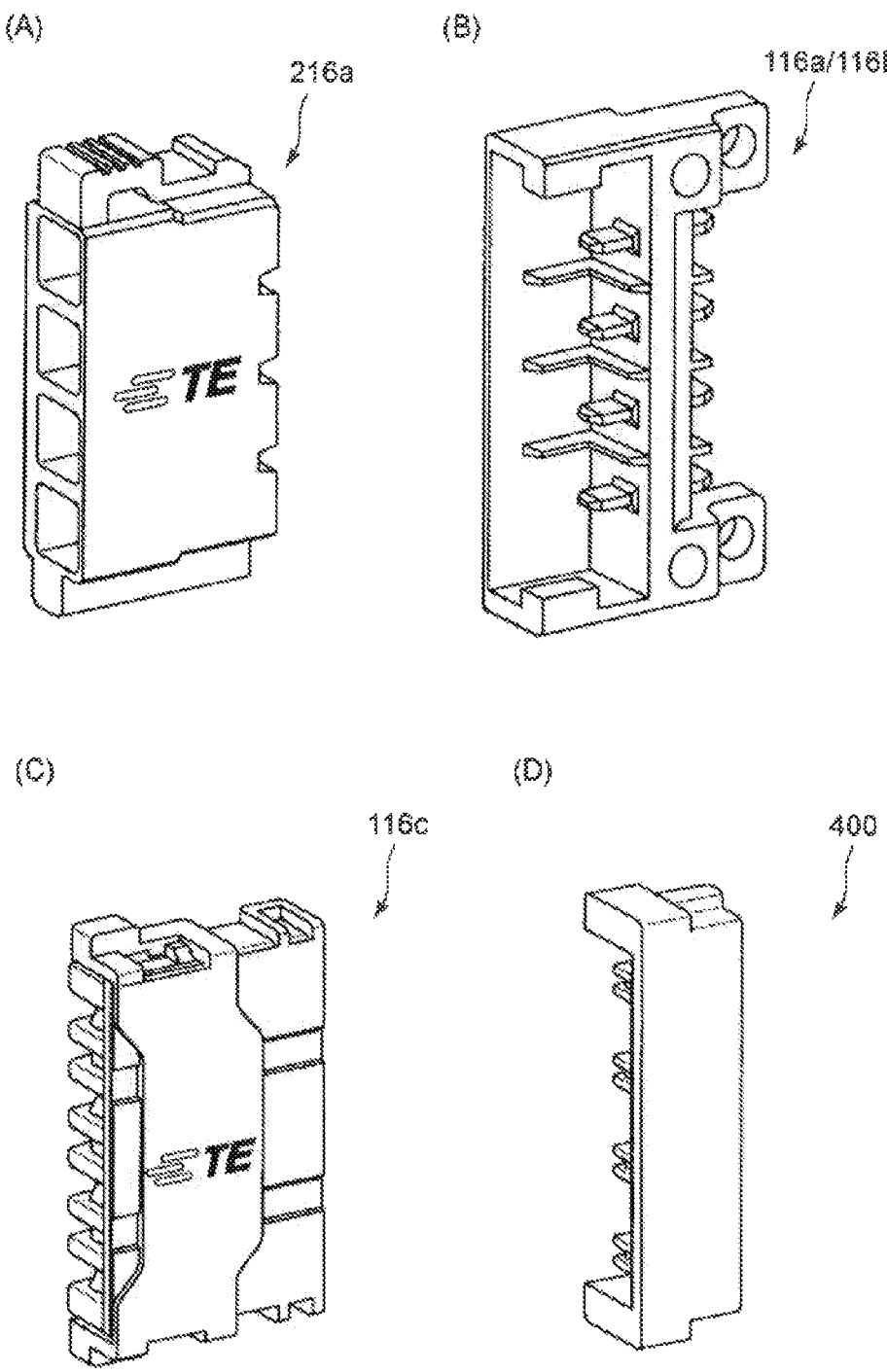
FIG. 29 is a schematic diagram schematically showing (A) a housing 216a, (B) a tab holder 116a/116b, (C) a relay connector 116c, and (D) a cap 400.

Alternatively, as shown in FIGS. 24-25(D), two tab holders having different shapes may be used. See FIGS. 48(A)-48(C) and 49(A)-49(C).

Figure 43:
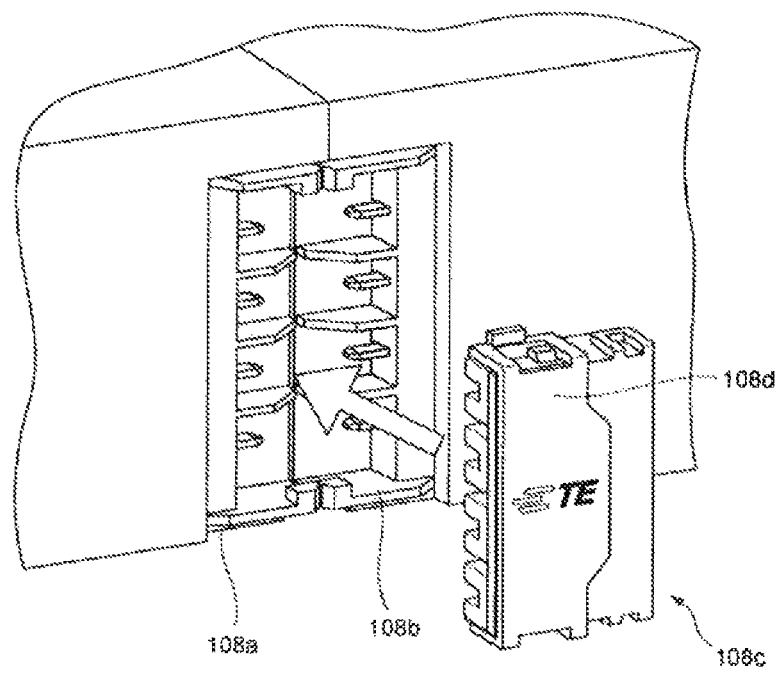
FIG. 43 is a schematic diagram schematically showing a relation between the two tab holders and a relay connector.
Figure 44:
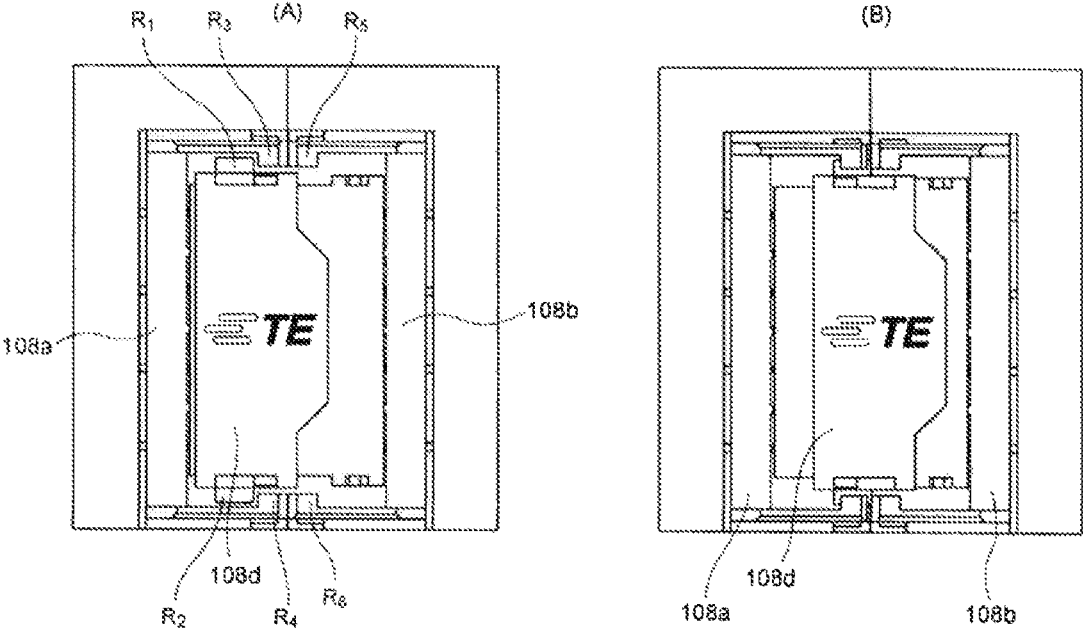
FIG. 44 is a schematic diagram schematically showing a lock mechanism of the relay connector.

The two tab holders may face each other along the direction of connection or the series direction of the linear motors (LM₁, LM₂), but do not have to be electrically connected together (see FIG. 43).

In the first connectors (for example, the connectors 108 to 116) shown in FIGS. 18-29(D), a relay connector (for example, the relay connectors 108c to 116c) for electrically connecting these tab holders may be used. See FIGS. 43 and 44(A) and 44(B).

The relay connector may have a relay mechanism inside for electrically connecting the two tab holders. See FIGS. 50(A) and 50(B), and 51(A) and 51(B).

The relay connectors 108c to 116c shown in FIGS. 18-29(D) will be described in detail below.

<Relay Connector>

Figure 42:
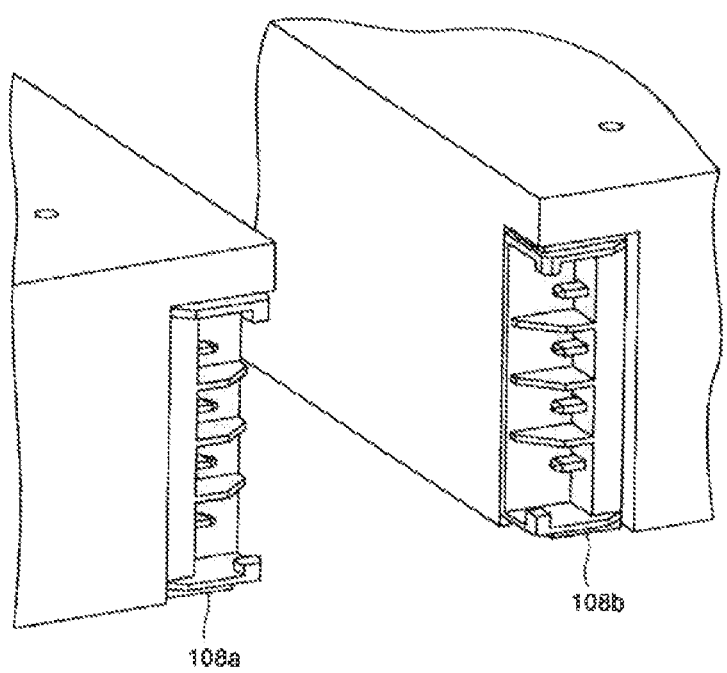
FIG. 42 is a schematic diagram schematically showing a relation between two tab holders.

For example, as shown in FIG. 42, the tab holder 108a can be attached to the side face of the first linear motor, and the tab holder 108b can be attached to the side face of the second linear motor. Both the tab holder 108a and the tab holder 108b can be aligned in the direction of connection of the linear motors.

For example, as shown in FIG. 42, a terminal or a contact may be provided in each of the tab holder 108a and the tab holder 108b, and the relay connector 108c having a terminal (which may alternatively be referred to as a "relay contact" or simply as a "contact") having a shape such as is adapted to the shape of each terminal or contact can be attached to the tab holder 108a and the tab holder 108b (see FIG. 43). The relay connector 108c can be attached to the tab holder 108a and the tab holder 108b from a direction (the Y direction) perpendicular to the series direction of the linear motors. The relay connector 108c can be electrically and physically attached to both the tab holder 108a and the tab holder 108b, for example, by engagement and/or mating.

The relay connector 108c may include the slide plate 108d. See FIGS. 18 to 29(D) and 44(A) and 44(B). The shape of the slide plate 108d is not particularly limited.

It is preferred that the slide plate 108d be attached slidably to the surface of the body of the relay connector 108c (see FIGS. 18 to 29(D) and 44(A) and 44(B)). It is preferred that the slide plate 108d have a surface substantially flush with the surfaces of the linear motors. See FIGS. 18 to 29(D) and 44(A) and 44(B).

The slide plate 108d may have a lock mechanism. Hence, the slide plate 108d can also be referred to as a "lock plate".

For example, as shown in FIGS. 42-44(B), the slide plate 108d may be first positioned above an electrical joining portion of the tab holder 108a. See FIG. 44(A). The slide plate 108d at this time, as viewed from above, can substantially entirely cover the electrical joining portion of the left tab holder 108a, and may be configured to be capable of covering the boundary between the tab holder 108a and the tab holder 108b, or at least a portion of the tab holder 108b. See FIG. 44(A).

The slide plate 108d, in a state shown in FIG. 44(A) (referred to below as an "unlocked state"), may be configured not to substantially contact the left tab holder 108a.

The slide plate 108d, in a state shown in FIG. 44(B) (referred to below as a "locked state"), may be configured to substantially contact the left tab holder 108a and be engaged therewith or caught thereon.

The slide plate 108d, if necessary, may be configured to contact the right tab holder 108b and be engaged therewith or caught thereon.

More specifically, as shown in FIGS. 44(A) and 44(B), the slide plate 108d includes two projecting portions ($R_1$, $R_2$) extending in the Z-axis direction (see FIG. 44(A)). In the form shown, the projecting portion $R_1$ extends upward, and the projecting portion $R_2$ extends downward.

In the "unlocked state" shown in FIG. 44(A), the two projecting portions ($R_1$, $R_2$) are not substantially in contact with the left tab holder 108a.

In the "locked state" shown in FIG. 44(B), the slide plate 108d is slidingly moved, and the two projecting portions ($R_1$, $R_2$) are in contact with portions of the left tab holders 108a (more specifically, two projecting portions ($R_3$, $R_4$) extending in the Z-axis direction of the tab holder 108a). In the form shown, the projecting portion $R_3$ extends downward, and the projecting portion $R_4$ extends upward.

The two projecting portions ($R_1$, $R_2$), if necessary, may contact portions of the right tab holders 108b (more specifically, two projecting portions ($R_5$, $R_6$) extending in the Z-axis direction of the tab holder 108b). In the form shown, the projecting portion $R_5$ extends downward, and the projecting portion $R_6$ extends upward.

The shapes of the projecting portions ($R_1$ to $R_6$) are not particularly limited. They may have a plate-like shape, as in the form shown, or may have another geometric shape. Positions at which the projecting portions ($R_1$ to $R_6$) are arranged are not particularly limited, either.

Since the slide plate (108d) has the lock mechanism, the relay connector (108c) can be significantly prevented from being disengaged from the tab holders (108a, 108b).

In the present disclosure, the relay connectors 109c to 116c shown in FIGS. 20 to 29(A)-29(D) can be configured similarly to the relay connector 108c.

For example, in FIGS. 50(A) and 50(B), the relay connector and the slide plate that can be used in the sixteenth embodiment are shown.

FIG. 50(A) shows an "unlocked state" (lock OFF) by the slide plate 116d.

FIG. 50(B) shows a "locked state" (lock ON) by the slide plate 116d.

As shown in FIGS. 50(A) and 50(B), a protrusion and a recess that can be engaged or mated together and slide on each other may be provided to the body of the relay connector and a back face of the slide plate 116d.

Next, an internal structure of a relay connector will be described with reference to FIGS. 51(A) and 51(B). FIGS. 51(A) and 501(B) shows an internal structure of the relay connector 116c that can be used in the sixteenth embodiment (however, only a "locked state" is shown).

In FIG. 51(A), the two tab holders (116a, 116b) are arranged facing each other, and the relay connector 116c is positioned therebetween. A relay contact is arranged inside the relay connector 116c, and terminals or contacts provided in the two tab holders (116a, 116b) and the relay contact are electrically connected.

In FIG. 51(B), the tab holders (116a, 116b) are shown arranged facing each other on two linear motors (LM₁, LM₂), respectively, with the relay connector 116c positioned between the tab holders (116a, 116b). In addition, the slide plate 116d is shown in a locking position.

In a case where two tab holders are used in the first connector, the two tab holders may have substantially identical shapes. See FIGS. 18-23(C), FIGS. 26-29(D), FIGS. 42-44(B), and FIGS. 50(A) and 50(B).

For example, as shown in FIG. 42, using tab holders (108a, 108b) having identical shapes (see FIG. 19(C)) facilitates arrangement of the tab holders to the linear motors and connection of a plurality of linear motors.

In a case where two tab holders are used in the first connector, the two tab holders may have different shapes. See FIGS. 24-25(D) and 48(A)-49(C).

By using tab holders having different shapes, various kinds of tab holders can be be arranged in linear motors, thus increasing variations of connection of linear motors.

The tab holders may have at least one through-hole (see FIGS. 24-25(D) and 48(A)-49(C)). Through such a through-hole, the tab holder may be fixed to the linear motor, in particular to the board that may be arranged inside the linear motor with a fastener such as a screw. See FIGS. 24-29(D) and 50(A) and 50(B).

In FIGS. 24 to 29, depictions are made with the board visible for the convenience in description. In other words, depictions are made without an overmolded portion (it should be noted that the overmolded portion is indicated by long dashed double-short dashed lines).

Figure 50:
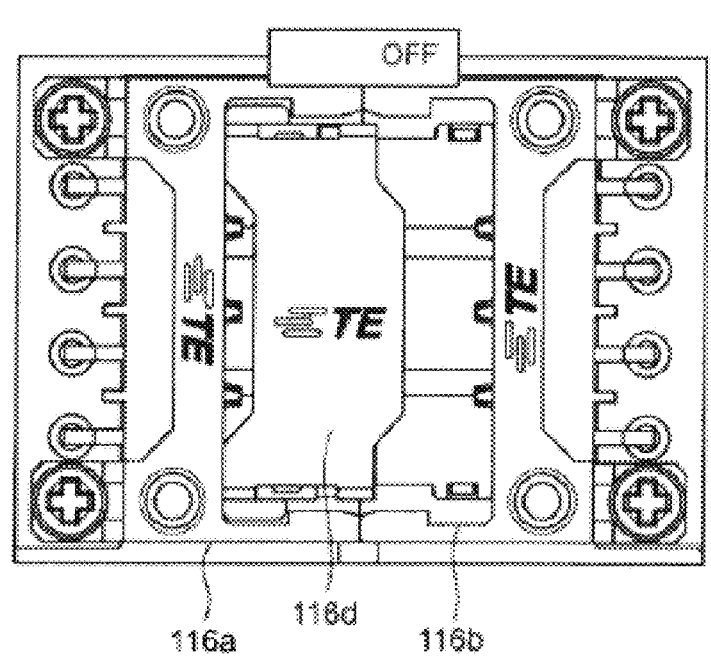
FIG. 50 is a schematic diagram schematically showing a lock mechanism of a relay connector.
Figure 50:
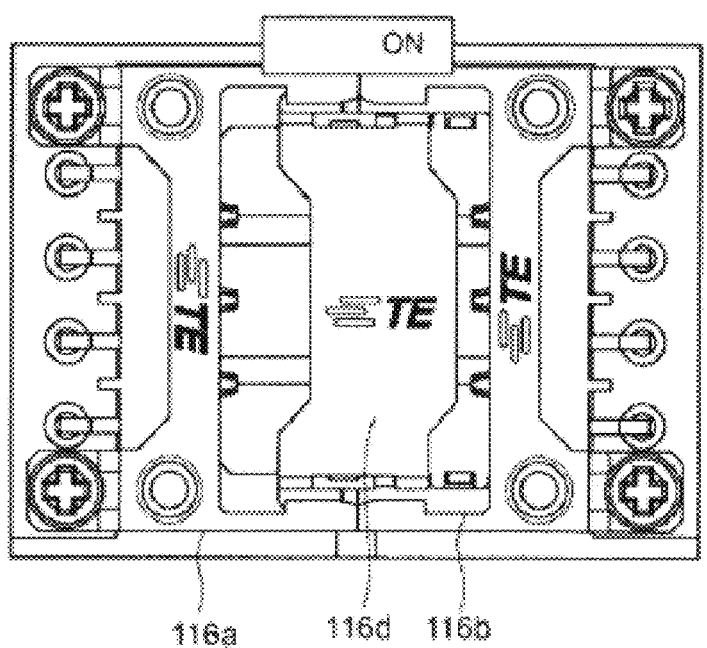
Figure 51:
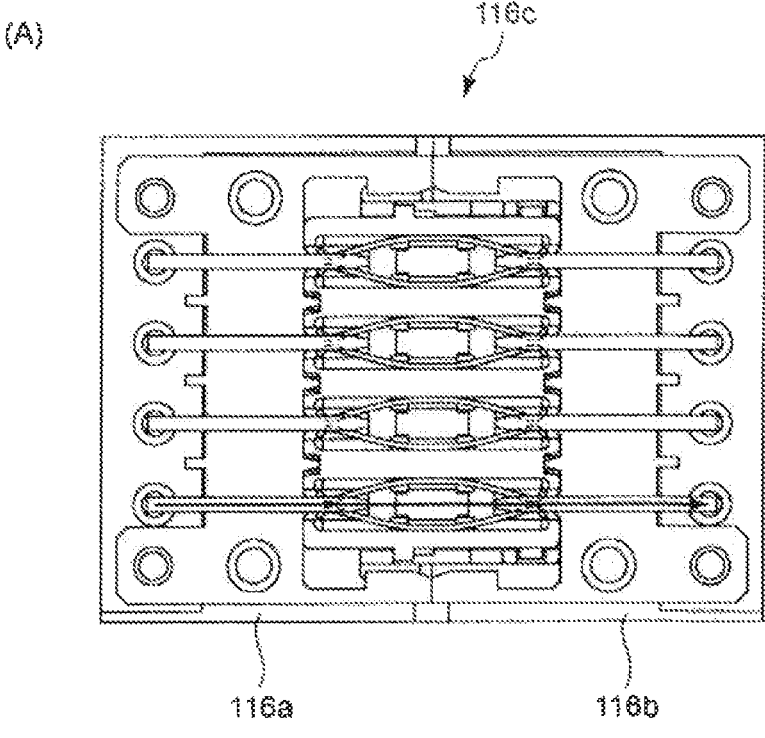
FIG. 51 is a schematic diagram schematically showing an internal structure of the relay connector.
Figure 51:
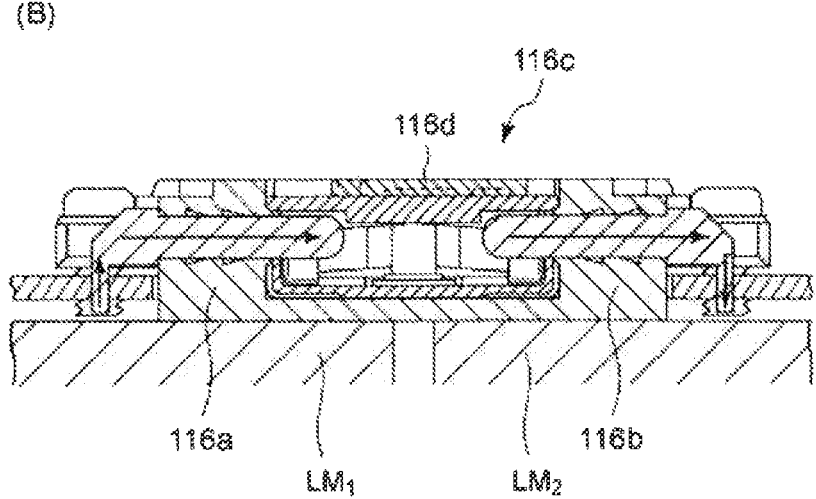
Figure 52:
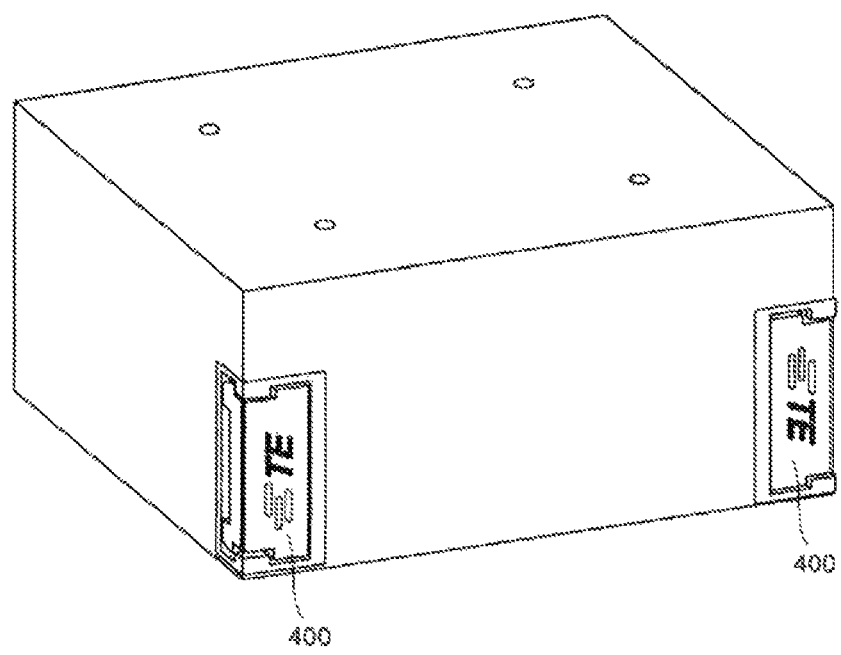
FIG. 52 is a schematic diagram schematically showing caps.

For example, as shown in FIG. 50, the tab holders can be fixed to the boards of the linear motors with fasteners such as screws. By using such a through-hole, the tab holders can be fixed to the linear motors using a smaller space.

A "Second connector" will be described below.

<Second Connector>

A second connector (for example, the connectors 200 to 216) may be positioned in a recessed portion provided in an edge portion of a side face (the XZ plane) of either one of two linear motors (LM$_1$, LM$_2$).

The second connector (for example, the connectors 200 to 216) can be used with the first connector (for example, the connectors 100 to 116) (see FIGS. 4 to 29).

Figure 30:
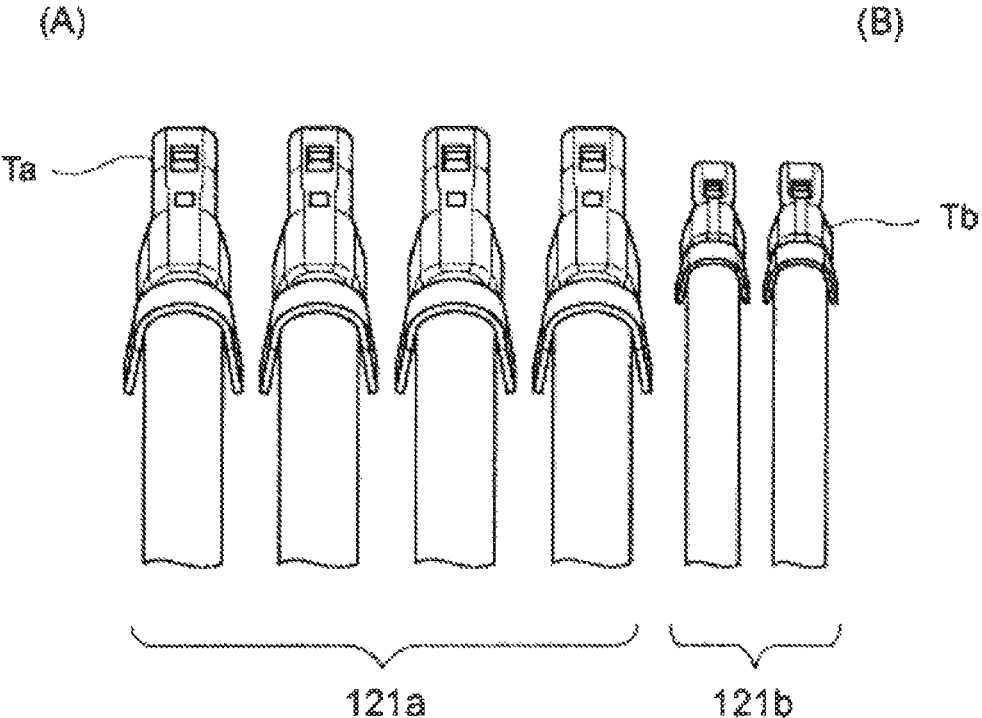
FIG. 30 is a schematic diagram schematically showing electrical wires.

For example, the second connector (for example, the connectors 201 to 216) may include a housing (for example, the housing 201a to 216a) for receiving a plurality of electrical wires (for example, the electrical wires 120 to 124), and a second tab holder (201b to 216b). See FIGS. 4-29(D). An "electrical wire" in the present disclosure means a thin and long member having conductivity, and may have include a terminal at its tip portion (see FIG. 30).

FIG. 30(A) shows, for example, four electrical wires 121a for a power supply. The electrical wires 121a may include a terminal Ta for connection.

FIG. 30(B) shows, for example, two electrical wires 121b for a sensor such as a temperature sensor. The electrical wires 121b may include a terminal Tb for connection.

In the present disclosure, the purpose, length, diameter, and number of electrical wires are not particularly limited.

Figure 45:
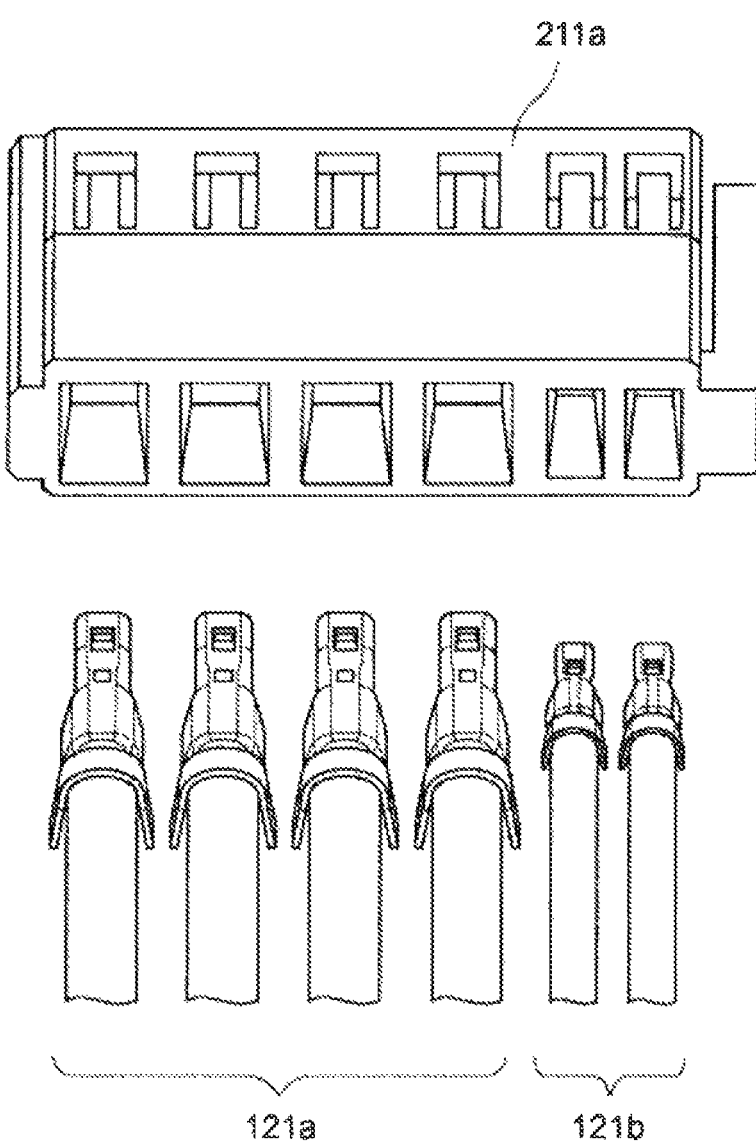
FIG. 45 is a schematic diagram (rear view) schematically showing a relation between a housing and electrical wires.
Figure 46:
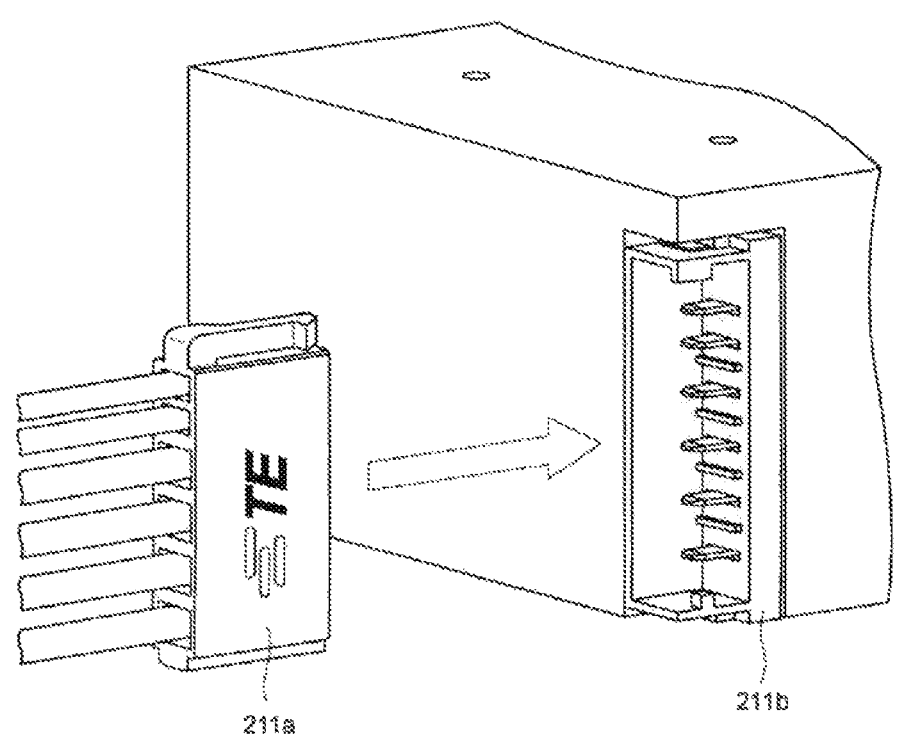
FIG. 46 is a schematical diagram schematically showing a relation between the housing and a tab holder.
Figure 47:
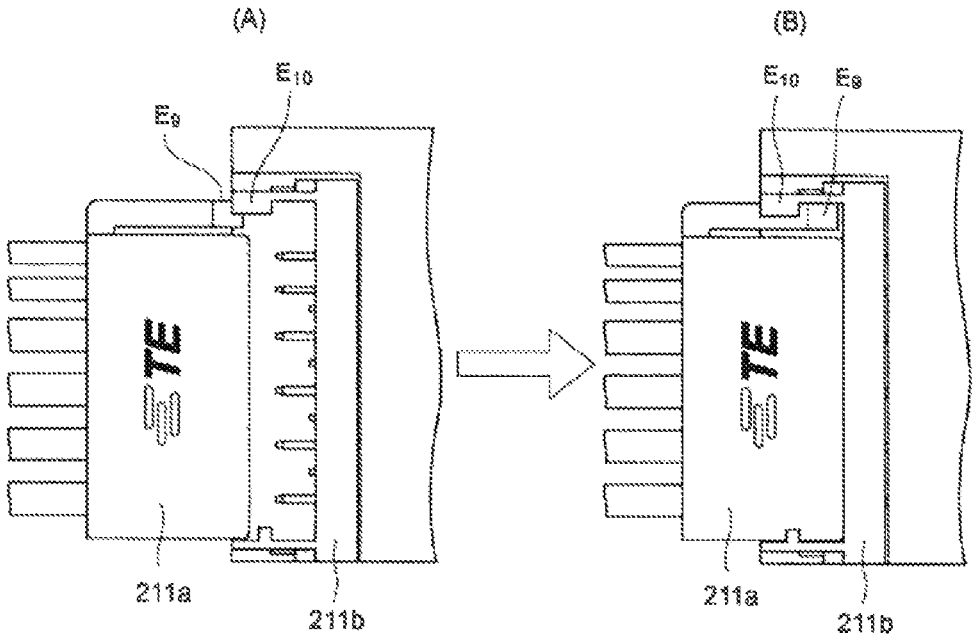
FIG. 47 is a schematic diagram schematically showing engagement between the housing and the tab holder.
Figure 48:
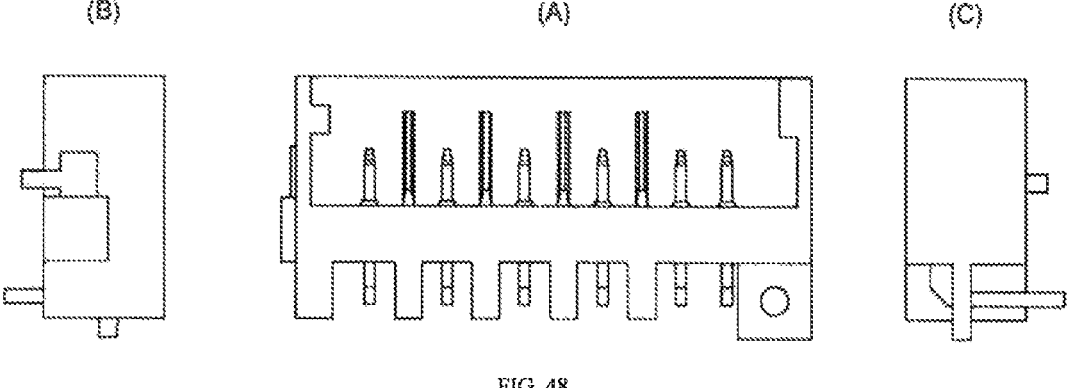
FIG. 48 is a schematic diagram schematically showing a tab holder.
Figure 49:
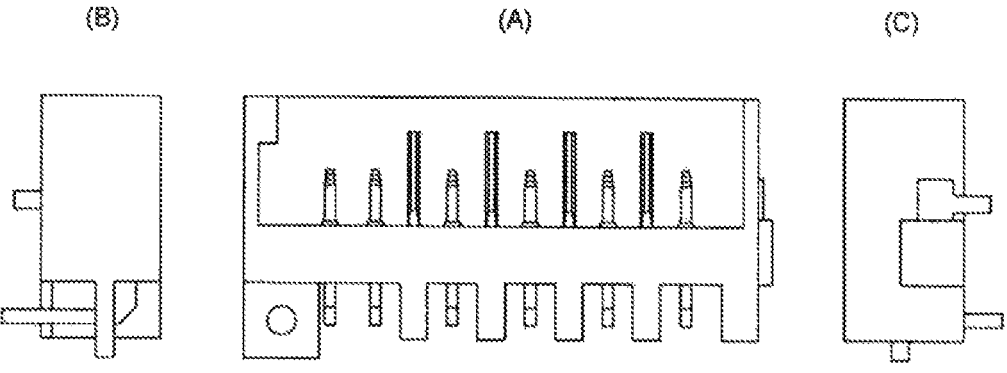
FIG. 49 is a schematic diagram schematically showing another tab holder.

For example, as illustrated in the eleventh embodiment of FIGS. 45 to 47, six electrical wires (121a (four in number), 121b (two in number)) can be inserted into the housing 211a (see FIG. 45). By coupling the housing 211a having the electrical wires (121a, 121b) inserted or set therein to the second tab holder 211b (see FIGS. 46 to 47), the electrical wires (121a, 121b) can be more easily electrically connected to the linear motor.

A "housing" in the present disclosure generally means a member that can be arranged at an end portion of a side face (the XZ plane) of a linear motor, and that can accommodate an electrical wire or the like (see FIG. 3).

A "second tab holder" in the present disclosure means a tab holder that can be arranged at an end portion of a side face (the XZ plane) of a linear motor (see FIG. 3).

The "second tab holder" may have an identical shape to the "first tab holder" and/or either one of the "two tab holders" (preferably the tab holder on the LM$_2$ side) included in the "first connector", or may have a different shape therefrom.

The second connector, for example, the housing and the second tab holder, may be positioned substantially flush with the side face of the linear motor. See FIGS. 4-29(D).

By positioning the housing and the second tab holder substantially flush with the side face of the linear motor, the possibility is significantly reduced that they may prevent motion in the series direction or the direction of movement or the direction of connection of the linear motor.

In the second connector, at least a portion of the housing may be engaged with a portion of the second tab holder. More specifically, as shown in the first to third embodiments and in the eleventh to sixteenth embodiments, an engaging portion provided to the housing and an engaging portion provided to the second tab holder may be coupled together.

The housing 201a of the first embodiment, for example, may have an engaging portion that may be provided similarly to the engaging portion E$_1$ of the plug holder 101a shown in FIG. 31(A)-31(C), the second tab holder 210b may also have an engaging portion that may be provided similarly to the engaging portion E$_2$ of the tab holder 101b, and these engaging portions may be engaged and coupled together (see FIG. 31(B)).

Figure 34:
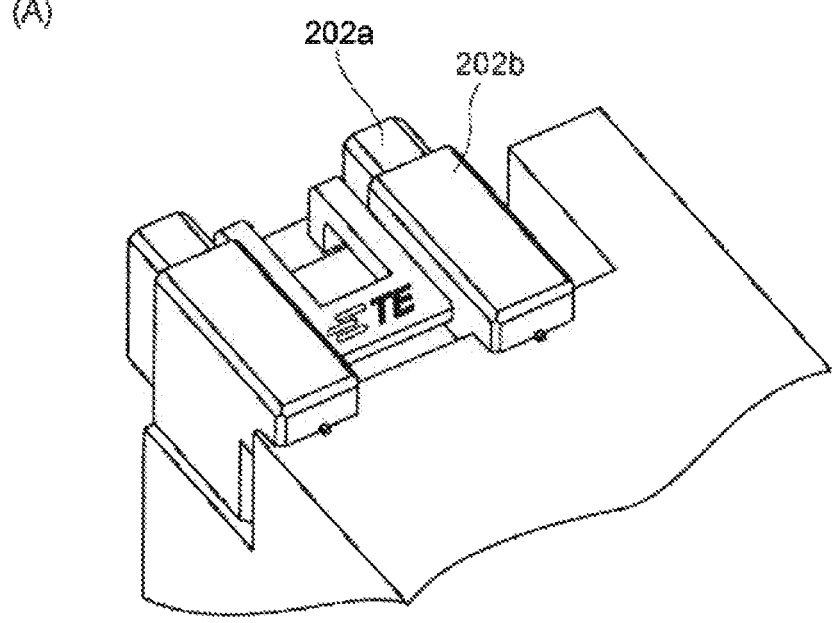
FIG. 34 is a schematic diagram schematically showing engagement between another housing and another tab holder.
Figure 34:
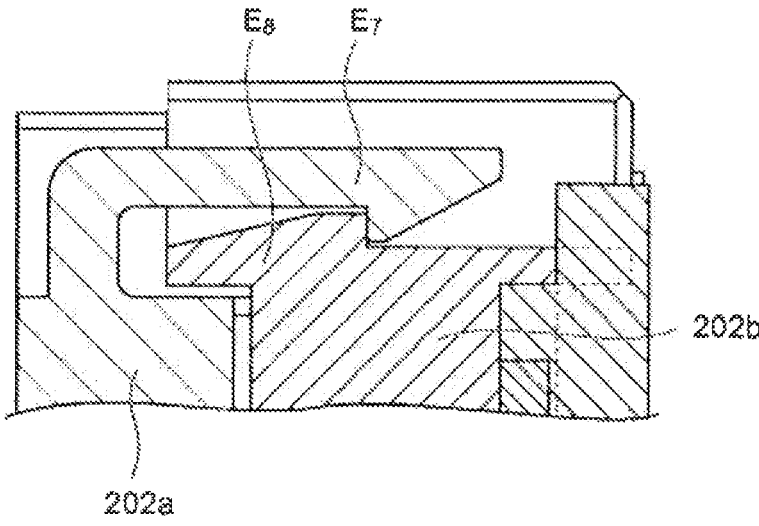

The housing 202a of the second embodiment may similarly have an engaging portion E$_7$, which may be engaged and coupled with an engaging portion E$_8$ provided to the second tab holder 202b. See FIGS. 34(A) and 34(B).

Figure 32:
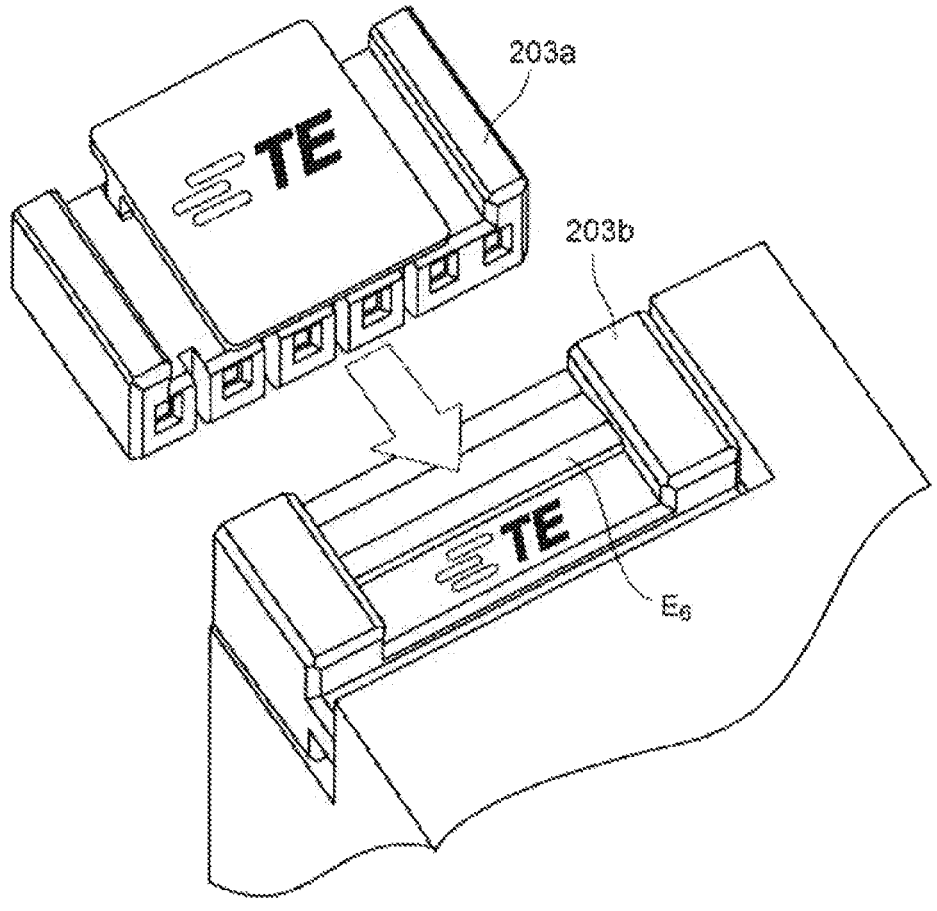
FIG. 32 is a schematic diagram schematically showing a relation between a housing and a tab holder.
Figure 33:
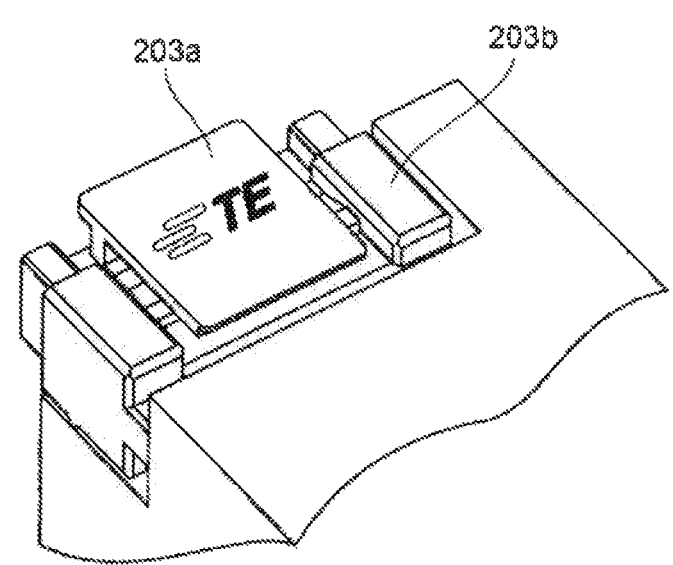
FIG. 33 is a schematic diagram schematically showing engagement between the housing and the tab holder.
Figure 33:
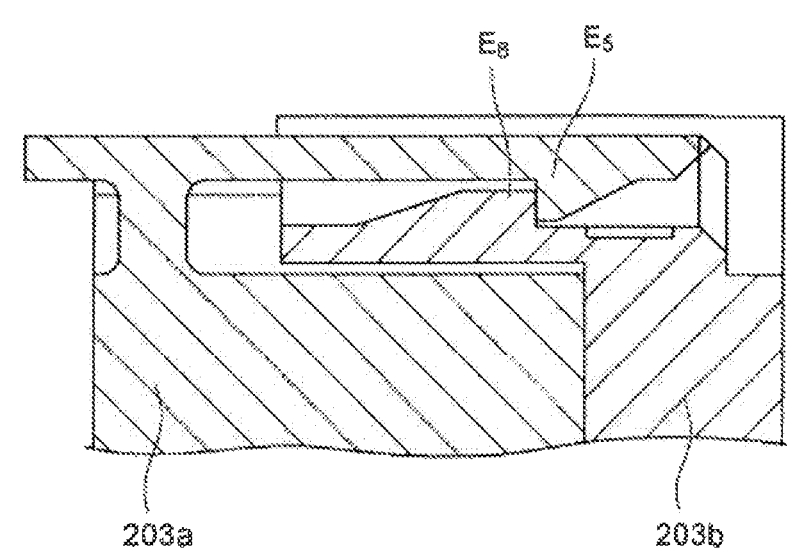

The housing 203a of the third embodiment may similarly have an engaging portion E$_5$, which may be engaged and coupled with an engaging portion E$_6$ provided to the second tab holder 203b. See FIGS. 32, 33(A) and 33(B).

The housing 211a of the eleventh embodiment may similarly have an engaging portion E$_9$, which may be engaged and coupled with an engaging portion E$_{10}$ provided at the second tab holder 211b. See FIGS. 47(A) and 47(B).

An engaging portion can similarly be formed on the housing 212a to 216a of the twelfth to sixteenth embodiments. See FIGS. 24-29(D).

For example, an engaging portion that may be provided to the housing 216a can be configured not to protrude at all from the side face of the linear motor (see FIG. 29(A)). Therefore, the surface of the housing 216a can be positioned more flush with the side face of the linear motor.

The positions of the engaging portions that can be provided to the housings are not particularly limited. The positions and/or shapes of the engaging portions that can be provided to the second tab holders are not particularly limited, either.

The second tab holder (for example, the tab holders 201b to 205b) may have a substantially identical shape to the first tab holder (for example, the tab holders 101b to 105b). See FIGS. 4-13(C).

Making the shape of the second tab holder and the shape of the first tab holder substantially identical enables a plurality of linear motors to be more quickly connected.

The second tab holder (for example, the tab holders 206b to 216b) may have a substantially identical shape to either one of the two tab holders (for example, the tab holders 106b to 116b). See FIGS. 14-29(D).

Making the shape of the second tab holder and the shape of either one of the two tab holders substantially identical enables a plurality of linear motors to be more quickly connected.

The second tab holder and the first plug holder may be electrically connected inside the linear motor. For example, the second tab holder and the first plug holder can be electrically connected through a trunk line or an electrical wire inside the linear motor. Alternatively, they may be electrically connected via a board. By such configurations, space savings inside the linear motor can be achieved.

The second tab holder and either one of the two tab holders (for example, a tab holder of the first linear motor) may be electrically connected inside the linear motor. For example, the second tab holder and either one of the two tab holders (preferably the tab holder on the $LM_1$ side) may be electrically connected via a board inside the linear motor. See FIGS. 24-29(D). By such a configuration, a further improvement in space efficiency inside the linear motor can be achieved.

A "third connector" will be described below.

<Third Connector>

A third connector (for example, the connectors 300 to 316) may be positioned in a recessed portion provided in an edge portion of a side face (the XZ plane) of either one of two linear motors ($LM_1$, $LM_2$).

The third connector can be used with the first connector and/or the second connector. See FIGS. 4-29(D).

In FIGS. 4-29(D), only a plug holder (301a to 307a) (see FIGS. 4-17(D)) or a tab holder (308a to 316a) (see FIGS. 18-29(D)) of the third connector (301 to 316) is shown for convenience in description.

The third connector may be a connector that may be used for connection in a series direction to a third linear motor. Therefore, the plug holders (301a to 307a) (see FIGS. 4-17(D)) and the tab holders (308a to 316a) (FIGS. 18-29 (D)) shown in FIGS. 4-29(D) can be used appropriately in combination with the "tab holder" and/or the "relay connector" and/or the like described above of the present disclosure, and enables, if necessary, further connection in the series direction to the third linear motor.

The third connector may include a plug holder (for example, the plug holder 301a to 307a) (see FIGS. 4-17(D)), and such a plug holder may have a substantially identical shape to the first plug holder (for example, the first plug holder 101a to 107a). See FIGS. 4-17(D)). Making their shapes substantially identical enables a plurality of linear motors to be more quickly connected.

The third connector may include a tab holder (for example, the tab holders 308a to 316a) (see FIGS. 18-29 (D)), and such a tab holder may have a substantially identical shape to either one of the two tab holders that may be included in the first connector (for example, the tab holders 108a to 116a). See FIGS. 18-29(D). Making their shapes substantially identical enables a plurality of linear motors to be more quickly connected.

The third connector may include a tab holder (for example, the tab holders 308a to 316a) (see FIGS. 18-29 (D)), and such a tab holder may have a substantially identical shape to the second tab holder. Making their shapes substantially identical enables a plurality of linear motors to be more quickly connected.

The plug holder (for example, the plug holders 301a to 307a) of the third connector may be electrically connected to either one of the two tab holders (for example, the tab holders 101b to 107b) of the first connector inside the second linear motor $LM_2$. See FIGS. 4-17(D). For example, the plug holders 301a to 307a and the tab holders 101b to 107b may be electrically connected through a trunk line or an electrical wire inside the linear motor. Alternatively, they may be electrically connected by a board. By such configurations, space savings inside the linear motor can be achieved.

The tab holder (for example, the tab holders 308a to 316a) of the third connector may be electrically connected to either one of the two tab holders (for example, the tab holders 108b to 116b) of the first connector inside the second linear motor $LM_2$. See FIG. 18-29(D). For example, the tab holders 308a to 316a and the tab holders 108b to 116b may be electrically connected via a board inside the linear motor. See FIGS. 24-29(D). By such a configuration, a further improvement in space efficiency inside the linear motor can be achieved.

The third connector, as described above, may be a connector that may be used for connection to the next linear motor.

Figure 53:
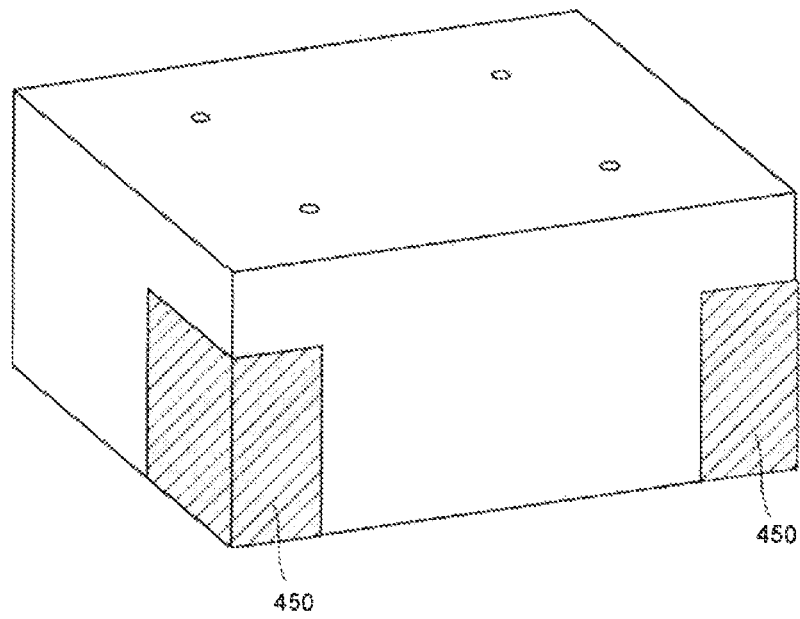
FIG. 53 is a schematic diagram schematically showing insulating members.

In a case where the third connector includes a tab holder, the tab holder included in the third connector may be covered with a cap 400 (see FIGS. 52 and 65(A)-65(G)) or an insulating member 450 (see FIG. 53).

The shape of the cap 400 is not particularly limited as long as it can cover the tab holder, in particular a portion thereof that may be used for electrical coupling (see FIGS. 52 and 65(A)-65(G)). Material that may constitute the cap 400 is not particularly limited, either, and the cap 400 may be composed of, for example, resin or the like. The cap 400 improves performance, for example, waterproofness, dustproofness, and the like.

The shape of the insulating material 450 is not particularly limited as long as it can cover the tab holder, in particular a portion thereof that may be used for electrical coupling (see FIG. 53). Material that may constitute the insulating member 450 is not particularly limited, either, and the insulating material may be composed of, for example, an insulating tape or the like. The insulating member 450 improves performance, for example, waterproofness, dustproofness, and the like.

<Overmold>

In the present disclosure, an overmold may form a side face (the XZ plane) or the like of a linear motor.

Figure 54:
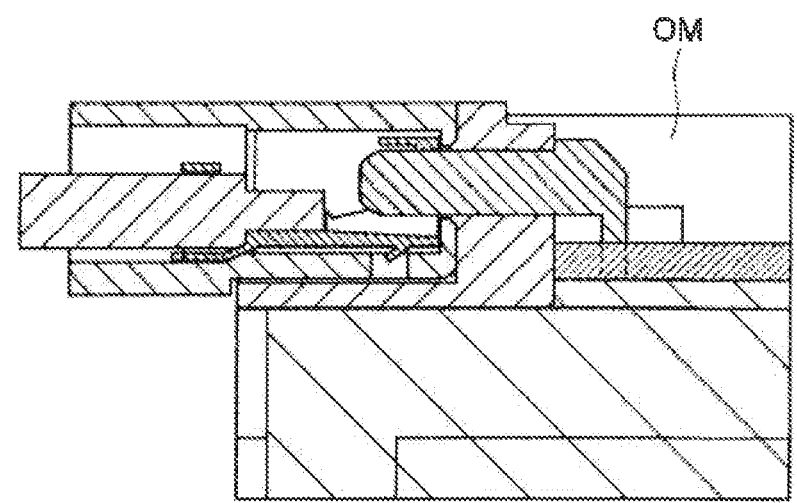
FIG. 54 is a schematic diagram schematically showing an overmold.
Figure 54:
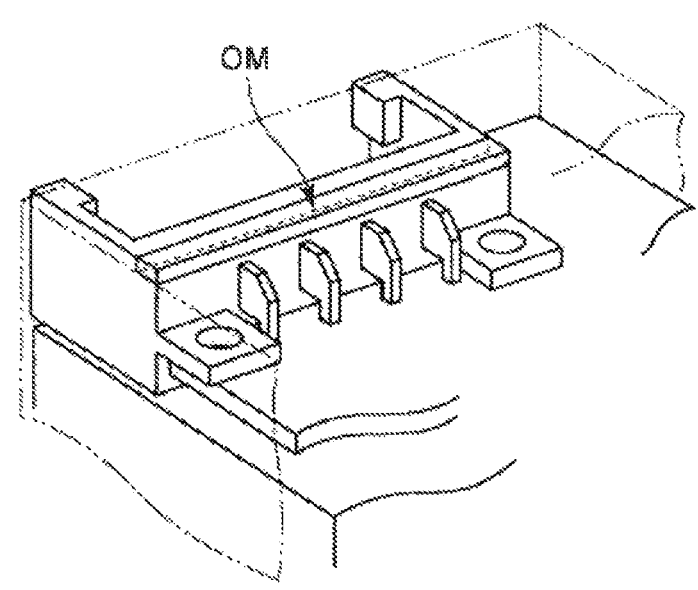

For example, as shown in FIG. 54(A), an overmold OM may be so formed as to cover upper portions of coupled portions of the tab holder and the board.

Material that constitutes the overmold OM is not particularly limited, and may be a resin material, for example, plastic or the like.

For example, as shown in FIG. 54(B), a step or a recessed portion may be provided at a portion of the tab holder on which the overmold OM may be formed, thereby improving a retaining force to the tab holder.

A "fourth connector" will be described below.

<Fourth Connector>

A fourth connector including a housing for receiving a plurality of other electrical wires, and a tab holder may be used in addition to the first connector, the second connector, and/or the third connector.

For example, the second connector shown in FIGS. 4-13 (C), FIGS. 24-25(D) uses thick electrical wires (121a, 122a) for a power supply and thin electrical wires (121b, 122b) for a sensor such as a temperature sensor. For example, for the thin electrical wires (121b, 122b) for the sensor, a separate connector may be provided as the fourth connector. See FIGS. 55-58(B). It should be noted that the purpose of the electrical wires provided is not particularly limited.

Figure 55:
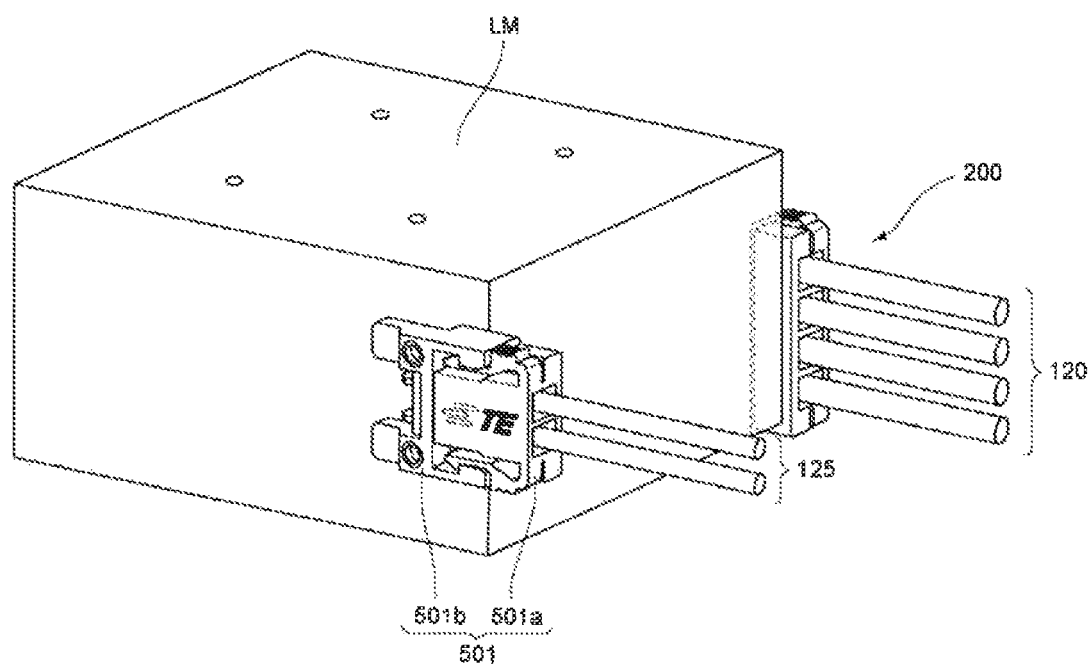
FIG. 55 is a schematic diagram schematically showing a fourth connector.
Figure 56:
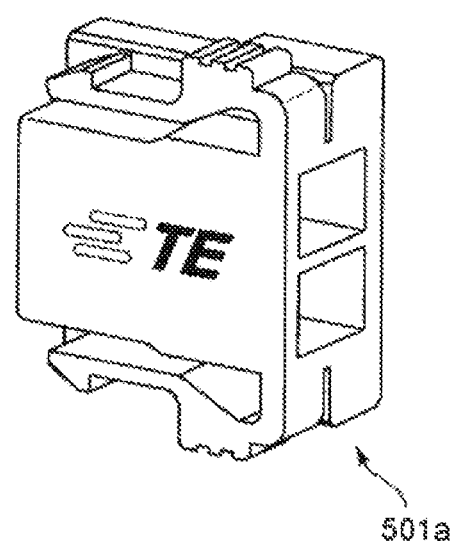
FIG. 56 is a schematic diagram schematically showing a housing and a tab holder, respectively, of the fourth connector.
Figure 56:
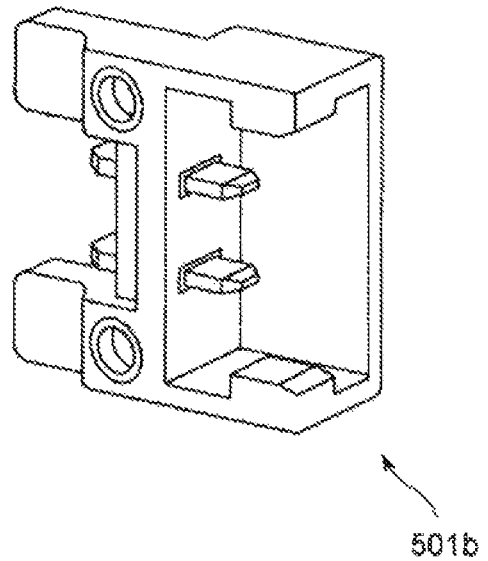

For example, as shown in FIGS. 55, 56(A) and 56(B), a fourth connector 501 for connecting, for example, two electrical wires 125 for a sensor may be provided on the side opposite to the second connector 200 including, for example, four electrical wires 120 for a power source. The purpose of the electrical wires provided is not particularly limited.

The fourth connector 501 includes a housing 501*a* for receiving the electrical wires 125, and a tab holder 501*b*. See FIGS. 56(A) and 56(B). A terminal or a contact for connection to a linear motor LM (in particular, a board contained therein) may be arranged in the tab holder 501*b*. The terminal or the contact provided in the tab holder 501*b* may be configured to be electrically connectable to a terminal provided to the electrical wire 125 when the housing 501*a* and the tab holder 501*b* are coupled. A terminal and/or a contact and/or the like may also be provided inside the housing 501*a*.

Figure 57:
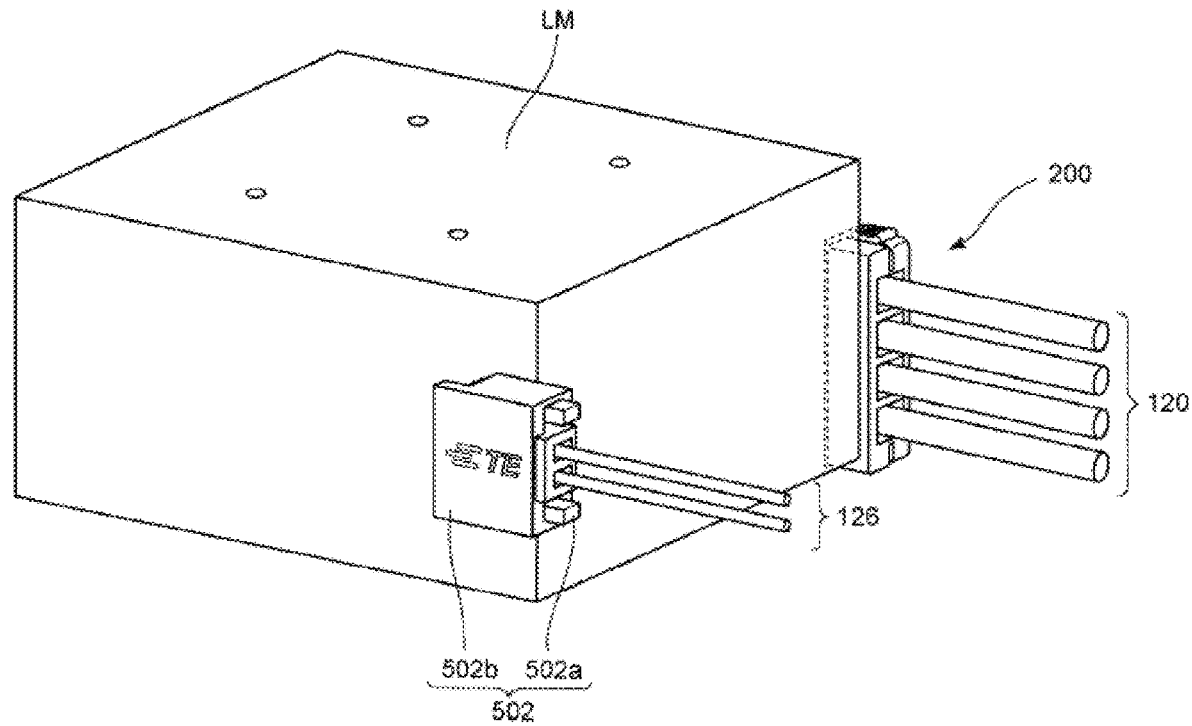
FIG. 57 is a schematic diagram schematically showing another fourth connector.
Figure 58:
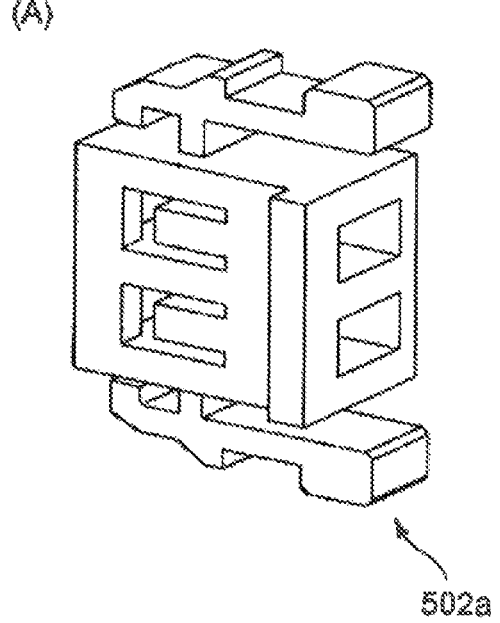
FIG. 58 is a schematic diagram schematically showing a housing and a tab holder, respectively, of the other fourth connector.
Figure 58:
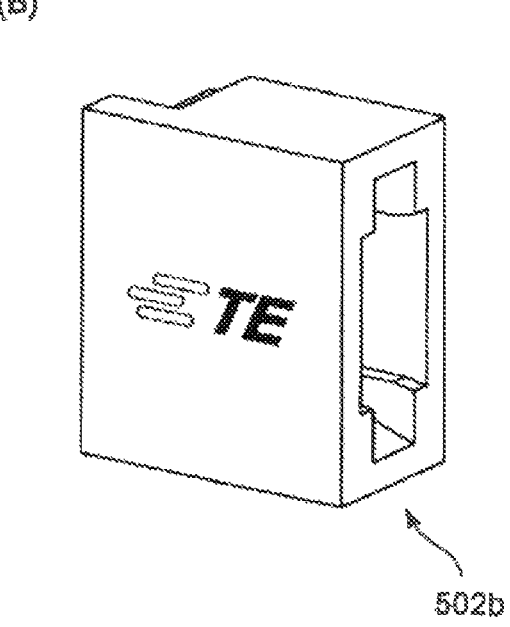
Figure 59:
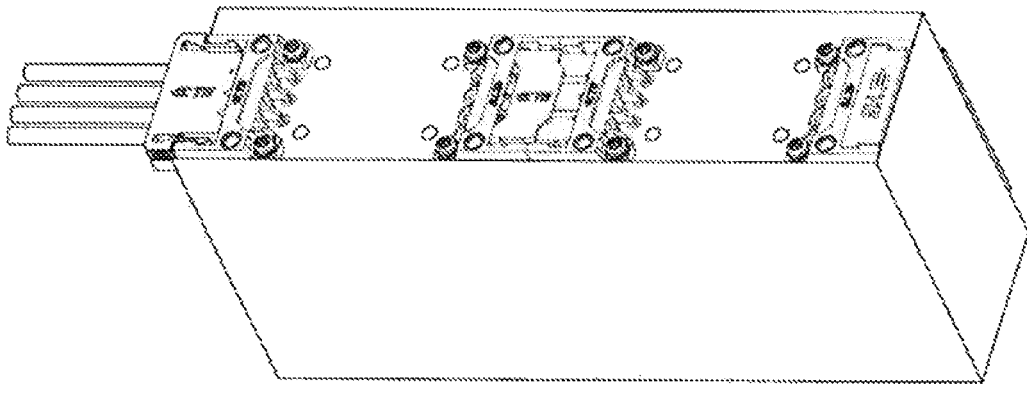
FIG. 59 is an isometric view showing an example of connectors that can be used in the sixteenth embodiment (with an overmold)
Figure 60:
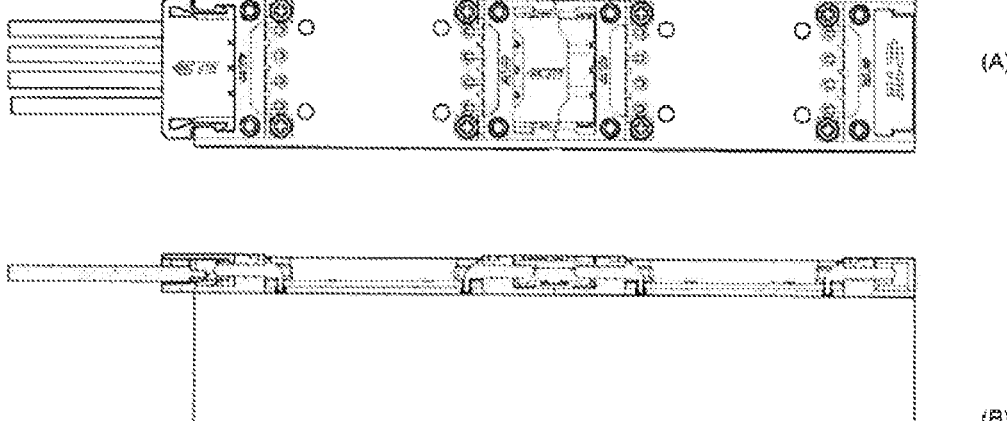
FIG. 60 shows an example of connectors that can be used in the sixteenth embodiment (A: a top view (without an overmold), B: a cross sectional view)
Figure 61:
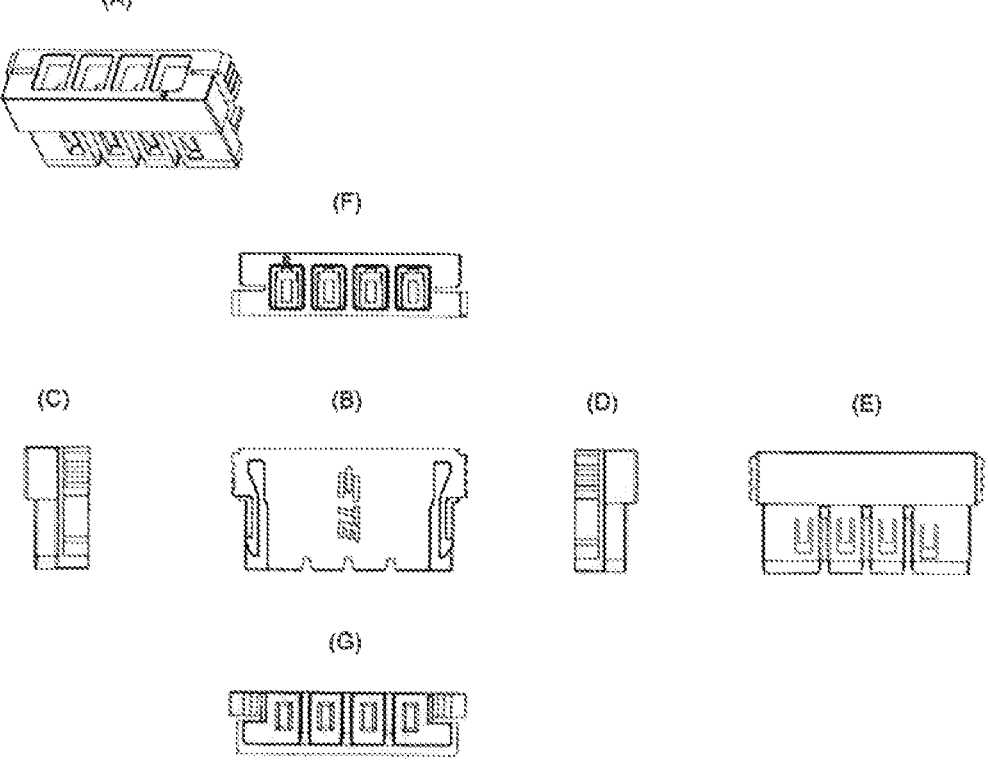
FIG. 61 shows the housing 216a of the second connector that can be used in the sixteenth embodiment (A: an isometric view, B: a front view, C: a left side view, D: a right side view, E: a rear view, F: a top view, G: a bottom view)
Figure 62:
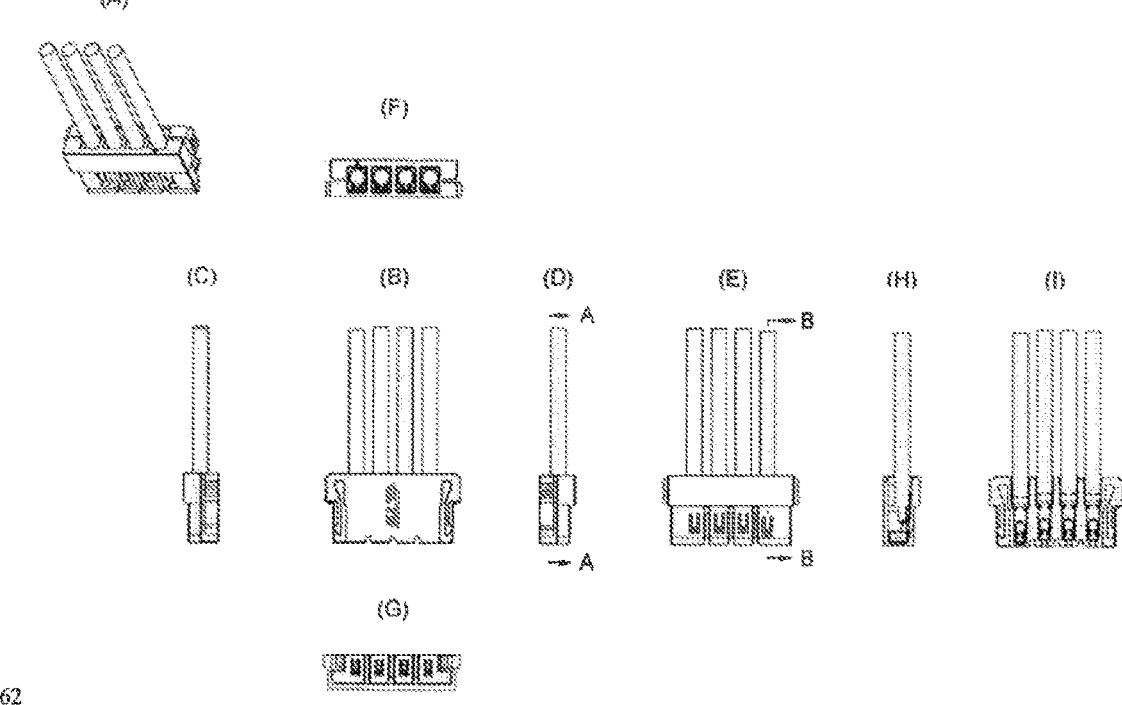
FIG. 62 shows the housing 216a (with electrical wires) of the second connector that can be used in the sixteenth embodiment (A: an isometric view, B: a front view, C: a left side view, D: a right side view, E: a rear view, F: a top view, G: a bottom view, H: a cross sectional view (B-B), I: a cross sectional view (A-A))
Figure 63:
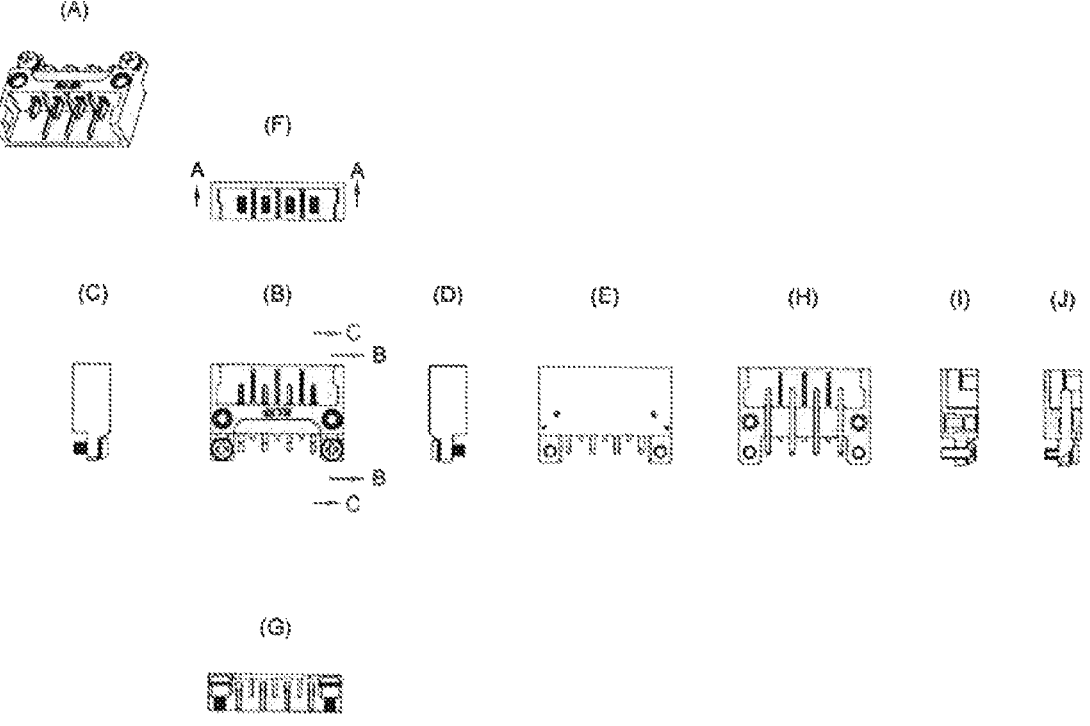
FIG. 63 shows a/the tab holder 216b/116a/116b/316a that can be used in the sixteenth embodiment (A: an isometric view, B: a front view, C: a left side view, D: a right side view, E: a rear view, F: a top view, G: a bottom view, H: a cross sectional view (A-A), I: a cross sectional view (B-B), J: a cross sectional view (C-C))
Figure 64:
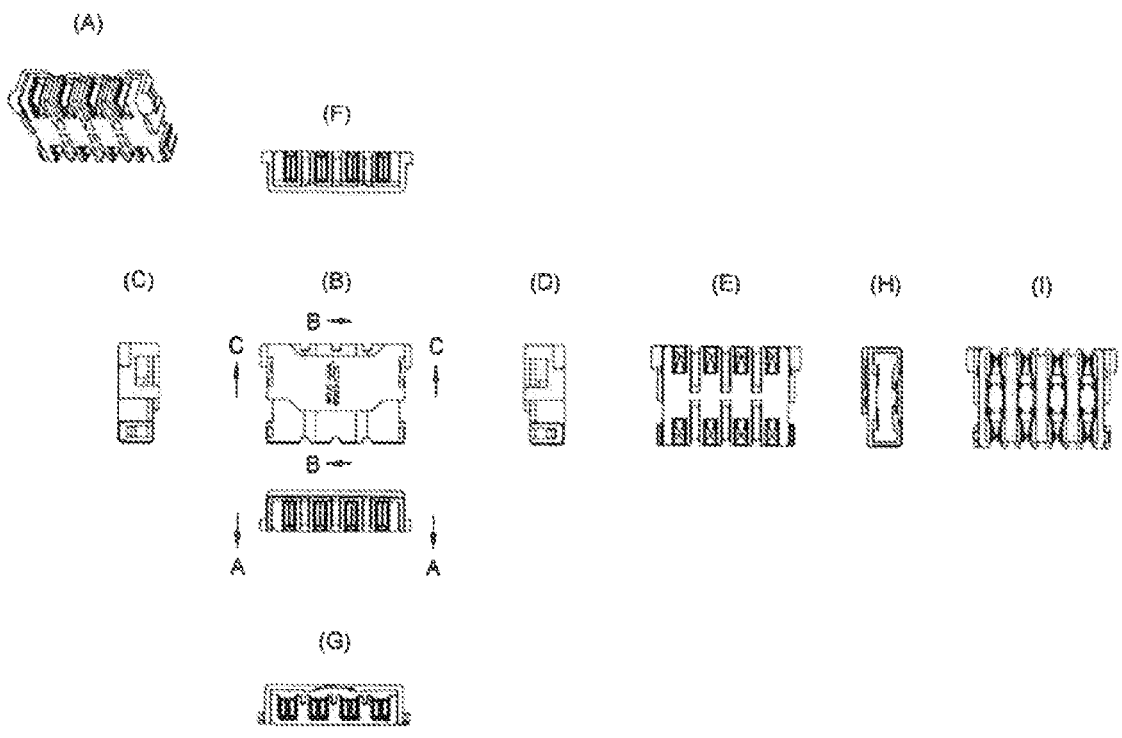
FIG. 64 shows the relay connector 116c (in an unlocked state) that can be used in the sixteenth embodiment (A: an isometric view, B: a front view, C: a left side view, D: a right side view, E: a rear view, F: a top view, G: a bottom view, H: a cross sectional view (B-B), I: a cross sectional view (A-A))
Figure 65:
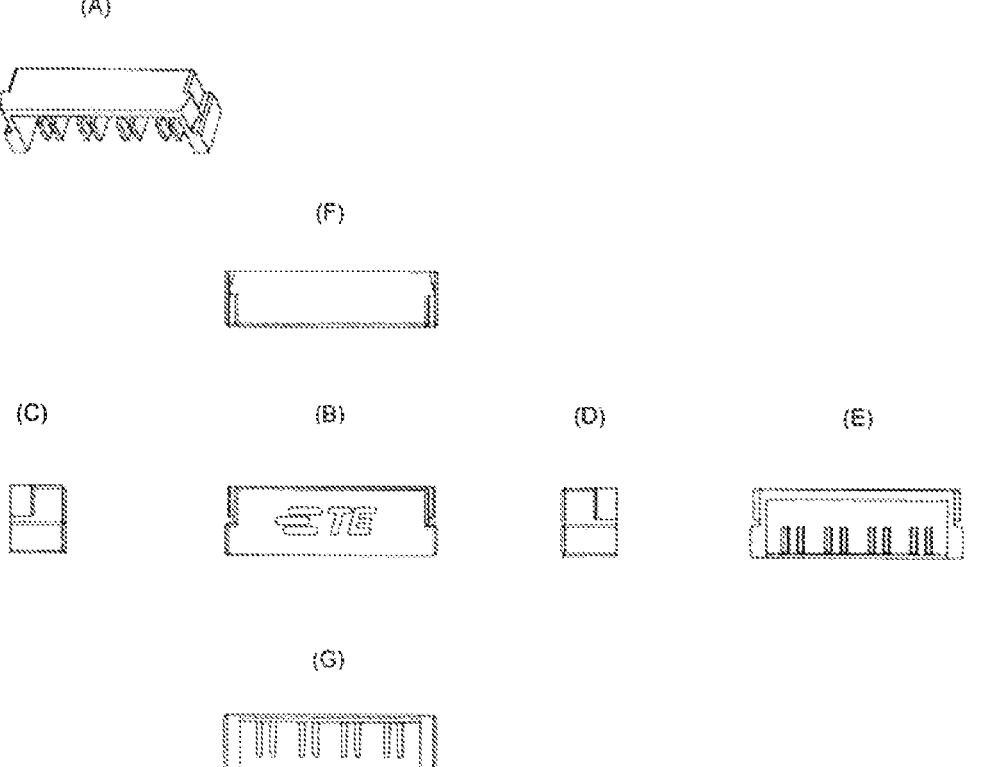
FIG. 65 shows the cap 400 that can be used in the sixteenth embodiment (A: an isometric view, B: a front view, C: a left side view, D: a right side view, E: a rear view, F: a top view, G: a bottom view).

For example, as shown in FIGS. 57, 58(A) and 58(B), a fourth connector 502 for connecting, for example, two electrical wires 126 for a sensor, may be provided on the side opposite to the second connector including, for example, four electrical wires 120 for a power source. The purpose of the electrical wires provided is not particularly limited.

The fourth connector 502 includes a housing 502*a* for receiving the electrical wires 126, and a tab holder 502*b*. See 58(A) and 58(B). A terminal or a contact (not shown) for connection to a linear motor LM (in particular, a board contained therein) may be arranged in the tab holder 502*b*. The terminal or the contact provided in the tab holder 502*b* may be configured to be electrically connectable to a terminal provided to the electrical wire 126 when the housing 502*a* and the tab holder 502*b* are coupled. A terminal and/or a contact and/or the like may also be provided inside the housing 502*a*.

The purpose, length, diameter, and number of electrical wires are not particularly limited. The fourth connector can be configured similarly to the second connector.

The connector of the present disclosure has been described with reference to the first to sixteenth embodiments, but these embodiments are only for illustrative purposes, and the first connector, the second connector, the third connector, and/or the fourth connector, if necessary, may be used in combination appropriately. Similarly, each component of the first connector, the second connector, the third connector, and/or the fourth connector, if necessary, may be used in combination appropriately.

<Preferred Embodiment> A preferred embodiment of the connector of the present disclosure will be shown for illustrative purposes in FIGS. 59-65(G) (the sixteenth embodiment).

It should be noted that such an embodiment of the present invention as described above encompasses the following preferred aspects.

First Aspect:

A connector for connecting at least two linear motors in a series direction, the connector including a first plug holder and a first tab holder, the first plug holder and the first tab holder facing each other along a direction of connection of the linear motors, the first plug holder and the first tab holder being positioned in a recessed portion provided in side faces of connecting portions of the two linear motors.

Second Aspect:

The connector according to the first aspect, wherein the first plug holder and the first tab holder are positioned substantially flush with the side faces of the linear motors.

Third Aspect:

The connector according to the first or second aspect, wherein at least a portion of the first plug holder is inserted into a portion of the first tab holder.

Fourth Aspect: The connector according to any one of the first to third aspects, wherein an engaging portion provided to the first plug holder and an engaging portion provided to the first tab holder are coupled together.

Fifth Embodiment

The connector according to the first or second aspect, further including a relay connector for electrically connecting the first plug holder and the first tab holder.

Sixth Embodiment

The connector according to the first or second aspect, further including a cover, the cover, the first plug holder, and the first tab holder being fixed with a fastener.

Seventh Embodiment

A connector for connecting at least two linear motors in a series direction, the connector including two tab holders and a relay connector for electrically connecting the two tab holders, the two tab holders facing each other along a direction of connection of the linear motors, the two tab holders being positioned in a recessed portion provided in side faces of connecting portions of the two linear motors.

Eighth Aspect:

The connector according to the seventh aspect, wherein the relay connector includes a slide plate.

Ninth Aspect:

The connector according to the eighth aspect, wherein the slide plate has a lock mechanism.

Tenth Aspect:

The connector according to any one of the seventh to ninth aspects, wherein the two tab holders have identical shapes.

Twelfth Aspect:

The connector according to any one of the seventh to eleventh aspects, wherein the tab holders have at least one through-hole, and the tab holders are fixed to the linear motors with a fastener through the through-hole.

Thirteenth Aspect:

The connector according to any one of the first to twelfth aspects, wherein the connector is used with a second connector positioned in a recessed portion provided in an edge portion of the side face of either one of the two linear motors, and the second connector includes a housing for receiving a plurality of electrical wires, and a second tab holder.

Fourteenth Aspect:

The connector according to the thirteenth aspect, wherein the housing and the second tab holder are positioned substantially flush with the side face of the linear motor.

Fifteenth Aspect:

The connector according to the fourteenth aspect, wherein at least a portion of the housing is engaged with a portion of the second tab holder.

Sixteenth Aspect:

The connector according to any one of the thirteenth to fifteenth aspects, wherein an engaging portion provided to the housing and an engaging portion provided to the second tab holder are coupled together.

Seventeenth Aspect:

The connector according to any one of the thirteenth to sixteenth aspects depending from any one of the first to sixth aspects, wherein the second tab holder have an identical shape to the first tab holder.

Eighteenth Aspect:

The connector according to any one of the thirteenth to sixteenth aspects depending from any one of the seventh to twelfth aspects, wherein the second tab holder has an identical shape to either one of the two tab holders.

Nineteenth Aspect:

The connector according to any one of the thirteenth to sixteenth aspects depending from any one of the first to sixth aspects, wherein the second tab holder and the first plug holder are electrically connected inside the linear motor.

Twentieth Aspect:

The connector according to any one of the thirteenth to sixteenth aspects depending from any one of the seventh to twelfth aspects, wherein the second tab holder and either one of the two tab holders are electrically connected inside the linear motor.

Twenty-first Aspect:

The connector according to any one of the first to twentieth aspects, wherein the connector is used with a third connector positioned in a recessed portion provided in an edge portion of the side face of either one of the two linear motors.

Twenty-second Aspect:

The connector according to the twenty-first aspect depending from any one of the first to sixth aspects, wherein the third connector includes a plug holder, and the plug holder has an identical shape to the first plug holder.

Twenty-third Aspect:

The connector according to the twenty-first aspect depending from any one of the seventh to twelfth aspects, wherein the third connector includes a tab holder, and the tab holder has an identical shape to either one of the two tab holders.

Twenty-fourth Aspect:

The connector according to the twenty-first aspect depending from any one of the thirteenth to sixteenth aspects, wherein the third connector includes a tab holder, and the tab holder has an identical shape to the second tab holder.

Twenty-fifth Aspect:

The connector according to the twenty-first aspect, wherein the third connector includes a tab holder, and the tab holder is covered with a cap or an insulating member.

Twenty-sixth Aspect:

The connector according to any one of the first to twenty-fifth aspects, wherein the connector is used with a fourth connector including a housing for receiving a plurality of electrical wires, and a tab holder.

The connector of the present disclosure can connect two or more linear motors in a series direction. The connector of the present disclosure can be used in linear motors in a variety of fields ranging from heavy industrial applications to light industrial applications. The connector of the present disclosure can be used in industrial machines, for example, servo linear motors and the like (for example, semiconductor manufacturing equipment and the like).

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A linear motor connector system, comprising:
a first linear motor and a second linear motor; and
a first connector, including:
a first plug holder electrically connected to the first linear motor and positioned in a recessed portion formed on an exterior face of a connecting portion of the first linear motor;
a first tab holder electrically connected to the second linear motor, the first tab holder positioned in a recessed portion formed on an exterior face of a connecting portion of the second linear motor and facing the first plug holder along a direction of connection of the linear motors, wherein the first plug holder and the first tab holder are positioned substantially flush with side faces of the linear motors, wherein, with at least a portion of the first plug holder inserted into a portion of the first tab holder and electrically connecting the first and second linear motors, each recessed portion extends only partially into abutting end portions of an exterior housing of a respective one of the first and second linear motors in the direction of connection; and
a relay connector electrically connecting the first plug holder and the first tab holder in series, the relay connector is positioned within the recessed portions of the first and second linear motors and is substantially flush with, or recessed relative to, side faces of the linear motors.

2. The system according to claim 1, wherein the first tab holder and the second tab holder define complementary engaging portions for locking the first and second tab holders together.

3. The system according to claim 1, further comprising a cover, wherein the cover, the first plug holder and the first tab holder are fixed with a fastener.

4. The system according to claim 1, further comprising a second connector positioned in a recessed portion provided in an edge portion of the exterior face of either one of the first or second linear motors, the second connector including a housing for receiving a plurality of electrical wires and a second tab holder.

5. The system according to claim 4, wherein the housing and the second tab holder are positioned substantially flush with a side face of the linear motor.

6. The system according to claim 4, wherein at least a portion of the housing is engaged with a portion of the second tab holder.

7. The system according to claim 4, wherein an engaging portion of the housing and an engaging portion of the second tab holder are coupled together.

8. The system according to claim 4, further comprising a third connector positioned in a recessed portion provided in an edge portion of the exterior face of either one of the first or second linear motors.

9. The system according to claim 8, wherein the third connector includes a third tab holder, and the third tab holder is covered with a cap or an insulating member.

10. The system according to claim 8, further comprising a fourth connector including a housing for receiving a plurality of electrical wires, and a third tab holder.

11. A linear motor connector system, comprising:

a first linear motor having a first tab holder positioned in a recessed portion formed in an exterior face of a connecting portion of the first linear motor;

a second linear motor having a second tab holder positioned in a recessed portion formed in an exterior face of a connecting portion of the second linear motor, the first tab holder and the second tab holder facing each other along a direction of connection of the first and second linear motors; and a relay connector electrically connecting the first and second tab holders and connecting the first linear motor and the second linear motor in series, wherein the relay connector is positioned within the recessed portions of the first and second linear motors and the first tab holder, the second tab holder, and the relay connector are positioned substantially flush with, or recessed relative to, side faces of the linear motors with the relay connector electrically connecting the first and second tab holders and the first and second tab holders positioned in their respective recessed portions, each recessed portion extends only partially into abutting and adjacent end portions of an exterior housing of a respective one of the first and second linear motors in the direction of connection.

12. The system according to claim 11, wherein the relay connector comprises a slide plate.

13. The system according to claim 12, wherein the slide plate has a lock mechanism.

14. The system according to claim 11, wherein the first and second tab holders have identical shapes.

15. The system according to claim 11, wherein the first and second tab holders have different shapes.

16. The system according to claim 11, wherein the first and second tab holders each have at least one through-hole and are fixed to the first and second linear motors with a fastener arranged through the through-hole.

17. The system according to claim 11, further comprising a connector positioned in a recessed portion provided in an edge portion of the exterior face of either one of the first or second linear motors, the second connector including a housing for receiving a plurality of electrical wires and a third tab holder.

18. A linear motor connector system, comprising:

a first linear motor and a second linear motor; and a first connector, including:

a first plug holder electrically connected to the first linear motor and positioned in a recessed portion formed on an exterior face of a connecting portion of the first linear motor;

a first tab holder electrically connected to the second linear motor, the first tab holder positioned in a recessed portion formed on an exterior face of a connecting portion of the second linear motor and facing the first plug holder along a direction of connection of the linear motors, a depth of each of the recessed portions sufficient such that the entire first plug holder and the entire first tab holder are positioned substantially flush with, or recessed relative to, side faces of the linear motors with the first plug holder and the first tab holder electrically connected and the first linear motor electrically connected to the second linear motor, wherein the recessed portion of the first linear motor is directly adjacent the recessed portion of the second linear motor; and a relay connector electrically connecting the first plug holder and the first tab holder in series, the relay connector is positioned within the recessed portions of the first and second linear motors and is substantially flush with, or recessed relative to, side faces of the linear motors.

19. The system according to claim 18, wherein conductors of the first plug holder and the first tab holder are recessed relative to the side faces of the linear motors in a direction perpendicular to the direction of connection.

20. The system according to claim 18, wherein each recessed portion extends into an exterior housing of a respective one of the first and second linear motors in a direction perpendicular to the direction of connection to a depth at least equal to a thickness of a respective one of the first plug holder and the first tab holder.

21. The system according to claim 20, wherein each recessed portion extends only partially into adjacent and abutting end portions of the exterior housing of a respective one of the first and second linear motors in the direction of connection.

22. The system according to claim 18, wherein each recessed portion is defined by two longitudinal sidewalls extending in the direction of connection, and a transverse sidewall extending transverse to the direction of connection, wherein heights of each of the sidewalls defining the recessed portion are at least equal to a thickness of a respective one of the first plug holder and the first tab holder.

* * * * *